US012492226B2

(12) United States Patent
Ganesan et al.

(10) Patent No.: US 12,492,226 B2
(45) Date of Patent: Dec. 9, 2025

(54) MATERIALS AND METHODS FOR PRODUCING BIOENGINEERED VIRUS SPECIFIC LYMPHOCYTES

(71) Applicant: JANSSEN BIOTECH, INC., Horsham, PA (US)

(72) Inventors: Rajkumar Ganesan, Blue Bell, PA (US); Sanjaya Singh, Blue Bell, PA (US); Iqbal S. Grewal, Newtown, PA (US)

(73) Assignee: JANSSEN BIOTECH, INC., Horsham, PA (US)

( * ) Notice: Subject to any disclaimer, the term of this patent is extended or adjusted under 35 U.S.C. 154(b) by 236 days.

(21) Appl. No.: 17/397,174

(22) Filed: Aug. 9, 2021

(65) Prior Publication Data
US 2022/0040232 A1 Feb. 10, 2022

Related U.S. Application Data

(60) Provisional application No. 63/063,811, filed on Aug. 10, 2020, provisional application No. 63/063,784, (Continued)

(51) Int. Cl.
*C07K 14/005* (2006.01)
*A61K 40/11* (2025.01)
(Continued)

(52) U.S. Cl.
CPC ............ *C07K 14/005* (2013.01); *A61K 40/11* (2025.01); *A61K 40/31* (2025.01);
(Continued)

(58) Field of Classification Search
CPC ...... A61K 35/17; C07K 14/005; C07K 14/55; C07K 2319/03; C07K 14/7051;
(Continued)

(56) References Cited

U.S. PATENT DOCUMENTS 4,526,938 A 7/1985 Churchill
4,816,567 A 3/1989 Cabilly
(Continued)

FOREIGN PATENT DOCUMENTS

EP 0239400 A2 9/1987
EP 0368684 5/1990
(Continued)

OTHER PUBLICATIONS

Choo (Choo, Joanna A L et al. "The immunodominant influenza A virus M158-66 cytotoxic T lymphocyte epitope exhibits degenerate class I major histocompatibility complex restriction in humans." Journal of virology vol. 88, 18 (2014): 10613-23) (Year: 2014).*
(Continued)

*Primary Examiner* — Tracy Vivlemore
*Assistant Examiner* — Thomas R. Amick
(74) *Attorney, Agent, or Firm* — Ice Miller LLP

(57) ABSTRACT

A method for activating or enriching Vβ17+CD8+ T cells, comprising contacting a M1 peptide derived from human influenza A virus ($M1_{58-66}$) with a population of cells comprising T cells.

14 Claims, 11 Drawing Sheets

Figure 1:
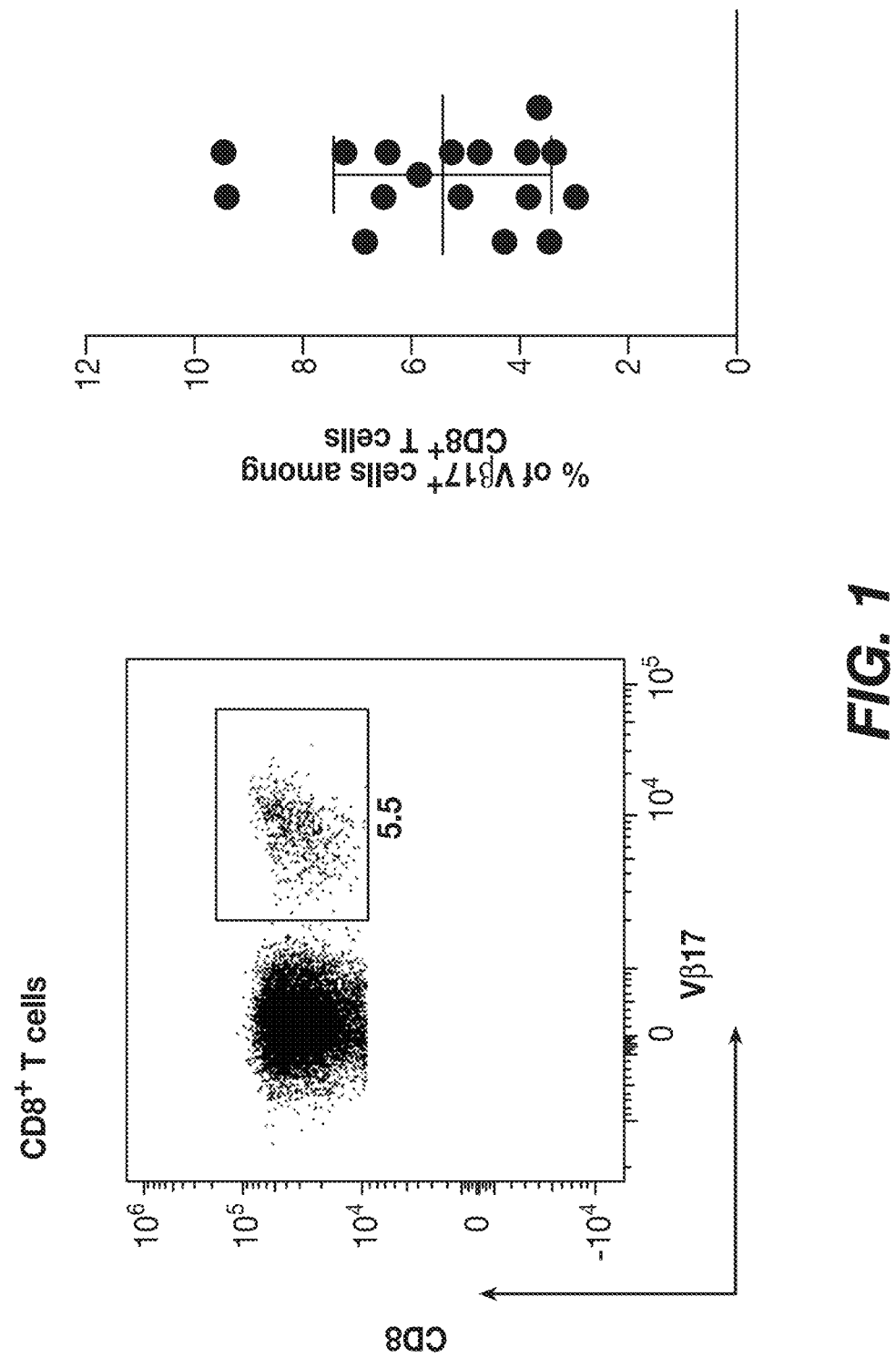

Specification includes a Sequence Listing.

Related U.S. Application Data filed on Aug. 10, 2020, provisional application No. 63/063,771, filed on Aug. 10, 2020, provisional application No. 63/063,801, filed on Aug. 10, 2020, provisional application No. 63/063,793, filed on Aug. 10, 2020, provisional application No. 63/063,749, filed on Aug. 10, 2020, provisional application No. 63/063,806, filed on Aug. 10, 2020.

(51) Int. Cl.
  *A61K 40/31* (2025.01)
  *A61K 40/42* (2025.01)
  *A61K 40/46* (2025.01)
  *C07K 14/55* (2006.01)
  *C12N 5/0783* (2010.01)

(52) U.S. Cl.
  CPC ...... *A61K 40/4217* (2025.01); *A61K 40/4276* (2025.01); *A61K 40/46* (2025.01); *C07K 14/55* (2013.01); *C12N 5/0638* (2013.01); *A61K 2239/48* (2023.05); *A61K 2239/58* (2023.05)

(58) Field of Classification Search
  CPC ............... C12N 5/0638; C12N 5/0636; C12N 2501/2302; C12N 2510/00; C12N 2760/16122; A61P 35/00
  See application file for complete search history.

(56) References Cited

U.S. PATENT DOCUMENTS

| | | |
|---|---|---|
| 5,128,326 A | 7/1992 | Balazs |
| 5,225,539 A | 7/1993 | Winter |
| 5,530,101 A | 6/1996 | Queen |
| 5,565,332 A | 10/1996 | Hoogenboom |
| 5,585,089 A | 12/1996 | Queen |
| 5,679,377 A | 10/1997 | Bernstein |
| 5,766,886 A | 6/1998 | Studnicka |
| 5,770,196 A | 6/1998 | Studnicka |
| 5,821,123 A | 10/1998 | Studnicka |
| 5,869,619 A | 2/1999 | Studnicka |
| 5,912,015 A | 6/1999 | Bernstein |
| 5,916,597 A | 6/1999 | Lee |
| 5,989,463 A | 11/1999 | Tracy |
| 6,054,297 A | 4/2000 | Carter |
| 6,075,181 A | 6/2000 | Kucherlapati |
| 6,084,087 A | 7/2000 | Friedman |
| 6,150,584 A | 11/2000 | Kucherlapati |
| 6,407,213 B1 | 6/2002 | Carter |
| 6,521,427 B1 | 2/2003 | Evans |
| 6,639,055 B1 | 10/2003 | Carter |
| 6,670,127 B2 | 12/2003 | Evans |
| 6,719,971 B1 | 4/2004 | Carter |
| 6,737,056 B1 | 5/2004 | Presta |
| 6,800,738 B1 | 10/2004 | Carter |
| 7,662,387 B2 | 2/2010 | Law et al. |
| 8,754,287 B2 | 6/2014 | MacDonald |
| 2005/0042664 A1 | 2/2005 | Wu |
| 2006/0286104 A1 | 12/2006 | Hanke |
| 2009/0130074 A1 | 5/2009 | Moser |
| 2009/0182127 A1 | 7/2009 | Kjaergaard |
| 2009/0307787 A1 | 12/2009 | Grosveld |
| 2010/0015133 A1 | 1/2010 | Igawa |
| 2010/0028637 A1 | 2/2010 | Tavsanli |
| 2010/0122358 A1 | 5/2010 | Brueggemann |
| 2011/0123532 A1 | 5/2011 | Gurney |
| 2012/0149876 A1 | 6/2012 | Von Kreudenstein |
| 2013/0195849 A1 | 8/2013 | Spreter Von Kreudenstein |
| 2013/0230540 A1 | 9/2013 | Holmes |
| 2015/0289489 A1 | 10/2015 | MacDonald |
| 2016/0053020 A1 | 2/2016 | Verploegen |
| 2016/0347858 A1 | 12/2016 | Sakamoto |
| 2017/0015738 A1 | 1/2017 | Pedersen |
| 2017/0088620 A1 | 3/2017 | Nioi |
| 2019/0231817 A1 | 8/2019 | Crooks |

FOREIGN PATENT DOCUMENTS

| | | |
|---|---|---|
| EP | 0519596 A1 | 12/1992 |
| EP | 0592106 A1 | 4/1994 |
| JP | 2006518753 A | 8/2006 |
| WO | 9105548 | 5/1991 |
| WO | 9109967 | 7/1991 |
| WO | 9311794 | 6/1993 |
| WO | 9317105 | 9/1993 |
| WO | 9404678 | 3/1994 |
| WO | 9620698 | 7/1996 |
| WO | 9915154 | 4/1999 |
| WO | 9920253 | 4/1999 |
| WO | 2004049794 | 6/2004 |
| WO | 2006003388 A2 | 1/2006 |
| WO | 2006028936 | 3/2006 |
| WO | 2006030220 A1 | 3/2006 |
| WO | 2011131746 A2 | 10/2011 |
| WO | 2015091823 | 6/2015 |
| WO | 2016073845 | 5/2016 |
| WO | 2018015340 | 1/2018 |
| WO | 2018223002 | 12/2018 |
| WO | 2019060425 | 3/2019 |
| WO | 2019091384 | 5/2019 |
| WO | 2020010250 | 1/2020 |
| WO | 2020142672 | 7/2020 |
| WO | 2020183245 | 9/2020 |
| WO | 2023152633 | 8/2023 |

OTHER PUBLICATIONS

Lehner (Lehner PJ, Wang EC, Moss PA, et al. Human HLA-A0201-restricted cytotoxic T lymphocyte recognition of influenza A is dominated by T cells bearing the V beta 17 gene segment. J Exp Med. 1995;181(1):79-91) (Year: 1995).*

Berg, Rance E, and James Forman. "The role of CD8 T cells in innate immunity and in antigen non-specific protection." Current opinion in immunology vol. 18,3 (2006): 338-43 (Year: 2006).*

Al-Lazikani et al., "Standard conformations for the canonical structures of immunoglobulins", J. Mol. Biol. 273:927-948 (1997).

Atwell et al. "Stable Heterodimers from Remodeling the Domain Interface of a Homodimer using a Phage Display Library," Journal of Molecular Biology, vol. 270, 1997, 26-35.

Baca, Manuel et al., "Antibody Humanization Using Monovalent Phage Display," Journal of Biogeological Chemistry, vol. 272, issue 16 (Apr. 18, 1997) pp. 10678-10684.

Brenner, Malcom K. et al., "Adoptive T Cell Therapy of Cancer," Current Opinion in Immunology, vol. 22, issue 2 (Apr. 2010) pp. 251-257.

Brown et al., "A Study of the Interactions Between an IgG-Binding Domain Based on the B Domain of *Staphylococcal* Protein A and Rabbit IgG", Mol. Biotech. 10:9-16, 1998.

Caldas, Christina et al., "Design and Synthesis of Germline-Based Hemi-Humanized Single-Chain Fv Against the CD18 Surface Antigen," Protein Engineering, Design & Selection, vol. 13, issue 5 (May 2000) pp. 353-360.

Carter, Paul. et al., "Humanization of an Anti-P185HER2 Antibody for Human Cancer therapy," Proceedings of the National Academy of Sciences of the United States of America, vol. 89, issue 10 (May 15, 1992) pp. 4285-4289.

Chothia et al., "Canonical Structures for the Hypervariable Regions of Immunoglobulins," Journal of Molecular Biology, vol. 196, issue 4 (Aug. 20, 1987) pp. 901-917.

Cooper et al., "Enhanced antilymphoma efficacy of CD 19-redirected influenza MP1-specific CTLs by cotransfer of T cells modified to present influenza MP1", Blood, (Feb. 15, 2005), vol. 105, No. 4, doi:10.1182/blood-2004-03-1208, pp. 1622-1631, XP055023669.

Couto, Joseph R. et al. "Anti-BA46 Monoclonal Antibody Mc3: Humanization Using a Novel Positional Consensus and in Vivo and in Vitro Characterization," Cancer Research, vol. 55, issue 8 (Apr. 15, 1995) pp. 1717-1722.

Couto, Joseph R. et al., "Designing Human Consensus Antibodies with Minimal Positional Templates," Cancer Research, vol. 55, issue 23 (Supplement) (Dec. 1, 1995) pp. 5973s-5977s.

(56) References Cited

OTHER PUBLICATIONS

Ferrara et al., "Modulation of Therapeutic Antibody Effector Functions by Glycosylation Engineering: Influence of Golgi Enzyme Localization Domain and Co-Expression of Heterolgous B1, 4-N-acetylglucosaminyltransferase III and Golgi m-mannodsidase II", Biotechnol Bioeng 93:851-861, 2006.
Ferrara et al., "The carbohydrate at FCYRIIIa Asn-162; An element required for high affinity binding to non-fucosylated IgG glycoforms", J Biol Chem 281:5032-5036, 2006.
Fransson J, et al. "Human framework adaptation of a mouse anti-human IL-13 antibody", J. Mol. Biol. 2010; 398:214-231.
Tamers-Casterman, C. et al., "Naturally Occurring Antibodies Devoid of Light Chains," Nature, vol. 363 (Jun. 3, 1993) pp. 446-448.
Howard Jennifer, Séverine Loizon, Christopher J Tyler, Dorothée Duluc, Bernhard Moser, Matthieu Mechain, Alexandre Duvignaud, Denis Malvy, Marita Troye-Blomberg, Jean-Francois Moreau, Matthias Eberl, Odile Mercereau-Puijalon, Julie Déchanet-Merville, Charlotte Behr, Maria Mamani-Matsuda , "The Antigen-Presenting Potential of Vy9V02 T Cells During Plasmodium falciparum Blood-Stage Infection", The Journal of Infectious Diseases, (May 15, 2017), vol. 215, No. 10, doi:10.1093/infdis/jix149, pp. 1569-1579, XP055907944.
International Search Report and Written Opinion issued in App. No. PCT/US2021/045143, dated Nov. 12, 2021, 9 pages.
Kabat et al., "Unusual distributions of amino acids in complementarity-determining (hypervariable) segments of heavy and light chains of immunoglobulins and their possible roles in specificity of antibody-combining sites", J. Biol. Chem. 252:6609-6616 (1977).
Kabat, Elivin A. "The Structural Basis of Antibody Complementarity," Adv. Prot. Chem. 32:1-75 (1978).
Kashmiri, Syed V S, et al., "SDR Grafting—A New Approach to Antibody Humanization," Methods, vol. 36, issue 1 (May 2005) pp. 25-34.
Kawasaki et al., "Presence of four major haplotypes in human BCMA gene: lack of association with systemic lupus erythematosus and rheumatoid arthritis", Genes Immun. 2:276-9, 2001.
Konno et al., "Fucose content of monoclonal antibodies can be controlled by culture medium osmolality for high antibody-dependent cellular cytotoxicity", Cytotechnology 64:249-65, 2012.
Lefranc et al., "IMGT unique numbering for immunoglobulin and T cell receptor variable domains and Ig superfamily V-like domains", Dev. Comp. Immunol. 27(1):55-77 (2003).
Morea et al., "Antibody Modeling: Implications for Engineering and Design," Methods, vol. 20, 2000; pp. 267-279.
Mori et al., "Engineering Chinese hamster ovary cells to maximize effector function of produced antibodies using FUT8 siRNA", Biotechnol Bioeng 88:901-908, 2004.
Olivier et al., "EB66 cell line, a duck embryonic stem cell-derived substrate for the industrial production of therapeutic monoclonal antibodies with enhanced ADCC activity", MAbs; 2(4), 2010.
Osborn, et al., "High-affinity IgG antibodies develop naturally in Ig-knockout rats carrying germline human IgH/Igk/Igl loci bearing the rat CH region", Journal of Immunology, vol. 190, pp. 1481-1490, (Jan. 2013).
Padlan, Eduardo A. "A Possible Procedure for Reducing the Immunogenicity of Antibody Variable Domains While Preserving Their Ligand-Binding Properties," Molecular Immunology, vol. 28, issues 4-5 (Apr./May 1991) pp. 489-498.
Padlan, Eduardo A. "Identification of Specificity-Determining Residues in Antibodies," Federation of American Sciences for Experimental Biology (FASEB), vol. 9, issue 1 (Jan. 1995) pp. 133-139.
Presta, L.G. et al., "Humanization of an Antibody Directed Against IgE," The Journal of Immunology, vol. 151, issue 5 (Sep. 1, 1993) pp. 2623-2632.
Roguska et al., "A Comparison of Two Murine Monoclonal Antibodies Humanized by CDR-Grafting and Variable Domain Resurfacing," Protein Engineering, Design & Selection, vol. 9, issue 10 (1996) pp. 895 904.
Roguska et al., "Humanization of Murine Monoclonal Antibodies Through Variable Domain Resurfacing," Proceedings of the National Academy of Sciences of the United States of America, vol. 91 (Feb. 1994) pp. 969-973.
Rosenberg et al., "Adoptive Cell Transfer: a Clinical Path to Effective Cancer Immunotherapy," Nature Reviews Cancer, vol. 8, issue 4 (Apr. 2008) pp. 299-308.
Ruella et al., "Next-Generation Chimeric Antigen Receptor T-Cell Therapy: Going off the Shelf," BioDrugs, vol. 31, issue 6 (Dec. 2017) pp. 473-481.
Sandhu, Jasbir Singh, "A Rapid Procedure for the Humanization of Monoclonal Antibodies," Gene, issue 150, issue 2 (1994) pp. 409-410.
Shields et al., "Lack of fucose on human IgG1 N-Linked oligosaccharide improves binding to human FCYRIII and antibody-dependent cellular toxicity", J Biol Chem 277:26733-26740, 2002.
Shinkawa et al., "The absence of fucose but not the presence of galactose or bisection N-Acetylglucosamine of human IgG1 complex-type oligosaccharides shows the critical role of enhancing antibody-dependent cellular cytotoxicity", J Biol Chem 278:3466-3473, 2003.
Sims, M. J. et al. "A Humanized CD18 Antibody Can Block Function Without Cell Destruction," The Journal of Immunology, vol. 151, issue 4 (Aug. 15, 1993) pp. 2296-2308.
Studnicka et al., "Human-Engineered Monoclonal Antibodies Retain Full Specific Binding Activity by Preserving Non-CDR Complementarity-Modulating Residues," Protein Engineering, Design & Selection, vol. 7, issue 6 (Jun. 1994) pp. 805-814.
Tan, Philip, et al., "Superhumanized' antibodies: reduction of immunogenic potential by complementarity-determining region grafting with human germline sequences: application to an anti-CD28," The Journal of Immunology, vol. 169, issue 2 (Jul. 15, 2022) pp. 1119 1125.
Ward, Sally E. et al., "Binding Activities of a Repertoire Of Single Immunoglobulin Variable Domains Secreted From *Escherichia coli*," Nature, vol. 341, issue 6242 (Oct. 1989) pp. 544-546.
Zhou et al., "Development of a simple and rapid method for producing non-fucosylated oligomannose containing antibodies with increased effector function", Biotechnol Bioeng 99:652-65, 2008.
Naumov Yuri N. et al: "A Class I MHC-Restricted Recall Response to a Viral Peptide Is Highly Polyclonal Despite Stringent CDR3 Selection: Implications for Establishing Memory T Cell Repertoires in "Real-World" Conditions", The Journal of Immunology, vol. 160, No. 6, Mar. 15, 1998 (Mar. 15, 1998), pp. 2842-2852, XP093190070, US ISSN: 0022-1767, DOI: 10.4049/jimmunol.160.6.2842 Retrieved from the Internet: URL:https://watermark.silverchair.com.
Lawson Thomas M et al: "Influenza A antigen exposure selects dominant Vbeta17+ TCR in human CD8+ cytotoxic T cell responses", International Immunology, Jan. 1, 2001 (Jan. 1, 2001), pp. 1373-1381, XP093190090.
Lawson Thomas M. et al: "Functional differences between influenza A-specific cytotoxic T lymphocyte clones expressing dominant and subdominant Tcr", International Immunology, vol. 13, No. 11, Nov. 1, 2001 (Nov. 1, 2001), pp. 1383-1390, XP093190087, GB ISSN: 0953-8178, DOI: 10.1093/intimm/13.11.1383.
Bozkus C. et al., "A T-cell-based immunogenicity protocol for evaluating human antigen-specific responses," STAR Protocols 2(3):100758, Sep. 17, 2021, pp. 1-18.
Kuvšynov A. et al., "Current Understanding of CAR T-Cell Therapy", Bulletin of Haematology (2019), vol. XV, No. 2, pp. 4-13.
Nikitin I. G. et al., "Caroli's Disease (Clinical Observation)," Russian Journal of Gastroenterology, Hepatology and Coloproctology, 2018, vol. 28, No. 6, pp. 77-83.
Šnajder N., "Creutzfeldt-Jakob Disease: A New View On An Old Problem (Clinic, Diagnosis, Prognosis And Treatment)," S.S. Korsakov Journal of Neurology and Psychiatry, 2013, pp. 61-69.
Zhou et al., "Dendritic Cells Efficiently Acquire And Present Antigen Derived From Lung Cancer Cells And Induce Antigen-Specific T-Cell Responses," Cancer Immunol Immunother (2003) 52: 413-422.

(56) References Cited

OTHER PUBLICATIONS

Dunbar et al., "Direct isolation, phenotyping and cloning of low-frequency antigen-specific cytotoxic T lymphocytes from peripheral blood" Current Biology (1998), vol. 8, No. 7, pp. 413-416.

* cited by examiner

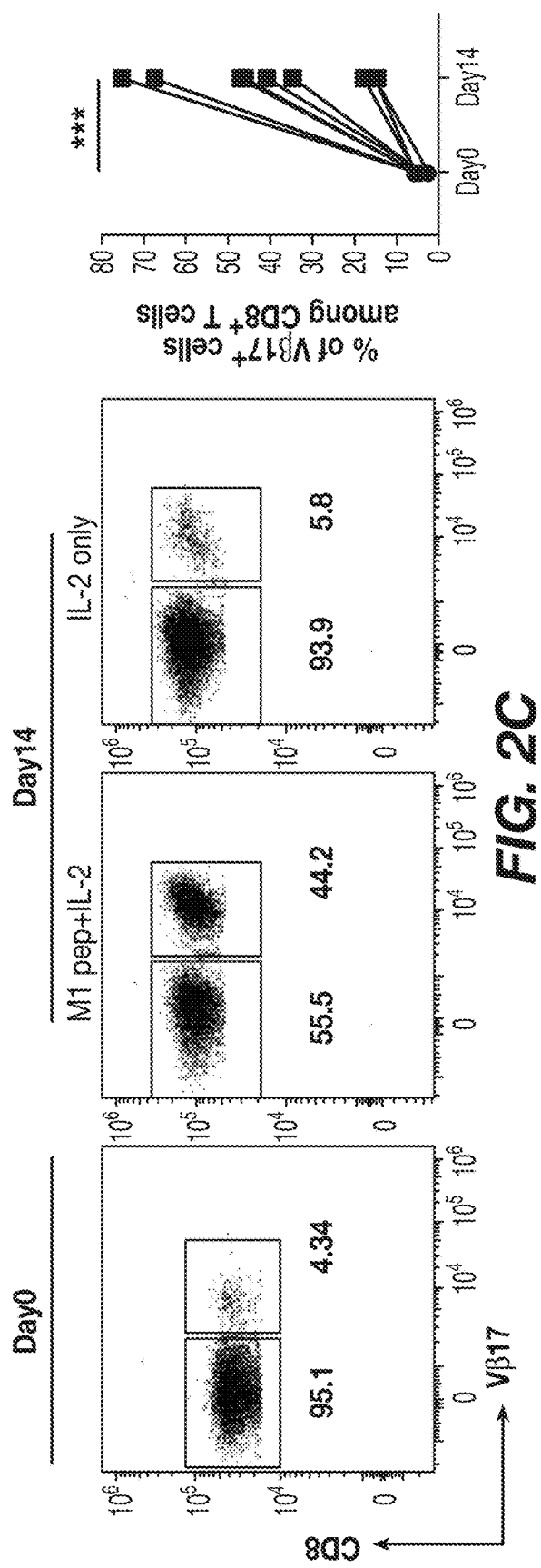
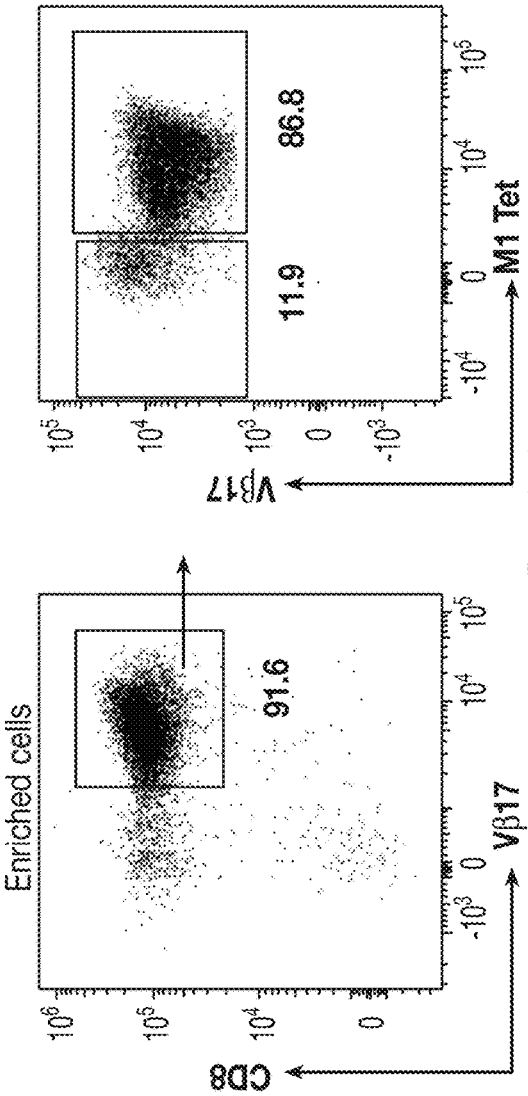
FIG. 2C
FIG. 2D

MATERIALS AND METHODS FOR PRODUCING BIOENGINEERED VIRUS SPECIFIC LYMPHOCYTES

CROSS-REFERENCE TO RELATED APPLICATIONS

This application claims the benefit of U.S. Ser. No. 63/063,749, filed Aug. 10, 2020; U.S. Ser. No. 63/063,771, filed Aug. 10, 2020; U.S. Ser. No. 63/063,784, filed Aug. 10, 2020; U.S. Ser. No. 63/063,793, filed Aug. 10, 2020; U.S. Ser. No. 63/063,801, filed Aug. 10, 2020; U.S. Ser. No. 63/063,806, filed Aug. 10, 2020; U.S. Ser. No. 63/063,811, filed Aug. 10, 2020, each of which is herein incorporated by reference in its entirety.

REFERENCE TO SEQUENCE LISTING SUBMITTED ELECTRONICALLY

This application contains a sequence listing, which is submitted electronically via EFS-Web as an ASCII formatted sequence listing with a file "14620-544-999 SEQ LISTING.txt" and a creation date of Jul. 26, 2021 and having a size of 8,047 bytes.

The sequence listing submitted via EFS-Web is part of the specification and is herein incorporated by reference in its entirety.

1. FIELD

Provided herein, in some embodiments, are bioengineered lymphocytes, such as a bioengineered T cell and processes for using the improved T cell. Methods for producing such T cells, including influenza specific $V\beta17^+CD8^+$ T cells and uses thereof, e.g., for making T cells expressing chimeric antigen receptors (CAR-T cells) are disclosed. Also provided herein, in certain embodiments, is a composition comprising the CAR-T cells and uses therefor treating a disease or disorder.

2. BACKGROUND

Adoptive transfer of immune cells genetically modified to recognize malignancy-associated antigens is showing promise as a new approach to treating cancer (see, e.g., Brenner et al, Current Opinion in Immunology, 22(2): 251-257 (2010); Rosenberg et al., Nature Reviews Cancer, 8(4): 299-308 (2008)). For example, genetically engineered T cells expressing chimeric antigen receptors (CARs) has emerged as one of the most powerful cancer treatments.

Conventionally, to generate clinical grade CAR-T cells, T cells are collected from the patient by leukapheresis (or peripheral blood), activated, transduced with CAR constructs using viral vectors, expanded, and then reinfused to the same patient after lymphodepleting chemotherapy as a single time treatment (see Ruella et al., BioDrugs, 31(6): 473-481 (2017)). In spite of the unprecedented treatment outcomes of CAR-T therapy, it is significantly limited by its autologous feature. For instant, T cells cannot be harvested from all of the patients, and the quality of T cells may not meet the standards of manufacturing. In addition, the conventional CAR-T therapy has intrinsic manufacturing issues, such as manufacturing failures, time delays, insufficient cell expansion, or heterogeneous products, which can be detrimental to the recipient patients. High costs are also unavoidable for such a highly personalized procedure. Therefore, there is a need for improved T cell therapies.

3. SUMMARY

In one aspect, provided herein is a method for activating or enriching Vβ17+CD8+ T cells, comprising contacting a M1 peptide derived from human influenza A virus ($M1_{58-66}$) with a population of cells comprising T cells.

In some embodiments, the M1 peptide comprises an amino acid sequence of GILGFVFTL (SEQ ID NO:1).

In some embodiments, the method further comprises contacting IL-2 with the population of the cells comprising the T cells.

In some embodiments, the population of the cells is cultured ex vivo in a medium comprising the M1 peptide and/or IL-2.

In some embodiments, the method comprises: (i) culturing the population of the cells ex vivo in a medium comprising the M1 peptide and IL-2; (ii) culturing the population of the cells ex vivo in a medium comprising the M1 peptide, and then culturing the population of the cells ex vivo in a medium comprising IL-2; or (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

In some embodiments, the population of the cells is cultured ex vivo for at least 1, 2, 3, 4, 5, 6, 7, 8, 9, 10, 11, 12, 13, or 14 days.

In some embodiments, the population of the cells is cultured ex vivo for 1-20, 2-18, 3-16, 4-14, 5-14, 6-14, 7-14, 8-14, 9-14, 10-14, 11-14, or 12-14 days.

In some embodiments, the population of the cells is a population of whole peripheral blood mononuclear cells (PBMCs). In some embodiments, the population of the whole PBMCs is from a healthy donor.

In some embodiments, the initial percent of the $V\beta17^+$ $CD8^+$ T cells in the CD8+ cells from the population of the cells is 2-10% of the CD8+ cells. In some embodiments, the initial percent of the $V\beta17^+CD8^+$ T cells in the CD8+ cells from the population of the cells is 3-8% of the CD8+ cells. In some embodiments, the initial percent of the $V\beta17^+CD8^+$ T cells in the CD8+ cells from the population of the cells is 4-6% of the CD8+ cells. In some embodiments, the initial percent of the $V\beta17^+CD8^+$ T cells in the CD8+ cells from the population of the cells is 4-5% of the CD8+ cells. In some embodiments, the initial percent of the $V\beta17^+CD8^+$ T cells in the CD8+ cells from the population of the cells is 5-6% of the CD8+ cells. In some embodiments, the initial percent of the $V\beta17^+CD8^+$ T cells in the CD8+ cells from the population of the cells is 5.5% of the CD8+ cells.

In some embodiments, the method increases the percent of the $V\beta17^+CD8^+$ T cells in the CD8+ cells from the population of the cells by at least 10%, 20%, 30%, 40%, 50%, 60%, 70%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the $V\beta17^+CD8^+$ T cells in the CD8+ cells; or wherein the method increases the percent of $V\beta17^+CD8^+$ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

In some embodiments, the method increases the percent of the $V\beta17^+CD8^+$ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17$^+$CD8$^+$ T cells in the CD8+ cells; or wherein the method increases the percent of Vβ17$^+$CD8$^+$ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

In some embodiments, the method further comprises isolating Vβ17$^+$CD8$^+$ T cells from the population of the cells after contacting the population of cells with the M1 peptide and/or IL-2.

In another aspect, provided herein is an isolated population of Vβ17$^+$CD8$^+$ T cells produced according to the method provided herein.

In another aspect, the percent of Vβ17$^+$CD8$^+$ T cells in the isolated population of the cells is more than 6%, 10%, 15%, 20%, 25%, 30%, 35%, 40%, 45%, 50%, 55%, 60%, 65%, 70%, 75%, 80%, 85%, or 90% of the isolated population of the cells. In some embodiments, the percent of Vβ17$^+$CD8$^+$ T cells in the isolated population of the cells is 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the isolated population of the cells. In some embodiments, at least part of the Vβ17$^+$CD8$^+$ T cells express a cell surface receptor capable of binding to the M1 peptide.

In another aspect, provided herein is a method for making a CAR-T cell, comprising: (i) obtaining the isolated population of cells comprising Vβ17$^+$CD8$^+$ T cells provided herein; and (ii) introducing a nucleic acid encoding a chimeric antigen receptor (CAR) into the Vβ17$^+$CD8$^+$ T cells. In some embodiments, the CAR comprises an extracellular domain, a transmembrane domain, and an intracellular domain. In some embodiments, the extracellular domain binds to an antigen expressed on a cancer cell. In some embodiments, the cancer cell is a blood cancer cell. In some embodiments, the cancer cell is a solid tumor cancer cell. In some embodiments, the antigen is CD123. In some embodiments, the antigen is PSMA.

In another aspect, provided herein is a CAR-T cell produced according to the method provided herein.

In another aspect, provided herein is a method for treating a disease or disorder in a subject comprising administering to the subject a therapeutically effective amount of the CAR-T cell provided herein. In some embodiments, the disease or disorder is cancer. In some embodiments, the cancer is blood cancer. In some embodiments, the cancer is solid tumor cancer. In some embodiments, the subject is a human subject in need thereof.

In yet another aspect, provided herein is a process for making a CAR-T cell, comprising: (i) a step of performing a function of obtaining the isolated population of cells comprising Vβ17$^+$CD8$^+$ T cells provided herein; and (ii) a step of performing a function of expressing a CAR in the Vβ17$^+$CD8$^+$ T cell.

In yet another aspect, provided herein is a system comprising a first means capable of binding an antigen on the surface of a cancer cell; and a second means capable of reducing alloreactivity against a donor T cell. In some embodiments, the first means capable of binding an antigen on the surface of a cancer cell comprises a CAR expressed by the CAR-T cell provided herein. In some embodiments, the second means capable of reducing alloreactivity against the donor T cell comprises a Vβ17$^+$CD8$^+$ T cell.

In yet another aspect, provided herein is a T cell comprising a first means capable of binding an antigen on the surface of a cancer cell and a second means capable of binding a M1 peptide comprising an amino acid sequence of SEQ ID NO:1. In some embodiments, the T cell is a Vβ17$^+$CD8$^+$ T cell. In some embodiments, the first means capable of binding an antigen on the surface of a cancer cell comprises a CAR expressed by the CAR-T cell provided herein. In some embodiments, the second means capable of binding the M1 peptide comprises a T cell receptor (TCR) capable of binding the M1 peptide.

4. BRIEF DESCRIPTION OF THE FIGURES

FIG. 1 shows the prevalence of Vβ17$^+$CD8$^+$ T cells among whole peripheral blood mononuclear cells (PBMCs) of healthy individuals. Number in the indicated fluorescence-activated cell sorting (FACS) plot refers to the frequency of Vβ17$^+$ cells among CD8$^+$ T cells. Dot plot graph indicates the mean (±SEM) frequency of Vβ17$^+$ cells among total CD8$^+$ T cells of both HLA-A2$^+$ and HLA-A2$^-$ healthy individuals. Each dot represents the data from a healthy donor.

Figure 2A:
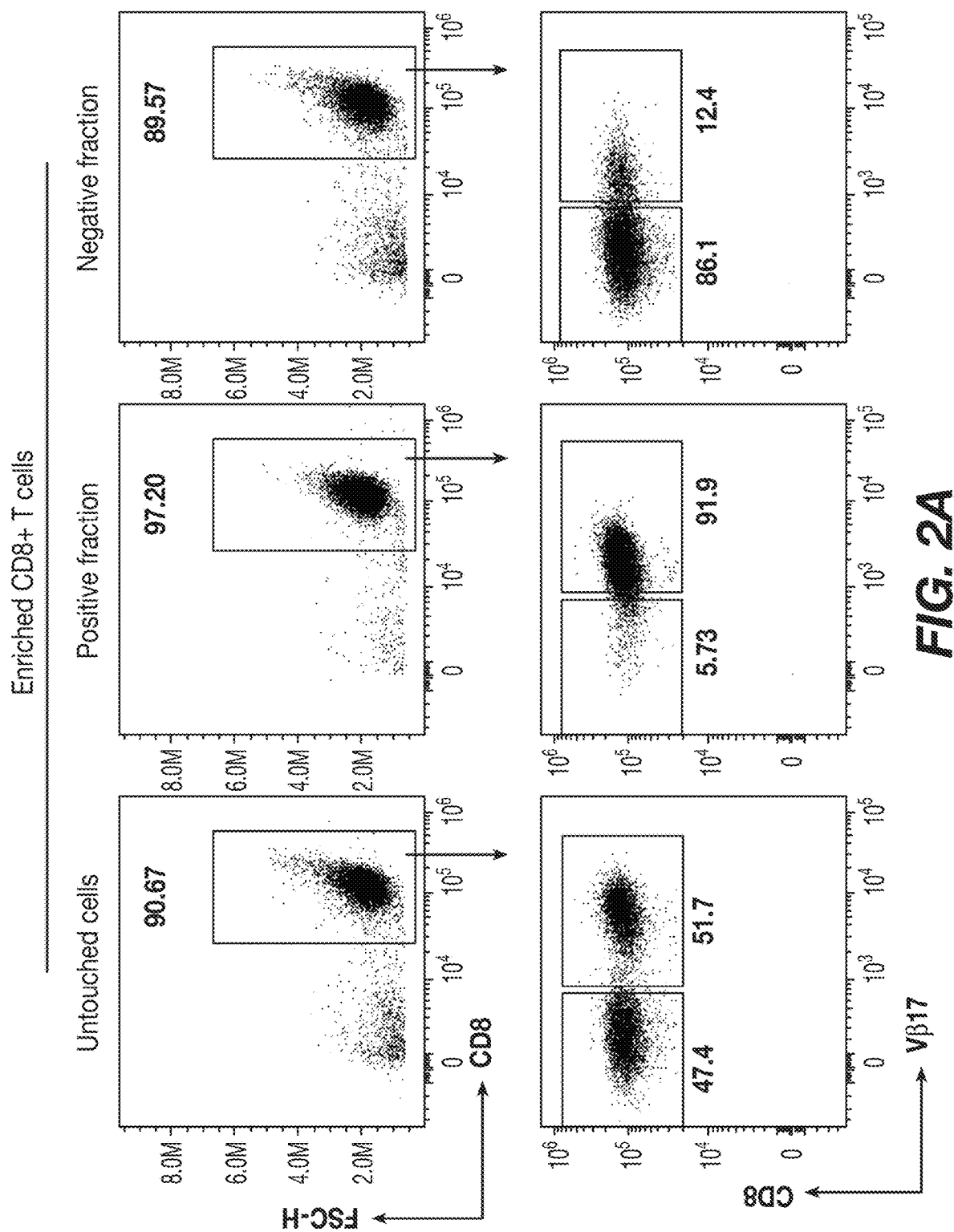
Figure 2B:
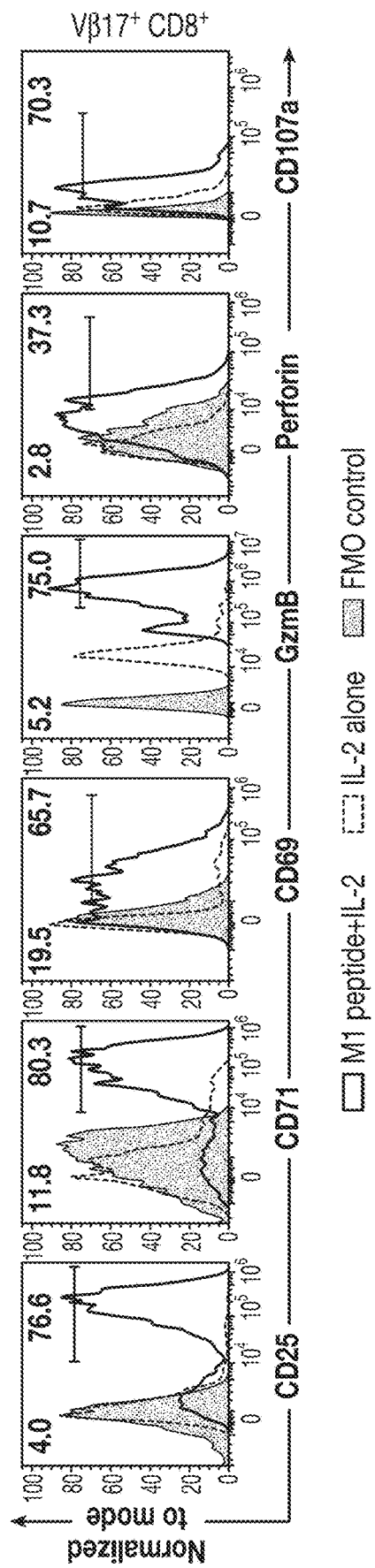

FIGS. 2A-2D show that Vβ17$^+$CD8$^+$ T cells are influenza-A specific and can be activated and expanded ex-vivo. FIG. 2A illustrates the selective enrichment of Vβ17$^+$CD8$^+$ T cells from whole PBMCs stimulated with M1 peptide and IL-2. Vβ17$^+$ T cells were positively isolated from negatively enriched CD8$^+$ T cells from whole PBMCs that were stimulated with M1 peptide and IL-2 for 12 days. Values above the gates in representative dot plots refer to the frequency of CD8$^+$ T cells among untouched (left), positive (middle) and negative (right) fractions of Vβ17$^+$ cell isolation protocol. Numbers in lower row refer to Vβ17$^-$ CD8$^+$ and Vβ17$^+$ CD8$^+$ T cells among enriched CD8$^+$ T cells in untouched (left), positive (middle) and negative (right) fractions of Vβ17$^+$ cell isolation protocol. FIG. 2B illustrates histogram overlays, where the numbers refer to the frequency of Vβ17$^+$CD8$^+$ T cells positive for activation markers (CD25, CD71, CD69) and intracellular effector molecules (Granzyme B, Perforin and CD107a) that were cultured in the presence of M1 peptide and IL-2 or IL-2 alone. Thick and dotted open histograms refer to Vβ17$^+$CD8$^+$ T cells from M1 peptide plus IL-2 versus IL-2 alone culture conditions, respectively. Representative data from 2 independent experiments are shown here for FIG. 2B. Closed grey histogram mirrors fluorescence minus one (FMO) control. FIG. 2C illustrates representative FACS plots which show the frequency of Vβ17$^+$ cells among CD8$^+$ T cells on day 0 (left) and day 14 (middle) of the stimulation. Numbers below gates represent the frequency of gated population among total CD8$^+$ T cells. Graph (right) summarizes the frequency of Vβ17$^+$ cells among CD8$^+$ T cells of whole PBMCs from healthy individuals on day 0 and 14 of the M1 peptide stimulation. Each dot represents the data from a healthy donor. Representative data of 9 donors from 8 independent experiments are shown in FIG. 2C. FIG. 2D (left) illustrates the abundance of enriched Vβ17$^+$CD8$^+$ T cells from day 12 of PBMC culture that was stimulated with M1 peptide and IL-2. FIG. 2D (right) illustrates the frequency of M1 peptide loaded Tetramer Vβ17$^+$ and M1 peptide loaded Tetramer$^+$ Vβ17⁺ cells among enriched Vβ17⁺CD8⁺ T cells. Tet stands for tetramer. Representative data from 2 independent experiments are shown.

Figure 3:
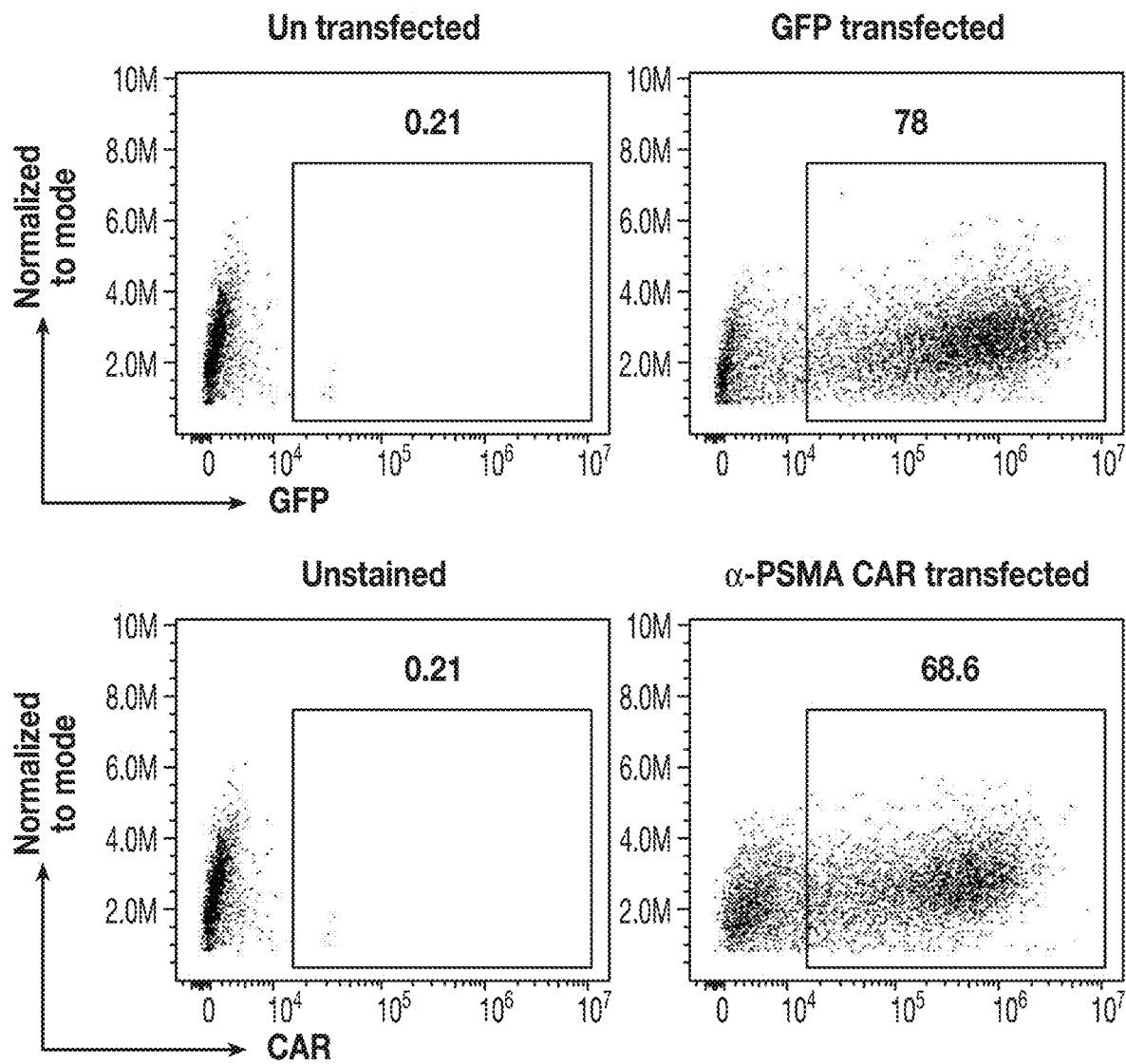

FIG. 3 shows that Vβ17⁺CD8⁺ T cells can be efficiently transfected with anti-tumor associate antigen (TAA) chimeric antigen receptor (CAR) message RNA (mRNA) constructs. Enriched Vβ17⁺CD8⁺ T cells were transfected with mRNA encoding anti-CD123/PSMA CAR constructs, as described in detail in example section below. Numbers above the gates in the representative FACS plots refer to the frequency of cells negative or positive for GFP (upper) and CAR surface expression (lower).

Figure 4A:
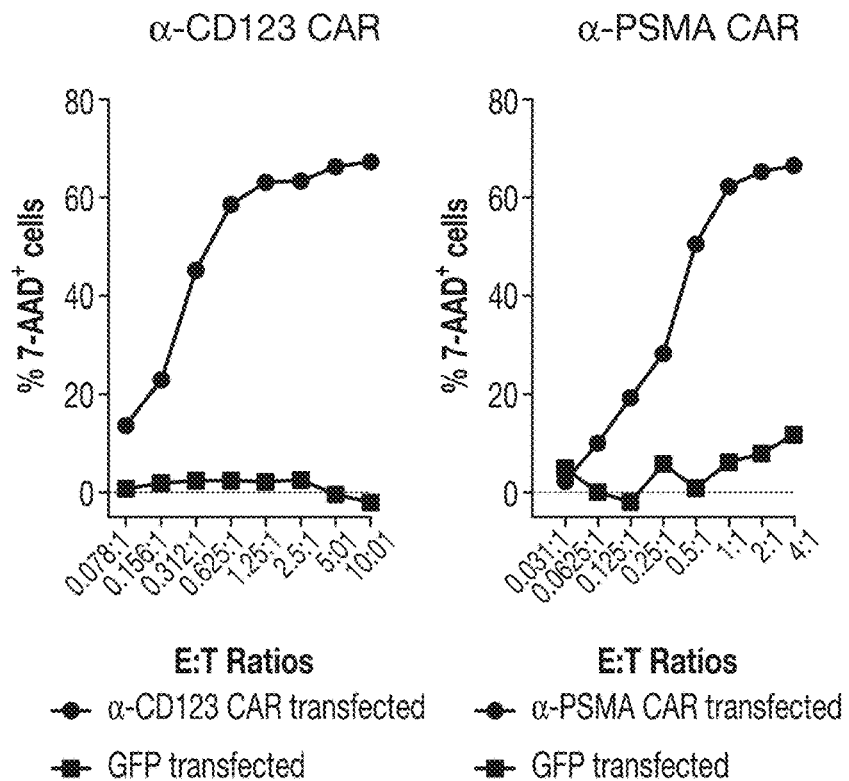
Figure 4B:
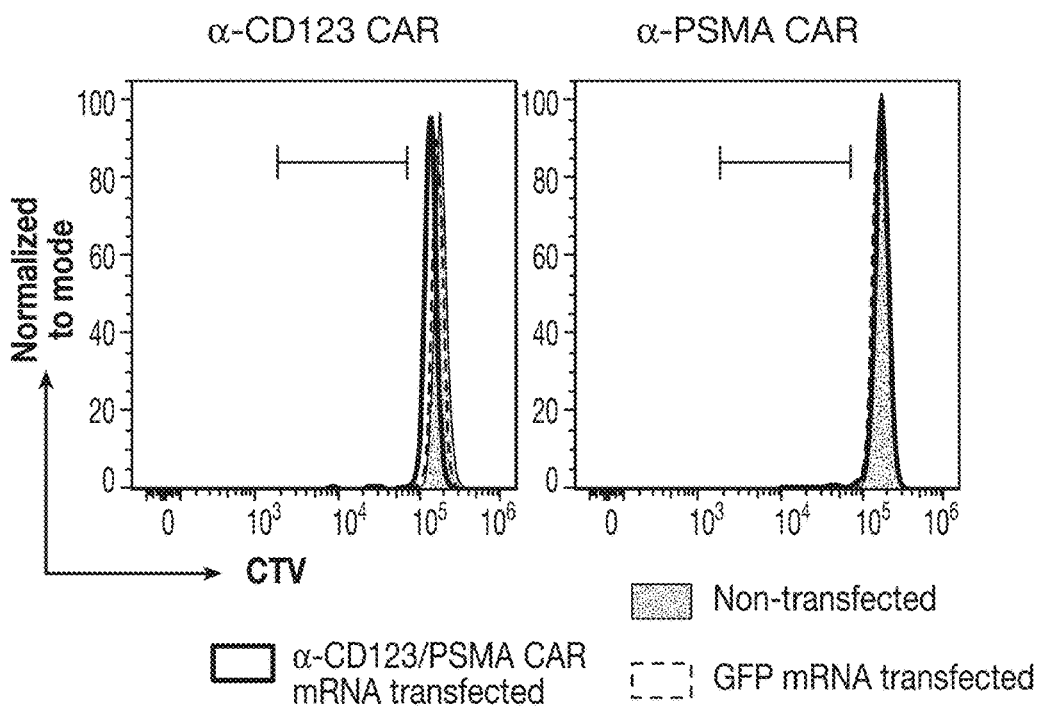
Figure 4C:
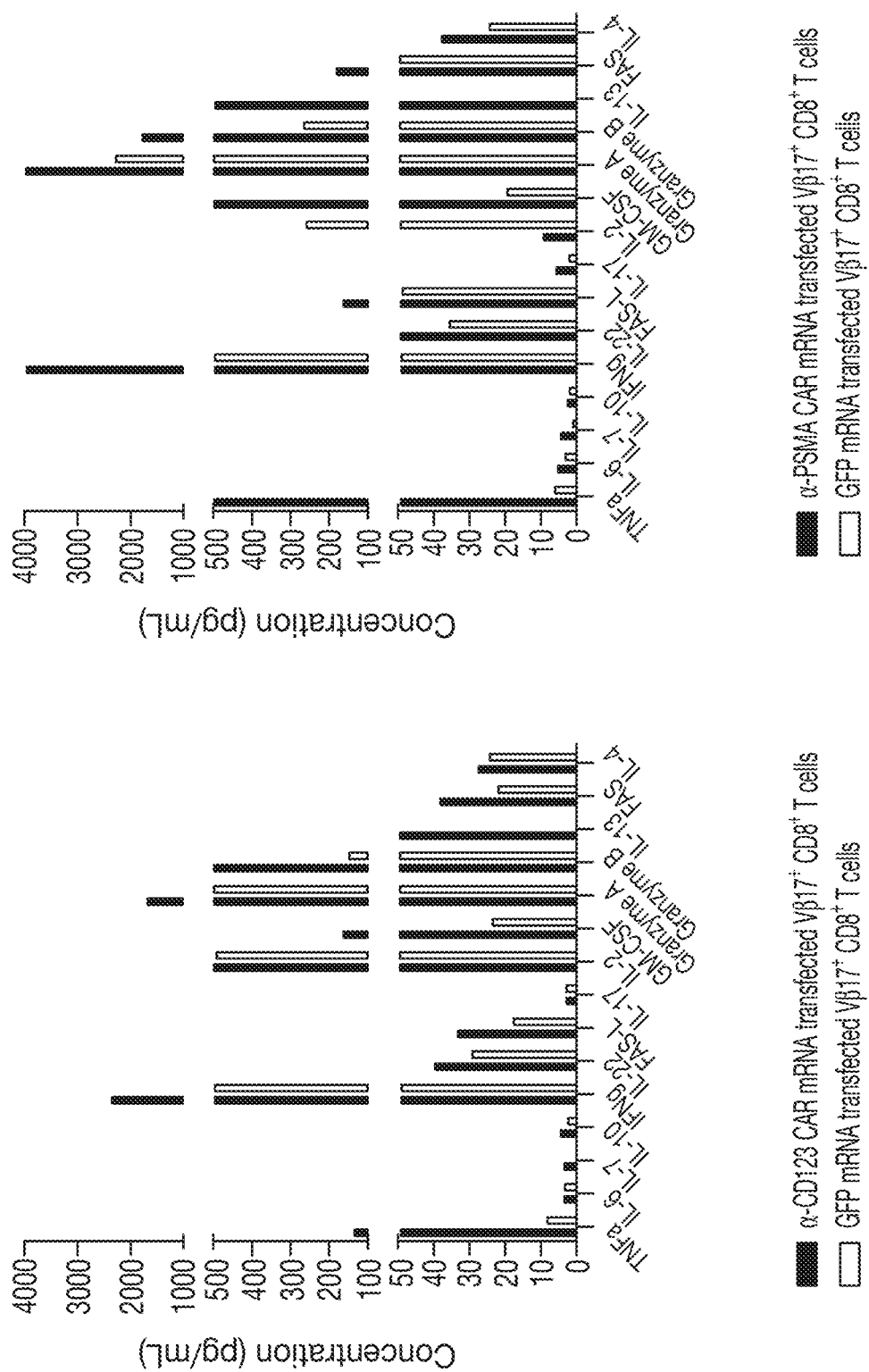
Figure 4D:
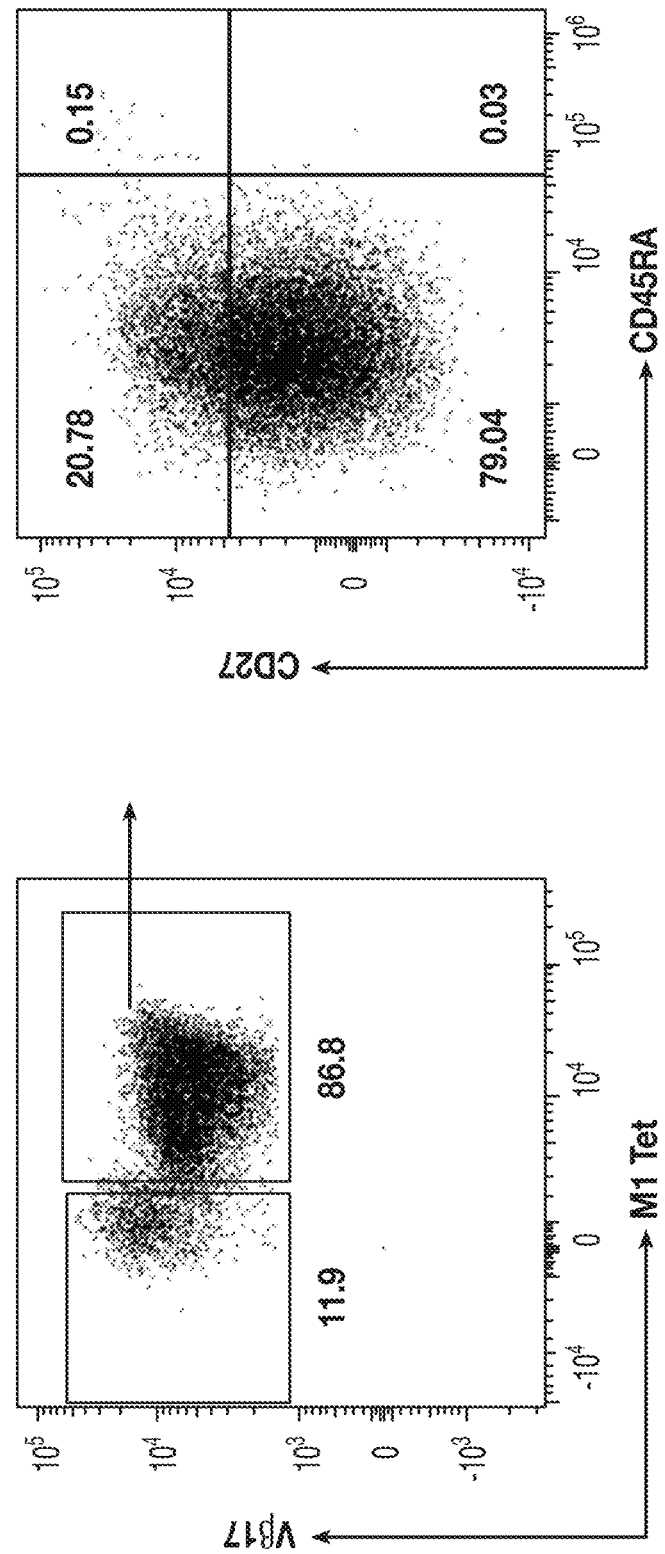

FIGS. 4A-4D show that CAR mediated redirection of Vβ17⁺CD8⁺ T cells effectively eliminates liquid and solid tumors. FIG. 4A illustrates CD8⁺ T cells were enriched from whole PBMCs (from HLA*0201 donor) stimulated with M1 peptide and IL-2 for 12 days. Enriched CD8⁺ T cells were further enriched for Vβ17⁺ cells and then transfected with either GFP, anti-CD123 CAR mRNA construct, or anti-PSMA CAR mRNA construct. CAR transfected Vβ17⁺ CD8⁺ T cells (effectors) were co-cultured with respective carboxyfluorescein diacetate succinimidyl ester (CFSE) labelled target cells at indicated effector to target ratio (ET ratios) for 24 hours (for Kasumi-3) and 72 hours (for 22Rv1 cells) at 37° C. in a humidified $CO_2$ incubator. Target cell lysis was determined by the 7-amino actinomycin D (7-AAD) staining and flow cytometry. Circles and squares in the representative graphs depict the frequency of target cell lysis mediated by anti-CD123 CAR (left) or anti-PSMA CAR (right) and GFP transfected Vβ17⁺CD8⁺ T effector cells respectively at the indicated ET ratios. FIG. 4B illustrates representative histogram overlays. The gates refer to frequency of effector cells positive for CellTrace™ Violet (CTV) dilution (proliferation) upon their co-culture with respective target cells (at 1:1 ET ratio) on day 5 of the co-culture. Dotted open histogram and closed histogram refer to GFP transfected effector cells and non-transfected effector cell respectively that were co-cultured with respective target cells. FIG. 4C illustrates the concentrations of cytokines (pg/mL) from the cell culture supernatants from FIG. 4A. Black and grey bars refer to the concentrations of cytokines/effector molecules produced by the anti-CD123/ PSMA CAR and GFP transfected effector cells respectively upon their co-culture with target cells. Representative experiment is shown here from one donor for FIG. 4A and FIG. 4C and two donors for FIG. 4B from one and two independent experiments respectively. FIG. 4D (left) illustrates day-12 enriched Vβ17⁺CD8⁺ T cells being stained with M1 peptide loaded MEW class I tetramers and anti-human Vβ17 mAbs. FIG. 4D (right) illustrates the representative dot plot showing the abundance of M1 Ter Vβ17⁺ and M1 Tet⁺Vβ17⁺ cells among enriched Vβ17⁺CD8⁺ T cells. Numbers in the quadrants refer to the percentages of cells positive for respective markers of differentiation of M1 Tee Vβ17⁺ cells (Naïve: CD27⁺CD45RA⁺; Central memory (Tom): CD27⁺CD45RA⁻; Effector Memory (TEM): CD27⁻CD45RA⁻; Effector memory cells that re-express CD45RA (EMRA) ($T_{EMRA}$): CD45RA⁺CD27⁻). Representative data of two independent donor data from two independent experiments are shown for FIG. 4D.

Figure 5A:
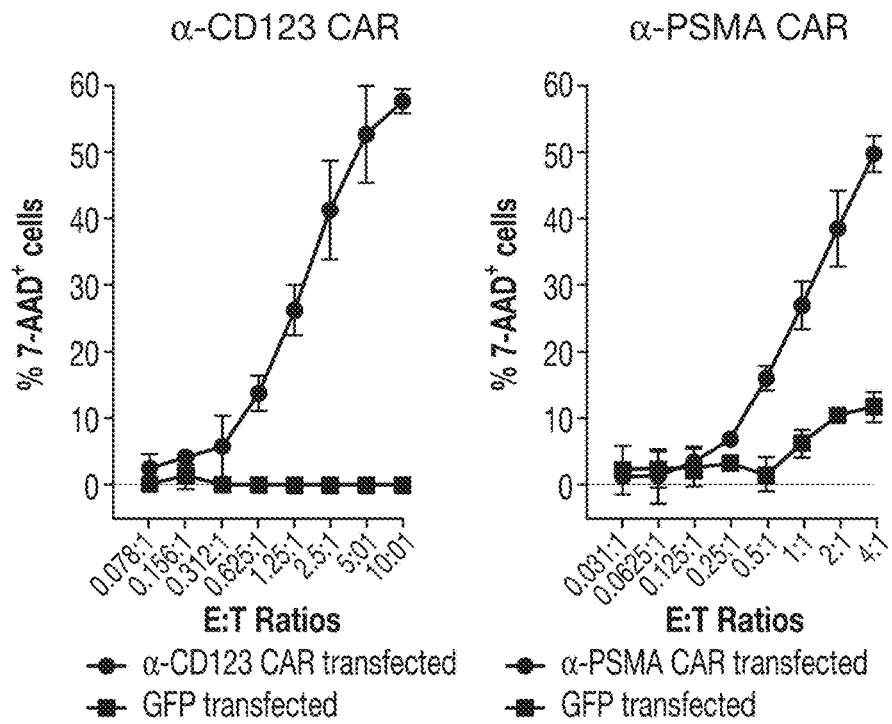
Figure 5B:
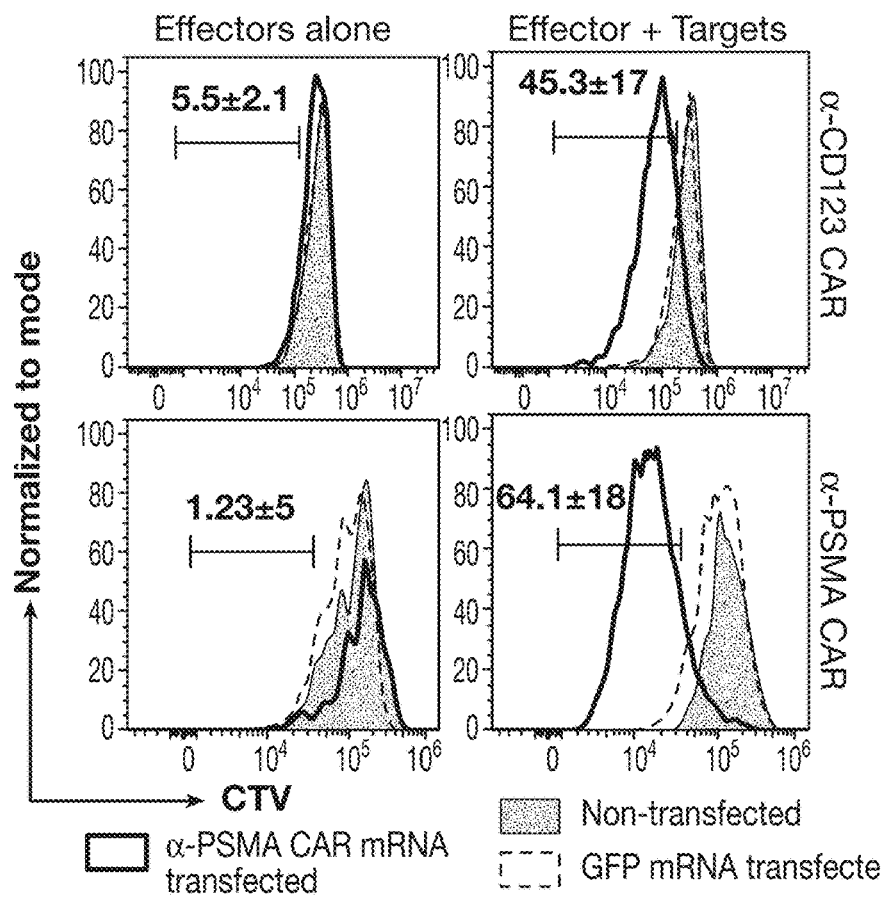
Figure 5C:
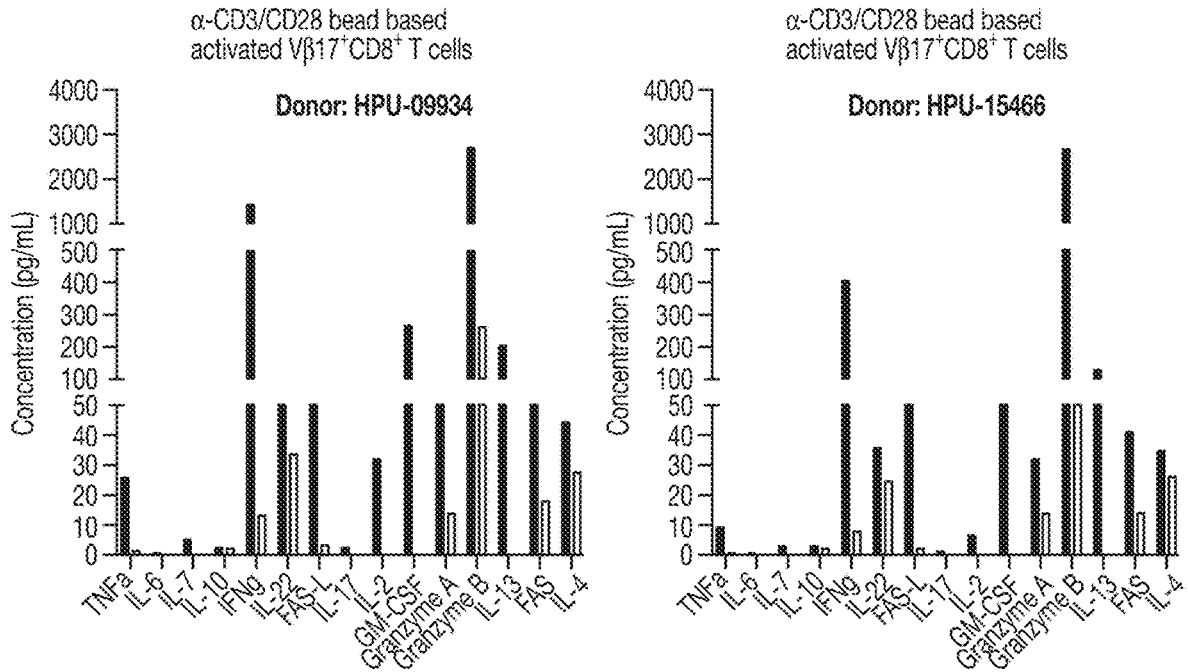
Figure 5C:
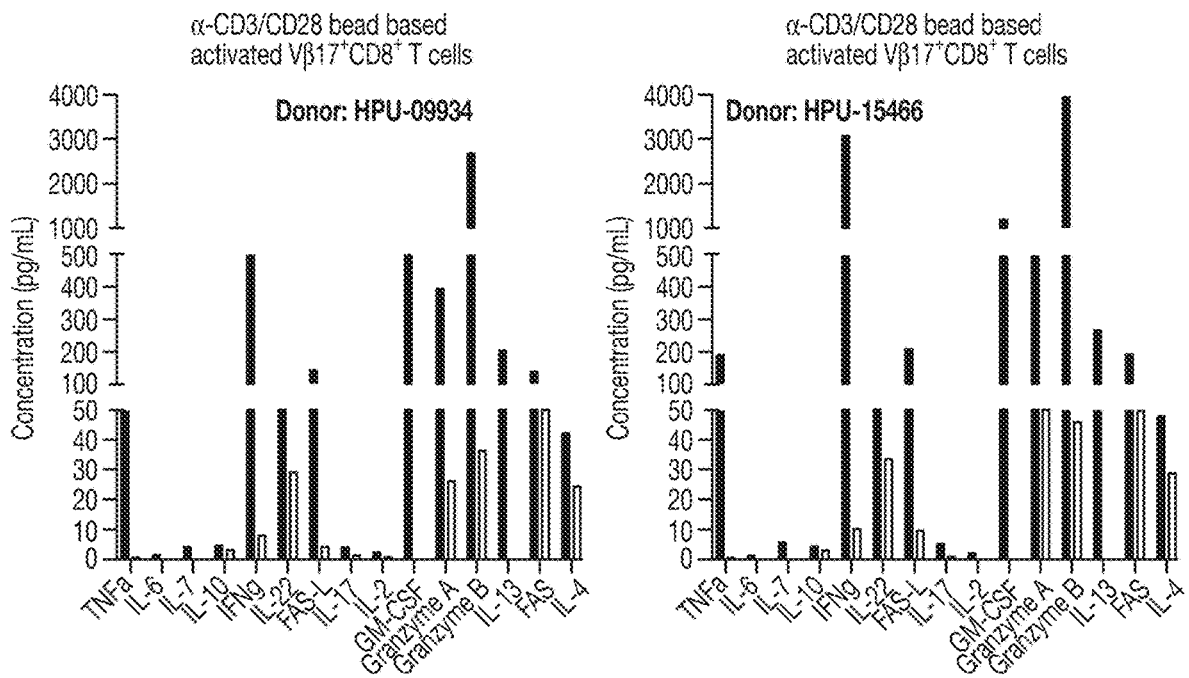
Figure 5D:
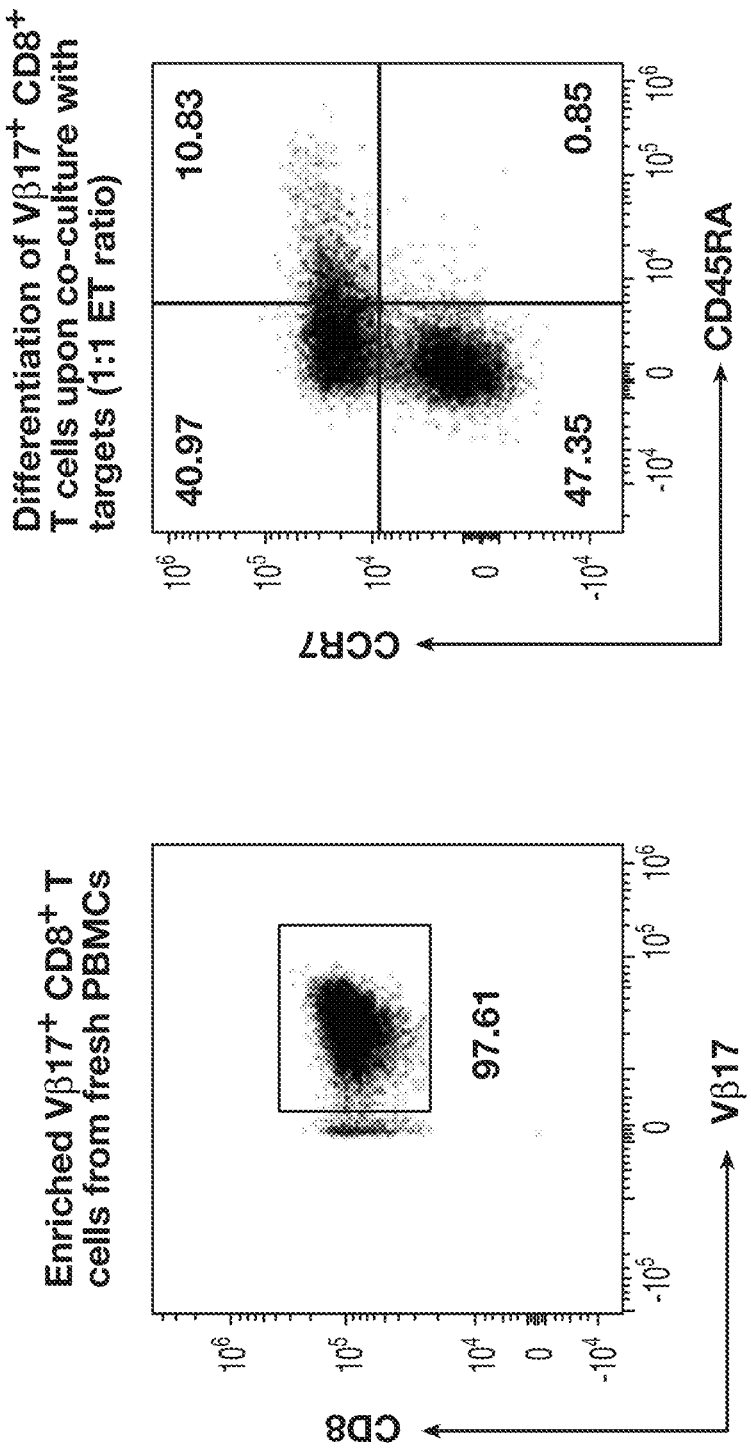

FIGS. 5A-5D show that CAR mediated effector profile of Vβ17⁺CD8⁺ T cells. Vβ17⁺CD8⁺ T cells were enriched from whole PBMCs of a healthy individual (Indian origin) and transfected with anti-CD123 or PSMA CAR mRNA. Anti-CD123 or PSMA CAR transfected Vβ17⁺CD8⁺ T cells (effectors) were co-cultured with CFSE labelled target cells at indicated ET ratios for 24 hours (for Kasumi-3) and 72 hours (for 22Rv1 cells) at 37° C. in a humidified $CO_2$ incubator. Target cell lysis was determined by the 7-AAD staining and flow cytometry. FIG. 5A illustrates measurements of cell lysis. Circles and squares in the representative graphs depict the mean (SEM) frequency of target cell lysis mediated by anti-CD123 (left) or anti-PSMA (right) CAR and GFP transfected Vβ17⁺CD8⁺ effector T cells respectively at the indicated ET ratios. FIG. 5B illustrates representative histogram overlays. Numbers above the gates refer to mean (SEM) frequency of effector cells positive for CTV dilution (proliferation) upon their co-culture with respective target cells on day 5 of the co-culture. Dotted open histogram and closed histogram refer to GFP transfected effector cells and non-transfected effector cell respectively that were co-cultured with respective target cells. FIG. 5C illustrates concentrations of cytokines/effector molecules (pg/mL) from the cell culture supernatants from FIG. 5A. Black and grey bars refer to the concentrations of cytokines/effector molecules produced by the effector cells transfected by anti-CD123 CAR, anti-PSMA CAR, or GFP, respectively upon their co-culture with target cells. Values shown here were cumulative values from two independent donors from two independent experiments. FIG. 5D (left) illustrates the frequency of Vβ17⁺CD8⁺ T cells that were enriched from fresh PBMCs. FIG. 5D (right) illustrates differentiation status of Vβ17⁺CD8⁺ T cells upon co-culture with target cells. Numbers in the quadrants refer to the cells positive for respective markers of differentiation of Vβ17⁺CD8⁺ T cells that were transfected with CAR and co-cultured with target cells at the ET ratio of 1:1 (Naïve: CCR7⁺CD45RA⁺; Central memory (TcM): CCR7⁺CD45RA⁻; Effector Memory (TEM): CCR7⁻CD45RA⁻; EMRA ($T_{EMRA}$): CD45RA⁺CCR7⁻). Representative data of two independent donor data from one independent experiment are shown for FIG. 5D.

5. DETAILED DESCRIPTION

The present disclosure is based, in part, on novel methods or processes for producing Vβ17⁺CD8⁺ T cells and their advantageous properties, and the uses thereof for making cellular therapies for treating a disease or disorder.

5.1. Definitions

Techniques and procedures described or referenced herein include those that are generally well understood and/or commonly employed using conventional methodology by those skilled in the art, such as, for example, the widely utilized methodologies described in Sambrook et al., Molecular Cloning: A Laboratory Manual (3d ed. 2001); Current Protocols in Molecular Biology (Ausubel et al. eds., 2003); Therapeutic Monoclonal Antibodies: From Bench to Clinic (An ed. 2009); Monoclonal Antibodies: *Methods and Protocols* (Albitar ed. 2010); and *Antibody Engineering* Vols 1 and 2 (Kontermann and Dilbel eds., 2d ed. 2010). Unless otherwise defined herein, technical and scientific terms used in the present description have the meanings that are commonly understood by those of ordinary skill in the art. For purposes of interpreting this specification, the following description of terms will apply and whenever appropriate, terms used in the singular will also include the plural and vice versa. In the event that any description of a term set forth conflicts with any document incorporated herein by reference, the description of the term set forth below shall control.

The term "antibody," "immunoglobulin," or "Ig" is used interchangeably herein, and is used in the broadest sense and specifically covers, for example, monoclonal antibodies (including agonist, antagonist, neutralizing antibodies, full length or intact monoclonal antibodies), antibody compositions with polyepitopic or monoepitopic specificity, polyclonal or monovalent antibodies, multivalent antibodies, multispecific antibodies (e.g., bispecific antibodies so long as they exhibit the desired biological activity), formed from at least two intact antibodies, single chain antibodies, and fragments thereof (e.g., domain antibodies), as described below. An antibody can be human, humanized, chimeric and/or affinity matured, as well as an antibody from other species, for example, mouse, rabbit, llama, etc. The term "antibody" is intended to include a polypeptide product of B cells within the immunoglobulin class of polypeptides that is able to bind to a specific molecular antigen and is composed of two identical pairs of polypeptide chains, wherein each pair has one heavy chain (about 50-70 kDa) and one light chain (about 25 kDa), each amino-terminal portion of each chain includes a variable region of about 100 to about 130 or more amino acids, and each carboxy-terminal portion of each chain includes a constant region. See, e.g., *Antibody Engineering* (Borrebaeck ed., 2d ed. 1995); and Kuby, *Immunology* (3d ed. 1997). Antibodies also include, but are not limited to, synthetic antibodies, recombinantly produced antibodies, single domain antibodies including from Camelidae species (e.g., llama or alpaca) or their humanized variants, intrabodies, anti-idiotypic (anti-Id) antibodies, and functional fragments (e.g., antigen-binding fragments) of any of the above, which refers to a portion of an antibody heavy or light chain polypeptide that retains some or all of the binding activity of the antibody from which the fragment was derived. Non-limiting examples of functional fragments (e.g., antigen-binding fragments) include single-chain Fvs (scFv) (e.g., including monospecific, bispecific, etc.), Fab fragments, F(ab') fragments, F(ab)$_2$ fragments, F(ab')$_2$ fragments, disulfide-linked Fvs (dsFv), Fd fragments, Fv fragments, diabody, triabody, tetrabody, and minibody. In particular, antibodies provided herein include immunoglobulin molecules and immunologically active portions of immunoglobulin molecules, for example, antigen-binding domains or molecules that contain an antigen-binding site that binds to an antigen (e.g., one or more CDRs of an antibody). Such antibody fragments can be found in, for example, Harlow and Lane, *Antibodies: A Laboratory Manual* (1989); *Mol. Biology and Biotechnology: A Comprehensive Desk Reference* (Myers ed., 1995); Huston et al., 1993, Cell Biophysics 22:189-224; Pluckthun and Skerra, 1989, Meth. Enzymol. 178:497-515; and Day, *Advanced Immunochemistry* (2d ed. 1990). The antibodies provided herein can be of any class (e.g., IgG, IgE, IgM, IgD, and IgA) or any subclass (e.g., IgG1, IgG2, IgG3, IgG4, IgA1, and IgA2) of immunoglobulin molecule. Antibodies may be agonistic antibodies or antagonistic antibodies. Antibodies may be neither agonistic nor antagonistic.

An "antigen" is a structure to which an antibody can selectively bind. A target antigen may be a polypeptide, carbohydrate, nucleic acid, lipid, hapten, or other naturally occurring or synthetic compound. In some embodiments, the target antigen is a polypeptide. In certain embodiments, an antigen is associated with a cell, for example, is present on or in a cell.

An "intact" antibody is one comprising an antigen-binding site as well as a CL and at least heavy chain constant regions, CH1, CH2 and CH3. The constant regions may include human constant regions or amino acid sequence variants thereof. In certain embodiments, an intact antibody has one or more effector functions.

"Single-chain Fv" also abbreviated as "sFv" or "scFv" are antibody fragments that comprise the VH and VL antibody domains connected into a single polypeptide chain. Preferably, the sFv polypeptide further comprises a polypeptide linker between the VH and VL domains which enables the sFv to form the desired structure for antigen binding. For a review of the sFv, see Pluckthun in The Pharmacology of Monoclonal Antibodies, vol. 113, Rosenburg and Moore eds., Springer-Verlag, New York, pp. 269-315 (1994).

The terms "binds" or "binding" refer to an interaction between molecules including, for example, to form a complex. Interactions can be, for example, non-covalent interactions including hydrogen bonds, ionic bonds, hydrophobic interactions, and/or van der Waals interactions. A complex can also include the binding of two or more molecules held together by covalent or non-covalent bonds, interactions, or forces. The strength of the total non-covalent interactions between a single antigen-binding site on an antibody and a single epitope of a target molecule, such as an antigen, is the affinity of the antibody or functional fragment for that epitope. The ratio of dissociation rate (koff) to association rate (kon) of a binding molecule (e.g., an antibody) to a monovalent antigen (koff/kon) is the dissociation constant KD, which is inversely related to affinity. The lower the KD value, the higher the affinity of the antibody. The value of KD varies for different complexes of antibody and antigen and depends on both kon and koff. The dissociation constant KD for an antibody provided herein can be determined using any method provided herein or any other method well known to those skilled in the art. The affinity at one binding site does not always reflect the true strength of the interaction between an antibody and an antigen. When complex antigens containing multiple, repeating antigenic determinants, such as a polyvalent antigen, come in contact with antibodies containing multiple binding sites, the interaction of antibody with antigen at one site will increase the probability of a reaction at a second site. The strength of such multiple interactions between a multivalent antibody and antigen is called the avidity.

In connection with the binding molecules described herein terms such as "bind to," "that specifically bind to," and analogous terms are also used interchangeably herein and refer to binding molecules of antigen binding domains that specifically bind to an antigen, such as a polypeptide. A binding molecule or antigen binding domain that binds to or specifically binds to an antigen can be identified, for example, by immunoassays, Octet®, Biacore®, or other techniques known to those of skill in the art. In some embodiments, a binding molecule or antigen binding domain binds to or specifically binds to an antigen when it binds to an antigen with higher affinity than to any cross-reactive antigen as determined using experimental techniques, such as radioimmunoassay (MA) and enzyme linked immunosorbent assay (ELISA). Typically, a specific or selective reaction will be at least twice background signal or noise and may be more than 10 times background. See, e.g., Fundamental Immunology 332-36 (Paul ed., 2d ed. 1989) for a discussion regarding binding specificity. In certain embodiments, the extent of binding of a binding molecule or antigen binding domain to a "non-target" protein is less than about 10% of the binding of the binding molecule or antigen binding domain to its particular target antigen, for example, as determined by FACS analysis or MA. A binding molecule or antigen binding domain that binds to an antigen includes one that is capable of binding the antigen with sufficient affinity such that the binding molecule is useful, for example, as a therapeutic and/or diagnostic agent in targeting the antigen. In certain embodiments, a binding molecule or antigen binding domain that binds to an antigen has a dissociation constant (KD) of less than or equal to 800 nM, 600 nM, 550 nM, 500 nM, 300 nM, 250 nM, 100 nM, 50 nM, 10 nM, 5 nM, 4 nM, 3 nM, 2 nM, 1 nM, 0.9 nM, 0.8 nM, 0.7 nM, 0.6 nM, 0.5 nM, 0.4 nM, 0.3 nM, 0.2 nM, or 0.1 nM. In certain embodiments, a binding molecule or antigen binding domain binds to an epitope of an antigen that is conserved among the antigen from different species.

In certain embodiments, the binding molecules or antigen binding domains can comprise "chimeric" sequences in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity (see U.S. Pat. No. 4,816,567; and Morrison et al., 1984, Proc. Natl. Acad. Sci. USA 81:6851-55). Chimeric sequences may include humanized sequences.

In certain embodiments, the binding molecules or antigen binding domains can comprise portions of "humanized" forms of nonhuman (e.g., camelid, murine, non-human primate) antibodies that include sequences from human immunoglobulins (e.g., recipient antibody) in which the native CDR residues are replaced by residues from the corresponding CDR of a nonhuman species (e.g., donor antibody) such as camelid, mouse, rat, rabbit, or nonhuman primate having the desired specificity, affinity, and capacity. In some instances, one or more FR region residues of the human immunoglobulin sequences are replaced by corresponding nonhuman residues. Furthermore, humanized antibodies can comprise residues that are not found in the recipient antibody or in the donor antibody. These modifications are made to further refine antibody performance. A humanized antibody heavy or light chain can comprise substantially all of at least one or more variable regions, in which all or substantially all of the CDRs correspond to those of a nonhuman immunoglobulin and all or substantially all of the FRs are those of a human immunoglobulin sequence. In certain embodiments, the humanized antibody will comprise at least a portion of an immunoglobulin constant region (Fc), typically that of a human immunoglobulin. For further details, see, Jones et al., Nature 321: 522-25 (1986); Riechmann et al., Nature 332:323-29 (1988); Presta, Curr. Op. Struct. Biol. 2:593-96 (1992); Carter et al., Proc. Natl. Acad. Sci. USA 89:4285-89 (1992); U.S. Pat. Nos. 6,800,738; 6,719,971; 6,639,055; 6,407,213; and 6,054,297.

In certain embodiments, the binding molecules or antigen binding domains can comprise portions of a "fully human antibody" or "human antibody," wherein the terms are used interchangeably herein and refer to an antibody that comprises a human variable region and, for example, a human constant region. The binding molecules may comprise a single domain antibody sequence. In specific embodiments, the terms refer to an antibody that comprises a variable region and constant region of human origin. "Fully human" antibodies, in certain embodiments, can also encompass antibodies which bind polypeptides and are encoded by nucleic acid sequences which are naturally occurring somatic variants of human germline immunoglobulin nucleic acid sequence. The term "fully human antibody" includes antibodies having variable and constant regions corresponding to human germline immunoglobulin sequences as described by Kabat et al. (See Kabat et al. (1991) Sequences of Proteins of Immunological Interest, Fifth Edition, U.S. Department of Health and Human Services, NIH Publication No. 91-3242). A "human antibody" is one that possesses an amino acid sequence which corresponds to that of an antibody produced by a human and/or has been made using any of the techniques for making human antibodies. This definition of a human antibody specifically excludes a humanized antibody comprising non-human antigen-binding residues. Human antibodies can be produced using various techniques known in the art, including phage-display libraries (Hoogenboom and Winter, J. Mol. Biol. 227:381 (1991); Marks et al., J. Mol. Biol. 222:581 (1991)) and yeast display libraries (Chao et al., Nature Protocols 1: 755-68 (2006)). Also available for the preparation of human monoclonal antibodies are methods described in Cole et al., Monoclonal Antibodies and Cancer Therapy 77 (1985); Boerner et al., J. Immunol. 147(1):86-95 (1991); and van Dijk and van de Winkel, Curr. Opin. Pharmacol. 5: 368-74 (2001). Human antibodies can be prepared by administering the antigen to a transgenic animal that has been modified to produce such antibodies in response to antigenic challenge, but whose endogenous loci have been disabled, e.g., mice (see, e.g., Jakobovits, Curr. Opin. Biotechnol. 6(5):561-66 (1995); Bruggemann and Taussing, Curr. Opin. Biotechnol. 8(4):455-58 (1997); and U.S. Pat. Nos. 6,075,181 and 6,150,584 regarding XENOMOUSE™ technology). See also, for example, Li et al., Proc. Natl. Acad. Sci. USA 103:3557-62 (2006) regarding human antibodies generated via a human B-cell hybridoma technology.

In certain embodiments, the binding molecules or antigen binding domains can comprise portions of a "recombinant human antibody," wherein the phrase includes human antibodies that are prepared, expressed, created or isolated by recombinant means, such as antibodies expressed using a recombinant expression vector transfected into a host cell, antibodies isolated from a recombinant, combinatorial human antibody library, antibodies isolated from an animal (e.g., a mouse or cow) that is transgenic and/or transchromosomal for human immunoglobulin genes (see, e.g., Taylor, L. D. et al., Nucl. Acids Res. 20:6287-6295 (1992)) or antibodies prepared, expressed, created or isolated by any other means that involves splicing of human immunoglobulin gene sequences to other DNA sequences. Such recombinant human antibodies can have variable and constant regions derived from human germline immunoglobulin sequences (See Kabat, E. A. et al. (1991) Sequences of Proteins of Immunological Interest, Fifth Edition, U.S. Department of Health and Human Services, NIH Publication No. 91-3242). In certain embodiments, however, such recombinant human antibodies are subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

In certain embodiments, the binding molecules or antigen binding domains can comprise a portion of a "monoclonal antibody," wherein the term as used herein refers to an antibody obtained from a population of substantially homogeneous antibodies, e.g., the individual antibodies comprising the population are identical except for possible naturally occurring mutations that may be present in minor amounts or well-known post-translational modifications such as amino acid isomerization or deamidation, methionine oxidation or asparagine or glutamine deamidation, each monoclonal antibody will typically recognize a single epitope on the antigen. In specific embodiments, a "monoclonal antibody," as used herein, is an antibody produced by a single hybridoma or other cell. The term "monoclonal" is not limited to any particular method for making the antibody. For example, the monoclonal antibodies useful in the present disclosure may be prepared by the hybridoma methodology first described by Kohler et al., Nature 256:495 (1975), or may be made using recombinant DNA methods in bacterial or eukaryotic animal or plant cells (see, e.g., U.S. Pat. No. 4,816,567). The "monoclonal antibodies" may also be isolated from phage antibody libraries using the techniques described in Clackson et al., Nature 352:624-28 (1991) and Marks et al., J. Mol. Biol. 222:581-97 (1991), for example. Other methods for the preparation of clonal cell lines and of monoclonal antibodies expressed thereby are well known in the art. See, e.g., Short Protocols in Molecular Biology (Ausubel et al. eds., 5th ed. 2002).

A typical 4-chain antibody unit is a heterotetrameric glycoprotein composed of two identical light (L) chains and two identical heavy (H) chains. In the case of IgGs, the 4-chain unit is generally about 150,000 daltons. Each L chain is linked to an H chain by one covalent disulfide bond, while the two H chains are linked to each other by one or more disulfide bonds depending on the H chain isotype. Each H and L chain also has regularly spaced intrachain disulfide bridges. Each H chain has at the N-terminus, a variable domain (VH) followed by three constant domains (CH) for each of the α and γ chains and four CH domains for µ and ε isotypes. Each L chain has at the N-terminus, a variable domain (VL) followed by a constant domain (CL) at its other end. The VL is aligned with the VH, and the CL is aligned with the first constant domain of the heavy chain (CH1). Particular amino acid residues are believed to form an interface between the light chain and heavy chain variable domains. The pairing of a VH and VL together forms a single antigen-binding site. For the structure and properties of the different classes of antibodies, see, for example, Basic and Clinical Immunology 71 (Stites et al. eds., 8th ed. 1994); and Immunobiology (Janeway et al. eds., 5th ed. 2001).

The term "Fab" or "Fab region" refers to an antibody region that binds to antigens. A conventional IgG usually comprises two Fab regions, each residing on one of the two arms of the Y-shaped IgG structure. Each Fab region is typically composed of one variable region and one constant region of each of the heavy and the light chain. More specifically, the variable region and the constant region of the heavy chain in a Fab region are VH and CH1 regions, and the variable region and the constant region of the light chain in a Fab region are VL and CL regions. The VH, CH1, VL, and CL in a Fab region can be arranged in various ways to confer an antigen binding capability according to the present disclosure. For example, VH and CH1 regions can be on one polypeptide, and VL and CL regions can be on a separate polypeptide, similarly to a Fab region of a conventional IgG. Alternatively, VH, CH1, VL and CL regions can all be on the same polypeptide and oriented in different orders as described in more detail the sections below.

The term "variable region," "variable domain," "V region," or "V domain" refers to a portion of the light or heavy chains of an antibody that is generally located at the amino-terminal of the light or heavy chain and has a length of about 120 to 130 amino acids in the heavy chain and about 100 to 110 amino acids in the light chain, and are used in the binding and specificity of each particular antibody for its particular antigen. The variable region of the heavy chain may be referred to as "VH." The variable region of the light chain may be referred to as "VL." The term "variable" refers to the fact that certain segments of the variable regions differ extensively in sequence among antibodies. The V region mediates antigen binding and defines specificity of a particular antibody for its particular antigen. However, the variability is not evenly distributed across the 110-amino acid span of the variable regions. Instead, the V regions consist of less variable (e.g., relatively invariant) stretches called framework regions (FRs) of about 15-30 amino acids separated by shorter regions of greater variability (e.g., extreme variability) called "hypervariable regions" that are each about 9-12 amino acids long. The variable regions of heavy and light chains each comprise four FRs, largely adopting a β sheet configuration, connected by three hypervariable regions, which form loops connecting, and in some cases form part of, the β sheet structure. The hypervariable regions in each chain are held together in close proximity by the FRs and, with the hypervariable regions from the other chain, contribute to the formation of the antigen-binding site of antibodies (see, e.g., Kabat et al., Sequences of Proteins of Immunological Interest (5th ed. 1991)). The constant regions are not involved directly in binding an antibody to an antigen, but exhibit various effector functions, such as participation of the antibody in antibody dependent cellular cytotoxicity (ADCC) and complement dependent cytotoxicity (CDC). The variable regions differ extensively in sequence between different antibodies. In specific embodiments, the variable region is a human variable region.

The term "variable region residue numbering according to Kabat" or "amino acid position numbering as in Kabat", and variations thereof, refer to the numbering system used for heavy chain variable regions or light chain variable regions of the compilation of antibodies in Kabat et al., supra. Using this numbering system, the actual linear amino acid sequence may contain fewer or additional amino acids corresponding to a shortening of, or insertion into, an FR or CDR of the variable domain. For example, a heavy chain variable domain may include a single amino acid insert (residue 52a according to Kabat) after residue 52 and three inserted residues (e.g., residues 82a, 82b, and 82c, etc. according to Kabat) after residue 82. The Kabat numbering of residues may be determined for a given antibody by alignment at regions of homology of the sequence of the antibody with a "standard" Kabat numbered sequence. The Kabat numbering system is generally used when referring to a residue in the variable domain (approximately residues 1-107 of the light chain and residues 1-113 of the heavy chain) (e.g., Kabat et al., supra). The "EU numbering system" or "EU index" is generally used when referring to a residue in an immunoglobulin heavy chain constant region (e.g., the EU index reported in Kabat et al., supra). The "EU index as in Kabat" refers to the residue numbering of the human IgG 1 EU antibody. Other numbering systems have been described, for example, by AbM, Chothia, Contact, IMGT, and AHon.

The term "heavy chain" when used in reference to an antibody refers to a polypeptide chain of about 50-70 kDa, wherein the amino-terminal portion includes a variable region of about 120 to 130 or more amino acids, and a carboxy-terminal portion includes a constant region. The constant region can be one of five distinct types, (e.g., isotypes) referred to as alpha (α), delta (δ), epsilon (ε), gamma (γ), and mu (µ), based on the amino acid sequence of the heavy chain constant region. The distinct heavy chains differ in size: α, δ, and γ contain approximately 450 amino acids, while μ and ε contain approximately 550 amino acids. When combined with a light chain, these distinct types of heavy chains give rise to five well known classes (e.g., isotypes) of antibodies, IgA, IgD, IgE, IgG, and IgM, respectively, including four subclasses of IgG, namely IgG1, IgG2, IgG3, and IgG4.

The term "light chain" when used in reference to an antibody refers to a polypeptide chain of about 25 kDa, wherein the amino-terminal portion includes a variable region of about 100 to about 110 or more amino acids, and a carboxy-terminal portion includes a constant region. The approximate length of a light chain is 211 to 217 amino acids. There are two distinct types, referred to as kappa (κ) or lambda (λ) based on the amino acid sequence of the constant domains.

As used herein, the terms "hypervariable region," "HVR," "Complementarity Determining Region," and "CDR" are used interchangeably. A "CDR" refers to one of three hypervariable regions (H1, H2 or H3) within the non-framework region of the immunoglobulin (Ig or antibody) VH β-sheet framework, or one of three hypervariable regions (L1, L2 or L3) within the non-framework region of the antibody VL β-sheet framework. Accordingly, CDRs are variable region sequences interspersed within the framework region sequences.

CDR regions are well known to those skilled in the art and have been defined by well-known numbering systems. For example, the Kabat Complementarity Determining Regions (CDRs) are based on sequence variability and are the most commonly used (see, e.g., Kabat et al., supra). Chothia refers instead to the location of the structural loops (see, e.g., Chothia and Lesk, J. Mol. Biol. 196:901-17 (1987)). The end of the Chothia CDR-H1 loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34). The AbM hypervariable regions represent a compromise between the Kabat CDRs and Chothia structural loops, and are used by Oxford Molecular's AbM antibody modeling software (see, e.g., Antibody Engineering Vol. 2 (Kontermann and Dithel eds., 2d ed. 2010)). The "contact" hypervariable regions are based on an analysis of the available complex crystal structures. Another universal numbering system that has been developed and widely adopted is ImMunoGeneTics (IMGT) Information System® (Lafranc et al., Dev. Comp. Immunol. 27(1):55-77 (2003)). IMGT is an integrated information system specializing in immunoglobulins (IG), T-cell receptors (TCR), and major histocompatibility complex (MHC) of human and other vertebrates. Herein, the CDRs are referred to in terms of both the amino acid sequence and the location within the light or heavy chain. As the "location" of the CDRs within the structure of the immunoglobulin variable domain is conserved between species and present in structures called loops, by using numbering systems that align variable domain sequences according to structural features, CDR and framework residues are readily identified. This information can be used in grafting and replacement of CDR residues from immunoglobulins of one species into an acceptor framework from, typically, a human antibody. An additional numbering system (AHon) has been developed by Honegger and Pluckthun, J. Mol. Biol. 309: 657-70 (2001). Correspondence between the numbering system, including, for example, the Kabat numbering and the IMGT unique numbering system, is well known to one skilled in the art (see, e.g., Kabat, supra; Chothia and Lesk, supra; Martin, supra; Lefranc et al., supra). The residues from each of these hypervariable regions or CDRs are exemplified in Table 1 below.

TABLE 1

Exemplary CDRs According to Various Numbering Systems

| Loop | Kabat | AbM | Chothia | Contact | IMGT |
| --- | --- | --- | --- | --- | --- |
| CDR L1 | L24-L34 | L24-L34 | L26-L32 or L24-L34 | L30-L36 | L27-L38 |
| CDR L2 | L50-L56 | L50-L56 | L50-L52 or L50-L56 | L46-L55 | L56-L65 |
| CDR L3 | L89-L97 | L89-L97 | L91-L96 or L89-L97 | L89-L96 | L105-L117 |
| CDR H1 | H31-H35B (Kabat Numbering) | H26-H35B | H26-H32 . . . 34 | H30-H35B | H27-H38 |
| CDR H1 | H31-H35 (Chothia Numbering) | H26-H35 | H26-H32 | H30-H35 | |
| CDR H2 | H50-H65 | H50-H58 | H53-H55 or H52-H56 | H47-H58 | H56-H65 |
| CDR H3 | H95-H102 | H95-H102 | H96-H101 or H95-H102 | H93-H101 | H105-H117 |

The boundaries of a given CDR may vary depending on the scheme used for identification. Thus, unless otherwise specified, the terms "CDR" and "complementary determining region" of a given antibody or region thereof, such as a variable region, as well as individual CDRs (e.g., CDR-H1, CDR-H2) of the antibody or region thereof, should be understood to encompass the complementary determining region as defined by any of the known schemes described herein above. In some instances, the scheme for identification of a particular CDR or CDRs is specified, such as the CDR as defined by the IMGT, Kabat, Chothia, or Contact method. In other cases, the particular amino acid sequence of a CDR is given. It should be noted CDR regions may also be defined by a combination of various numbering systems, e.g., a combination of Kabat and Chothia numbering systems, or a combination of Kabat and IMGT numbering systems. Therefore, the term such as "a CDR as set forth in a specific VH" includes any CDR1 as defined by the exemplary CDR numbering systems described above, but is not limited thereby. Once a variable region (e.g., a VH or VL) is given, those skilled in the art would understand that CDRs within the region can be defined by different numbering systems or combinations thereof.

Hypervariable regions may comprise "extended hypervariable regions" as follows: 24-36 or 24-34 (L1), 46-56 or 50-56 (L2), and 89-97 or 89-96 (L3) in the VL, and 26-35 or 26-35A (H1), 50-65 or 49-65 (H2), and 93-102, 94-102, or 95-102 (H3) in the VH.

The term "constant region" or "constant domain" refers to a carboxy terminal portion of the light and heavy chain which is not directly involved in binding of the antibody to antigen but exhibits various effector function, such as interaction with the Fc receptor. The term refers to the portion of an immunoglobulin molecule having a more conserved amino acid sequence relative to the other portion of the immunoglobulin, the variable region, which contains the antigen binding site. The constant region may contain the CH1, CH2, and CH3 regions of the heavy chain and the CL region of the light chain.

The term "framework" or "FR" refers to those variable region residues flanking the CDRs. FR residues are present, for example, in chimeric, humanized, human, domain antibodies (e.g., single domain antibodies), diabodies, linear antibodies, and bispecific antibodies. FR residues are those variable domain residues other than the hypervariable region residues or CDR residues.

The term "Fc region" herein is used to define a C-terminal region of an immunoglobulin heavy chain, including, for example, native sequence Fc regions, recombinant Fc regions, and variant Fc regions. Although the boundaries of the Fc region of an immunoglobulin heavy chain might vary, the human IgG heavy chain Fc region is often defined to stretch from an amino acid residue at position Cys226, or from Pro230, to the carboxyl-terminus thereof. The C-terminal lysine (residue 447 according to the EU numbering system) of the Fc region may be removed, for example, during production or purification of the antibody, or by recombinantly engineering the nucleic acid encoding a heavy chain of the antibody. Accordingly, a composition of intact antibodies may comprise antibody populations with all K447 residues removed, antibody populations with no K447 residues removed, and antibody populations having a mixture of antibodies with and without the K447 residue. A "functional Fc region" possesses an "effector function" of a native sequence Fc region. Exemplary "effector functions" include C1q binding; CDC; Fc receptor binding; ADCC; phagocytosis; downregulation of cell surface receptors (e.g., B cell receptor), etc. Such effector functions generally require the Fc region to be combined with a binding region or binding domain (e.g., an antibody variable region or domain) and can be assessed using various assays known to those skilled in the art. A "variant Fc region" comprises an amino acid sequence which differs from that of a native sequence Fc region by virtue of at least one amino acid modification (e.g., substituting, addition, or deletion). In certain embodiments, the variant Fc region has at least one amino acid substitution compared to a native sequence Fc region or to the Fc region of a parent polypeptide, for example, from about one to about ten amino acid substitutions, or from about one to about five amino acid substitutions in a native sequence Fc region or in the Fc region of a parent polypeptide. The variant Fc region herein can possess at least about 80% homology with a native sequence Fc region and/or with an Fc region of a parent polypeptide, or at least about 90% homology therewith, for example, at least about 95% homology therewith.

As used herein, an "epitope" is a term in the art and refers to a localized region of an antigen to which a binding molecule (e.g., an antibody comprising a single domain antibody sequence) can specifically bind. An epitope can be a linear epitope or a conformational, non-linear, or discontinuous epitope. In the case of a polypeptide antigen, for example, an epitope can be contiguous amino acids of the polypeptide (a "linear" epitope) or an epitope can comprise amino acids from two or more non-contiguous regions of the polypeptide (a "conformational," "non-linear" or "discontinuous" epitope). It will be appreciated by one of skill in the art that, in general, a linear epitope may or may not be dependent on secondary, tertiary, or quaternary structure. For example, in some embodiments, a binding molecule binds to a group of amino acids regardless of whether they are folded in a natural three dimensional protein structure. In other embodiments, a binding molecule requires amino acid residues making up the epitope to exhibit a particular conformation (e.g., bend, twist, turn or fold) in order to recognize and bind the epitope.

"Percent (%) amino acid sequence identity" and "homology" with respect to a peptide, polypeptide or antibody sequence are defined as the percentage of amino acid residues in a candidate sequence that are identical with the amino acid residues in the specific peptide or polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or MEGALIGN™ (DNASTAR) software. Those skilled in the art can determine appropriate parameters for measuring alignment, including any algorithms needed to achieve maximal alignment over the full length of the sequences being compared.

"Chimeric antigen receptor" or "CAR" as used herein refers to genetically engineered receptors, which can be used to graft one or more antigen specificity onto immune effector cells, such as T cells. Some CARs are also known as "artificial T-cell receptors," "chimeric T cell receptors," or "chimeric immune receptors." In some embodiments, the CAR comprises an extracellular antigen binding domain specific for one or more antigens (such as tumor antigens), a transmembrane domain, and an intracellular signaling domain of a T cell and/or other receptors. "CAR-T cell" refers to a T cell that expresses a CAR.

The terms "polypeptide" and "peptide" and "protein" are used interchangeably herein and refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification. Also included within the definition are, for example, polypeptides containing one or more analogs of an amino acid, including but not limited to, unnatural amino acids, as well as other modifications known in the art. It is understood that, because the polypeptides of this disclosure may be based upon antibodies or other members of the immunoglobulin superfamily, in certain embodiments, a "polypeptide" can occur as a single chain or as two or more associated chains.

"Polynucleotide" or "nucleic acid," as used interchangeably herein, refers to polymers of nucleotides of any length and includes DNA and RNA. The nucleotides can be deoxyribonucleotides, ribonucleotides, modified nucleotides or bases, and/or their analogs, or any substrate that can be incorporated into a polymer by DNA or RNA polymerase or by a synthetic reaction. A polynucleotide may comprise modified nucleotides, such as methylated nucleotides and their analogs. "Oligonucleotide," as used herein, refers to short, generally single-stranded, synthetic polynucleotides that are generally, but not necessarily, fewer than about 200 nucleotides in length. The terms "oligonucleotide" and "polynucleotide" are not mutually exclusive. The description above for polynucleotides is equally and fully applicable to oligonucleotides. A cell that produces a binding molecule of the present disclosure may include a parent hybridoma cell, as well as bacterial and eukaryotic host cells into which nucleic acids encoding the antibodies have been introduced. Unless specified otherwise, the left-hand end of any single-stranded polynucleotide sequence disclosed herein is the 5' end; the left-hand direction of double-stranded polynucleotide sequences is referred to as the 5' direction. The direction of 5' to 3' addition of nascent RNA transcripts is referred to as the transcription direction; sequence regions on the DNA strand having the same sequence as the RNA transcript that are 5' to the 5' end of the RNA transcript are referred to as "upstream sequences"; sequence regions on the DNA strand having the same sequence as the RNA transcript that are 3' to the 3' end of the RNA transcript are referred to as "downstream sequences."

An "isolated nucleic acid" is a nucleic acid, for example, an RNA, DNA, or a mixed nucleic acids, which is substantially separated from other genome DNA sequences as well as proteins or complexes such as ribosomes and polymerases, which naturally accompany a native sequence. An "isolated" nucleic acid molecule is one which is separated from other nucleic acid molecules which are present in the natural source of the nucleic acid molecule. Moreover, an "isolated" nucleic acid molecule, such as a cDNA molecule, can be substantially free of other cellular material, or culture medium when produced by recombinant techniques, or substantially free of chemical precursors or other chemicals when chemically synthesized. In a specific embodiment, one or more nucleic acid molecules encoding a single domain antibody or an antibody as described herein are isolated or purified. The term embraces nucleic acid sequences that have been removed from their naturally occurring environment, and includes recombinant or cloned DNA isolates and chemically synthesized analogues or analogues biologically synthesized by heterologous systems. A substantially pure molecule may include isolated forms of the molecule. Specifically, an "isolated" nucleic acid molecule encoding a CAR described herein is a nucleic acid molecule that is identified and separated from at least one contaminant nucleic acid molecule with which it is ordinarily associated in the environment in which it was produced.

The term "control sequences" refers to DNA sequences necessary for the expression of an operably linked coding sequence in a particular host organism. The control sequences that are suitable for prokaryotes, for example, include a promoter, optionally an operator sequence, and a ribosome binding site. Eukaryotic cells are known to utilize promoters, polyadenylation signals, and enhancers.

As used herein, the term "operatively linked," and similar phrases (e.g., genetically fused), when used in reference to nucleic acids or amino acids, refer to the operational linkage of nucleic acid sequences or amino acid sequence, respectively, placed in functional relationships with each other. For example, an operatively linked promoter, enhancer elements, open reading frame, 5' and 3' UTR, and terminator sequences result in the accurate production of a nucleic acid molecule (e.g., RNA). In some embodiments, operatively linked nucleic acid elements result in the transcription of an open reading frame and ultimately the production of a polypeptide (i.e., expression of the open reading frame). As another example, an operatively linked peptide is one in which the functional domains are placed with appropriate distance from each other to impart the intended function of each domain.

The term "vector" refers to a substance that is used to carry or include a nucleic acid sequence, including for example, a nucleic acid sequence encoding a binding molecule (e.g., an antibody) as described herein, in order to introduce a nucleic acid sequence into a host cell. Vectors applicable for use include, for example, expression vectors, plasmids, phage vectors, viral vectors, episomes, and artificial chromosomes, which can include selection sequences or markers operable for stable integration into a host cell's chromosome. Additionally, the vectors can include one or more selectable marker genes and appropriate expression control sequences. Selectable marker genes that can be included, for example, provide resistance to antibiotics or toxins, complement auxotrophic deficiencies, or supply critical nutrients not in the culture media. Expression control sequences can include constitutive and inducible promoters, transcription enhancers, transcription terminators, and the like, which are well known in the art. When two or more nucleic acid molecules are to be co-expressed (e.g., both an antibody heavy and light chain or an antibody VH and VL), both nucleic acid molecules can be inserted, for example, into a single expression vector or in separate expression vectors. For single vector expression, the encoding nucleic acids can be operationally linked to one common expression control sequence or linked to different expression control sequences, such as one inducible promoter and one constitutive promoter. The introduction of nucleic acid molecules into a host cell can be confirmed using methods well known in the art. Such methods include, for example, nucleic acid analysis such as Northern blots or polymerase chain reaction (PCR) amplification of mRNA, immunoblotting for expression of gene products, or other suitable analytical methods to test the expression of an introduced nucleic acid sequence or its corresponding gene product. It is understood by those skilled in the art that the nucleic acid molecules are expressed in a sufficient amount to produce a desired product and it is further understood that expression levels can be optimized to obtain sufficient expression using methods well known in the art.

The term "host" as used herein refers to an animal, such as a mammal (e.g., a human).

The term "host cell" as used herein refers to a particular subject cell that may be transfected with a nucleic acid molecule and the progeny or potential progeny of such a cell. Progeny of such a cell may not be identical to the parent cell transfected with the nucleic acid molecule due to mutations or environmental influences that may occur in succeeding generations or integration of the nucleic acid molecule into the host cell genome.

As used herein, the term "autologous" is meant to refer to any material derived from the same individual to whom it is later to be re-introduced into the individual.

"Allogeneic" refers to a graft derived from a different individual of the same species.

The term "transfected" or "transformed" or "transduced" as used herein refers to a process by which exogenous nucleic acid is transferred or introduced into the host cell. A "transfected" or "transformed" or "transduced" cell is one which has been transfected, transformed or transduced with exogenous nucleic acid. The cell includes the primary subject cell and its progeny.

As used herein, the term "isolation" or "isolating" refers to a process of increasing the percentage of a certain substance in a composition. For example, isolating a type of cells from a population of cells refers to a process of creating a population of cells in which the percentage of this type of cells increases as compared to the percentage of this type of cells in the original population of cells. Therefore, the term "isolated" when used in the context of a type of cells does not mean that the isolated population of cells comprises 100% of this type of cells, rather it means the percentage of this type of cells increases in a population of cells after the isolation process.

The term "pharmaceutically acceptable" as used herein means being approved by a regulatory agency of the Federal or a state government, or listed in United States Pharmacopeia, European Pharmacopeia, or other generally recognized Pharmacopeia for use in animals, and more particularly in humans.

"Excipient" means a pharmaceutically-acceptable material, composition, or vehicle, such as a liquid or solid filler, diluent, solvent, or encapsulating material. Excipients include, for example, encapsulating materials or additives such as absorption accelerators, antioxidants, binders, buffers, carriers, coating agents, coloring agents, diluents, disintegrating agents, emulsifiers, extenders, fillers, flavoring agents, humectants, lubricants, perfumes, preservatives, propellants, releasing agents, sterilizing agents, sweeteners, solubilizers, wetting agents and mixtures thereof. The term "excipient" can also refer to a diluent, adjuvant (e.g., Freunds' adjuvant (complete or incomplete) or vehicle.

In some embodiments, excipients are pharmaceutically acceptable excipients. Examples of pharmaceutically acceptable excipients include buffers, such as phosphate, citrate, and other organic acids; antioxidants, including ascorbic acid; low molecular weight (e.g., fewer than about 10 amino acid residues) polypeptide; proteins, such as serum albumin, gelatin, or immunoglobulins; hydrophilic polymers, such as polyvinylpyrrolidone; amino acids, such as glycine, glutamine, asparagine, arginine, or lysine; monosaccharides, disaccharides, and other carbohydrates, including glucose, mannose, or dextrins; chelating agents, such as EDTA; sugar alcohols, such as mannitol or sorbitol; salt-forming counterions, such as sodium; and/or nonionic surfactants, such as TWEEN™, polyethylene glycol (PEG), and PLURONICS™. Other examples of pharmaceutically acceptable excipients are described in Remington and Gennaro, Remington's Pharmaceutical Sciences (18th ed. 1990).

In one embodiment, each component is "pharmaceutically acceptable" in the sense of being compatible with the other ingredients of a pharmaceutical formulation, and suitable for use in contact with the tissue or organ of humans and animals without excessive toxicity, irritation, allergic response, immunogenicity, or other problems or complications, commensurate with a reasonable benefit/risk ratio. See, e.g., Lippincott Williams & Wilkins: Philadelphia, PA, 2005; Handbook of Pharmaceutical Excipients, 6th ed.; Rowe et al., Eds.; The Pharmaceutical Press and the American Pharmaceutical Association: 2009; Handbook of Pharmaceutical Additives, 3rd ed.; Ash and Ash Eds.; Gower Publishing Company: 2007; Pharmaceutical Preformulation and Formulation, 2nd ed.; Gibson Ed.; CRC Press LLC: Boca Raton, FL, 2009. In some embodiments, pharmaceutically acceptable excipients are nontoxic to the cell or mammal being exposed thereto at the dosages and concentrations employed. In some embodiments, a pharmaceutically acceptable excipient is an aqueous pH buffered solution.

In some embodiments, excipients are sterile liquids, such as water and oils, including those of petroleum, animal, vegetable, or synthetic origin, such as peanut oil, soybean oil, mineral oil, sesame oil, and the like. Water is an exemplary excipient when a composition (e.g., a pharmaceutical composition) is administered intravenously. Saline solutions and aqueous dextrose and glycerol solutions can also be employed as liquid excipients, particularly for injectable solutions. An excipient can also include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, and the like. The composition, if desired, can also contain minor amounts of wetting or emulsifying agents, or pH buffering agents. Compositions can take the form of solutions, suspensions, emulsion, tablets, pills, capsules, powders, sustained-release formulations, and the like. Oral compositions, including formulations, can include standard excipients such as pharmaceutical grades of mannitol, lactose, starch, magnesium stearate, sodium saccharine, cellulose, magnesium carbonate, etc.

Compositions, including pharmaceutical compounds, may contain a binding molecule (e.g., an antibody), for example, in isolated or purified form, together with a suitable amount of excipients.

The term "effective amount" or "therapeutically effective amount" as used herein refers to the amount of a single domain antibody or a therapeutic molecule comprising an agent and the single domain antibody or pharmaceutical composition provided herein which is sufficient to result in the desired outcome.

The terms "subject" and "patient" may be used interchangeably. As used herein, in certain embodiments, a subject is a mammal, such as a non-primate or a primate (e.g., human). In specific embodiments, the subject is a human. In one embodiment, the subject is a mammal, e.g., a human, diagnosed with a disease or disorder. In another embodiment, the subject is a mammal, e.g., a human, at risk of developing a disease or disorder.

"Administer" or "administration" refers to the act of injecting or otherwise physically delivering a substance as it exists outside the body into a patient, such as by mucosal, intradermal, intravenous, intramuscular delivery, and/or any other method of physical delivery described herein or known in the art.

As used herein, the terms "treat," "treatment" and "treating" refer to the reduction or amelioration of the progression, severity, and/or duration of a disease or condition resulting from the administration of one or more therapies. Treating may be determined by assessing whether there has been a decrease, alleviation and/or mitigation of one or more symptoms associated with the underlying disorder such that an improvement is observed with the patient, despite that the patient may still be afflicted with the underlying disorder. The term "treating" includes both managing and ameliorating the disease. The terms "manage," "managing," and "management" refer to the beneficial effects that a subject derives from a therapy which does not necessarily result in a cure of the disease.

The terms "prevent," "preventing," and "prevention" refer to reducing the likelihood of the onset (or recurrence) of a disease, disorder, condition, or associated symptom(s) (e.g., diabetes or a cancer).

The terms "about" and "approximately" mean within 20%, within 15%, within 10%, within 9%, within 8%, within 7%, within 6%, within 5%, within 4%, within 3%, within 2%, within 1%, or less of a given value or range.

As used in the present disclosure and claims, the singular forms "a", "an" and "the" include plural forms unless the context clearly dictates otherwise.

It is understood that wherever embodiments are described herein with the term "comprising" otherwise analogous embodiments described in terms of "consisting of" and/or "consisting essentially of" are also provided. It is also understood that wherever embodiments are described herein with the phrase "consisting essentially of" otherwise analogous embodiments described in terms of "consisting of" are also provided.

The term "between" as used in a phrase as such "between A and B" or "between A-B" refers to a range including both A and B.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

5.2. Methods for Producing Influenza A Virus Specific Vβ17$^+$CD8$^+$ T Cells Provided herein, in one aspect, is a method for activating or enriching Vβ17$^+$CD8$^+$ T cells that are specific to influenza A virus. In some embodiments, the methods provided herein comprises contacting a population of cells comprising T cells with a peptide derived from human influenza A virus.

5.2.1. Obtaining a Population of Cells Comprising T Cells

Exemplary T cells include CD8$^+$ T cells, CD4$^+$ T cells, regulatory T cells, cytotoxic T cells, and tumor infiltrating lymphocytes. T cells can be obtained from a number of sources. In some embodiments, the population of cells comprising T cells is collected, isolated, purified or induced from a body fluid, a tissue or an organ including but not limited to peripheral blood, umbilical cord blood, bone marrow, lymph node, the thymus, spleen, or other tissues or fluids of a mammal. In other embodiments, the population of cells comprising T cells is obtained from a cultured T-cell line. In specific embodiments, the population of cells comprising T cells is peripheral blood lymphocytes, precursor cells of T cells (such as hematopoietic stem cells, lymphocyte precursor cells etc.) or a cell population containing them. In a specific embodiment, the population of cells comprising T cells is PBMCs. In some embodiments, the PBMCs are from a healthy donor. Various methods of collecting and preparing PBMCs are known in the art.

In some embodiments, T cells can be obtained from a unit of blood collected from a subject using any number of techniques known to the skilled artisan, such as Ficoll™ separation. In some embodiments, cells from the circulating blood of an individual are obtained by apheresis. The apheresis product typically contains lymphocytes, including T cells, monocytes, granulocytes, B cells, other nucleated white blood cells, red blood cells, and platelets. In some embodiments, the cells collected by apheresis may be washed to remove the plasma fraction and to place the cells in an appropriate buffer or media for subsequent processing steps. In some embodiments, the cells are washed with phosphate buffered saline (PBS). In some embodiments, the wash solution lacks calcium and may lack magnesium or may lack many if not all divalent cations. As those of ordinary skill in the art would readily appreciate a washing step may be accomplished by methods known to those in the art, such as by using a semi-automated "flow-through" centrifuge (for example, the Cobe 2991 cell processor, the Baxter CytoMate, or the Haemonetics Cell Saver 5) according to the manufacturer's instructions. After washing, the cells may be resuspended in a variety of biocompatible buffers, such as, for example, Ca$^{2+}$-free, Mg$^{2+}$-free PBS, PlasmaLyte A, or other saline solution with or without buffer. Alternatively, the undesirable components of the apheresis sample may be removed and the cells directly resuspended in culture media.

In some embodiments, T cells are isolated from peripheral blood lymphocytes by lysing the red blood cells and depleting the monocytes, for example, by centrifugation through a PERCOLL™ gradient or by counterflow centrifugal elutriation. A specific subpopulation of T cells, such as CD3+, CD28+, CD4+, CD8+, CD45RA+, and CD45RO+ T cells, can be further isolated by positive or negative selection techniques.

For example, in some embodiments, T cells are isolated by incubation with anti-CD3/anti-CD28 (i.e., 3×28)-conjugated beads, such as DYNABEADS® M-450 CD3/CD28 T, for a time period sufficient for positive selection of the desired T cells. In some embodiments, the time period is at least 0.5, 1, 2, 3, 4, 5, or 6 hours. In some embodiments, the time period ranges from 0.5 to 36 hours or longer and all integer values there between. In some embodiments, the time period is 1 to 36 hours. In some embodiments, the time period is 2 to 36 hours. In some embodiments, the time period is 3 to 36 hours. In some embodiments, the time period is 4 to 36 hours. In some embodiments, the time period is 5 to 36 hours. In some embodiments, the time period is 6 to 24 hours. In some embodiments, the time period is 7 to 24 hours. In some embodiments, the time period is 8 to 24 hours. In some embodiments, the time period is 9 to 24 hours. In some embodiments, the time period is 10 to 24 hours. In some embodiments, the incubation time period is 0.5 hours. In some embodiments, the incubation time period is 1 hours. In some embodiments, the incubation time period is 2 hours. In some embodiments, the incubation time period is 3 hours. In some embodiments, the incubation time period is 4 hours. In some embodiments, the incubation time period is 5 hours. In some embodiments, the incubation time period is 6 hours. In some embodiments, the incubation time period is 7 hours. In some embodiments, the incubation time period is 8 hours. In some embodiments, the incubation time period is 9 hours. In some embodiments, the incubation time period is 10 hours. In some embodiments, the incubation time period is 11 hours. In some embodiments, the incubation time period is 12 hours. In some embodiments, the incubation time period is 13 hours. In some embodiments, the incubation time period is 14 hours. In some embodiments, the incubation time period is 15 hours. In some embodiments, the incubation time period is 16 hours. In some embodiments, the incubation time period is 17 hours. In some embodiments, the incubation time period is 18 hours. In some embodiments, the incubation time period is 19 hours. In some embodiments, the incubation time period is 20 hours. In some embodiments, the incubation time period is 21 hours. In some embodiments, the incubation time period is 22 hours. In some embodiments, the incubation time period is 23 hours. In some embodiments, the incubation time period is 24 hours.

Longer incubation times may be used to isolate T cells in any situation where there are few T cells as compared to other cell types. Further, use of longer incubation times can increase the efficiency of capture of CD8+ T cells. Thus, in some embodiments, by simply shortening or lengthening the time T cells are allowed to bind to the CD3/CD28 beads and/or by increasing or decreasing the ratio of beads to T cells, subpopulations of T cells can be preferentially selected for or against at culture initiation or at other time points during the process. Additionally, by increasing or decreasing the ratio of anti-CD3 and/or anti-CD28 antibodies on the beads or other surface, subpopulations of T cells can be preferentially selected for or against at culture initiation or at other desired time points. The skilled artisan would recognize that multiple rounds of selection can also be used. In some embodiments, it may be desirable to perform the selection procedure and use the "unselected" cells in the present methods or processes. "Unselected" cells can also be subjected to further rounds of selection.

Enrichment of a T cell population by negative selection can be accomplished with a combination of antibodies directed to surface markers unique to the negatively selected cells. One method is cell sorting and/or selection via negative magnetic immunoadherence or flow cytometry that uses a cocktail of monoclonal antibodies directed to cell surface markers present on the cells negatively selected. For isolation of a desired population of cells by positive or negative selection, the concentration of cells and surface (e.g., particles such as beads) can be varied. In certain embodiments, it may be desirable to significantly decrease the volume in which beads and cells are mixed together (i.e., increase the concentration of cells), to ensure maximum contact of cells and beads. In some embodiments, the concentration of cells ranges from 10 million cells/ml to 5 billion cells/ml. In some embodiments, the concentration of cells ranges from 15 million cells/ml to 4 billion cells/ml. In some embodiments, the concentration of cells ranges from 20 million cells/ml to 3 billion cells/ml. In some embodiments, the concentration of cells ranges from 25 million cells/ml to 2 billion cells/ml. In some embodiments, the concentration of cells ranges from 30 million cells/ml to 2 billion cells/ml. In some embodiments, the concentration of cells ranges from 35 million cells/ml to 2 billion cells/ml. In some embodiments, the concentration of cells ranges from 40 million cells/ml to 2 billion cells/ml. In some embodiments, the concentration of cells ranges from 45 million cells/ml to 2 billion cells/ml. In some embodiments, the concentration of cells ranges from 50 million cells/ml to 2 billion cells/ml. In some embodiments, a concentration of cells of 10, 15, 20, 25, 30, 35, 40, 45, or 50 million cells/ml is used. In some embodiments, a concentration of cells of 55, 60, 65, 70, 75, 80, 85, 90, 95, or 100 million cells/ml is used. In some embodiments, greater than 100 million cells/ml is used. In some embodiments, concentrations of 125 or 150 million cells/ml can be used. In some embodiments, a concentration of 1 billion cells/ml is used. In some embodiments, a concentration of 2 billion cells/ml is used. Using high concentrations may result in increased cell yield, cell activation, and cell expansion. Further, use of high cell concentrations may allow more efficient capture of cells that may weakly express target antigens of interest. In some embodiments, using high concentration of cells allows more efficient selection of CD8+ T cells that normally have weaker CD28 expression.

In some embodiments, the cells may be incubated on a rotator for varying lengths of time at varying speeds at either 2-10° C., or at room temperature. After the washing step that removes plasma and platelets, the cells may be suspended in a freezing solution. While many freezing solutions and parameters are known in the art and will be useful in this context, one method involves using PBS containing 20% DMSO and 8% human serum albumin, or culture media containing 10% dextran 40 and 5% dextrose, 20% human serum albumin and 7.5% DMSO, or 31.25% plasmalyte-A, 31.25% dextrose 5%, 0.45% NaCl, 10% dextran 40 and 5% dextrose, 20% human serum albumin, and 7.5% DMSO or other suitable cell freezing media containing for example, Hespan and PlasmaLyte A. The cells then are frozen to −80° C. at a rate of 1° per minute and stored in the vapor phase of a liquid nitrogen storage tank. Other methods of controlled freezing may be used as well as uncontrolled freezing immediately at −20° C. or in liquid nitrogen.

In some embodiments, cryopreserved cells are thawed and washed as described herein and allowed to rest for one hour at room temperature prior to activation.

In certain embodiments, provided in the present disclosure is the collection of blood samples or apheresis product from a subject at a time period prior to when the expanded cells as described herein might be needed. As such, the source of the cells to be expanded can be collected at any time point necessary, and desired cells, such as T cells, isolated and frozen for later use in T cell therapy for any number of diseases or conditions that would benefit from T cell therapy, such as those described herein. In one embodiment, a blood sample or an apheresis is taken from a generally healthy subject. In certain embodiments, the T cells may be expanded, frozen, and used at a later time.

5.2.2. M1 Peptide Stimulation

Provided herein, in one aspect, is a method comprising activating or enriching Vβ17+CD8+ T cells by contacting a peptide from matrix protein derived from human influenza A virus with a population of cells comprising T cells provided herein.

In some embodiments, the peptide from matrix protein derived from human influenza A virus is a M1 peptide derived from human influenza A virus ($M1_{58-66}$) comprising an amino acid sequence of GILGFVFTL (SEQ ID NO:1).

In other embodiments, the peptide from matrix protein derived from human influenza A virus is peptide 57-68 (KGILGFVFTLTV (SEQ ID NO:9)). In other embodiments, the peptide from matrix protein derived from human influenza A virus is peptide 57-67 (KGILGFVFTLT (SEQ ID NO:10)). In other embodiments, the peptide from matrix protein derived from human influenza A virus is peptide 57-66 (KGILGFVFTL (SEQ ID NO:11)). In other embodiments, the peptide from matrix protein derived from human influenza A virus is peptide 58-68 (GILGFVFTLTV (SEQ ID NO:12)). In other embodiments, the peptide from matrix protein derived from human influenza A virus is peptide 58-67 (GILGFVFTLT (SEQ ID NO:13)).

In some embodiments, the method provided herein comprises contacting the M1 peptide derived from human influenza A virus ($M1_{58-66}$) with the population of cells comprising T cells with a certain M1 peptide to cell ratio, for example, 1 to 10 µg/ml of M1 peptide with $10^3$ to $10^{11}$ cells. In one embodiment, the M1 peptide to cell ratio is 1 µg/ml of M1 peptide with about $2.5 \times 10^3$ cells. In one embodiment, the M1 peptide to cell ratio is 1 µg/ml of M1 peptide with $2.5 \times 10^4$ cells. In one embodiment, the M1 peptide to cell ratio is 1 µg/ml of M1 peptide with $2.5 \times 10^5$ cells. In one embodiment, the M1 peptide to cell ratio is 1 µg/ml of M1 peptide with $2.5 \times 10^6$ cells. In one embodiment, the M1 peptide to cell ratio is 1 µg/ml of M1 peptide with $2.5 \times 10^7$ cells. In one embodiment, the M1 peptide to cell ratio is 1 µg/ml of M1 peptide with $2.5 \times 10^8$ cells. In one embodiment, the M1 peptide to cell ratio is 1 µg/ml of M1 peptide with $2.5 \times 10^9$ cells. In one embodiment, the M1 peptide to cell ratio is 1 µg/ml of M1 peptide with $2.5 \times 10^{10}$ cells.

In some embodiments, the method provided herein comprises contacting the M1 peptide derived from human influenza A virus ($M1_{58-66}$) with the population of cells comprising T cells for certain amount of time. In some embodiments, the M1 peptide contacts the cells for 1 to 20 days. In some embodiments, the M1 peptide contacts the cells for 2 to 18 days. In some embodiments, the M1 peptide contacts the cells for 3 to 16 days. In some embodiments, the M1 peptide contacts the cells for 4 to 14 days. In some embodiments, the M1 peptide contacts the cells for 5 to 14 days. In some embodiments, the M1 peptide contacts the cells for 6 to 14 days. In some embodiments, the M1 peptide contacts the cells for 7 to 14 days. In some embodiments, the M1 peptide contacts the cells for 8 to 14 days. In some embodiments, the M1 peptide contacts the cells for 9 to 14 days. In some embodiments, the M1 peptide contacts the cells for 10 to 14 days. In some embodiments, the M1 peptide contacts the cells for 11 to 14 days. In some embodiments, the M1 peptide contacts the cells for 12 to 14 days. In one embodiment, the M1 peptide contacts the cells for 1 day. In one embodiment, the M1 peptide contacts the cells for 2 days. In one embodiment, the M1 peptide contacts the cells for 3 days. In one embodiment, the M1 peptide contacts the cells for 4 days. In one embodiment, the M1 peptide contacts the cells for 5 days. In one embodiment, the M1 peptide contacts the cells for 6 days. In one embodiment, the M1 peptide contacts the cells for 7 days. In one embodiment, the M1 peptide contacts the cells for 8 days. In one embodiment, the M1 peptide contacts the cells for 9 days. In one embodiment, the M1 peptide contacts the cells for 10 days. In one embodiment, the M1 peptide contacts the cells for 11 days. In one embodiment, the M1 peptide contacts the cells for 12 days. In one embodiment, the M1 peptide contacts the cells for 13 days. In one embodiment, the M1 peptide contacts the cells for 14 days.

In some embodiments, the method provided herein further comprises contacting an agent of immunostimulation or immunoregulation with the population of the cells comprising the T cells that have been contacted with the M1 peptide. In some specific embodiments, the agent of immunostimulation or immunoregulation is able to stimulate T cells. In a preferred embodiment, the agent of immunostimulation or immunoregulation is IL-2.

In some embodiments, the method provided herein further comprises contacting IL-2 with the population of the cells comprising the T cells with a certain IL-2 to cell ratio, e.g., 100 to 250 IU of IL-2 with $10^3$ to $10^{11}$ cells. In one embodiment, the IL-2 to cell ratio is 210 IU of IL-2 with $2.5 \times 10^3$ cells. In one embodiment, the IL-2 to cell ratio is 210 IU of IL-2 with $2.5 \times 10^4$ cells. In one embodiment, the IL-2 to cell ratio is 210 IU of IL-2 with $2.5 \times 10^5$ cells. In one embodiment, the IL-2 to cell ratio is 210 IU of IL-2 with $2.5 \times 10^6$ cells. In one embodiment, the IL-2 to cell ratio is 210 IU of IL-2 with $2.5 \times 10^7$ cells. In one embodiment, the IL-2 to cell ratio is 210 IU of IL-2 with $2.5 \times 10^8$ cells. In one embodiment, the IL-2 to cell ratio is 210 IU of IL-2 with $2.5 \times 10^9$ cells. In one embodiment, the IL-2 to cell ratio is 210 IU of IL-2 with $2.5 \times 10^{10}$ cells.

In some embodiments, the method provided herein further comprises contacting IL-2 with the population of the cells comprising the T cells for certain amount of time. In some embodiments, the cells are contacted with IL-2 for 1 to 20 days. In some embodiments, the cells are contacted with IL-2 for 2 to 18 days. In some embodiments, the cells are contacted with IL-2 for 3 to 16 days. In some embodiments, the cells are contacted with IL-2 for 4 to 14 days. In some embodiments, the cells are contacted with IL-2 for 5 to 14 days. In some embodiments, the cells are contacted with IL-2 for 6 to 14 days. In some embodiments, the cells are contacted with IL-2 for 7 to 14 days. In some embodiments, the cells are contacted with IL-2 for 8 to 14 days. In some embodiments, the cells are contacted with IL-2 for 9 to 14 days. In some embodiments, the cells are contacted with IL-2 for 10 to 14 days. In some embodiments, the cells are contacted with IL-2 for 11 to 14 days. In some embodiments, the cells are contacted with IL-2 for 12 to 14 days. In one embodiment, the cells are contacted with IL-2 for 1 day. In one embodiment, the cells are contacted with IL-2 for 2 days. In one embodiment, the cells are contacted with IL-2 for 3 days. In one embodiment, the cells are contacted with IL-2 for 4 days. In one embodiment, the cells are contacted with IL-2 for 5 days. In one embodiment, the cells are contacted with IL-2 for 6 days. In one embodiment, the cells are contacted with IL-2 for 7 days. In one embodiment, the cells are contacted with IL-2 for 8 days. In one embodiment, the cells are contacted with IL-2 for 9 days. In one embodiment, the cells are contacted with IL-2 for 10 days. In one embodiment, the cells are contacted with IL-2 for 11 days. In one embodiment, the cells are contacted with IL-2 for 12 days. In one embodiment, the cells are contacted with IL-2 for 13 days. In one embodiment, the cells are contacted with IL-2 for 14 days.

In certain embodiments, the population of the cells comprising T cells provided herein are contacted with the M1 peptide and/or IL-2 ex vivo, e.g., in a culture medium. In some embodiments, the method comprises culturing the population of the cells ex vivo in a medium comprising the M1 peptide and IL-2 for a period of time, e.g., for 5 to 20 days.

In other embodiments, the method comprises culturing the population of the cells ex vivo in a medium comprising the M1 peptide for a period of time, e.g., for 5 to 10 days, and then culturing the population of the cells ex vivo in a medium comprising IL-2 for a period of time, e.g., for another 5 to 10 days.

In yet other embodiments, the method comprises culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2. For example, the population of the cells is first cultured ex vivo in a medium comprising the M1 peptide for a period of time, and then IL-2 is added into the medium for a period of time. Then the cells are washed and cultured again in a medium comprising IL-2. In a specific embodiment, the population of the cells is first cultured ex vivo in a medium comprising the M1 peptide for 1 to 3 days before IL-2 is added into the medium; the population of the cells is then cultured ex vivo in the medium comprising both M1 peptide and IL-2 for 1 to 7 days; and then the cells are washed and cultured in a medium comprising IL-2 for 1 to 10 days. In another specific embodiment, the population of the cells comprising the T cells are cultured using a method as illustrated in Section 7 below.

In some embodiments, the amount of a specific type of cells is measured by methods well known to those skilled in the art. In some embodiments, the amount of a specific type of cells is measured by flow cytometry analysis.

In some embodiments, the initial percent of the Vβ17$^+$CD8$^+$ T cells in the CD8+ cells from the population of the cells is 2-10% of the CD8+ cells. In some embodiments, the initial percent of the Vβ17$^+$CD8$^+$ T cells in the CD8+ cells from the population of the cells is 3-8% of the CD8+ cells. In some embodiments, the initial percent of the Vβ17$^+$CD8$^+$ T cells in the CD8+ cells from the population of the cells is 4-6% of the CD8+ cells. In some embodiments, the initial percent of the Vβ17$^+$CD8$^+$ T cells in the CD8+ cells from the population of the cells is 4-5% of the CD8+ cells. In some embodiments, the initial percent of the Vβ17$^+$CD8$^+$ T cells in the CD8+ cells from the population of the cells is 5-6% of the CD8+ cells. In some embodiments, the initial percent of the Vβ17+CD8+ T cells in the CD8+ cells from the population of the cells is 5.5% of the CD8+ cells.

In some embodiments, the method provided herein increases the percentage of the Vβ17$^+$CD8$^+$ T cells in the CD8+ cells from the population of the cells by at least 10% of the initial percent of the Vβ17+CD8+ T cells in the CD8+ cells. In other embodiments, the method provided herein increases the percentage of the Vβ17$^+$CD8$^+$ T cells in the CD8+ cells from the population of the cells by at least 20% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 30% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 40% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 50% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 60%. of the initial percent of the Vβ17$^+$CD8$^+$ T cells in the CD8+ cells In other embodiments, the method provided herein increases the percentage of the Vβ17$^+$CD8$^+$ T cells in the CD8+ cells from the population of the cells by at least 70% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 80% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 90% of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 2 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 3 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 4 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 5 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 6 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 7 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 8 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 9 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 10 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 11 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 12 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 13 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 14 fold of the initial percent of the Vβ17$^+$CD8$^+$ T cells in the CD8+ cells. In other embodiments, the method provided herein increases the percentage of the Vβ17$^+$CD8$^+$ T cells in the CD8+ cells from the population of the cells by at least 15 fold of the initial percent of the Vβ17$^+$CD8$^+$ T cells in the CD8+ cells.

In some embodiments, the method provided herein increases the percentage of the Vβ17$^+$CD8$^+$ T cells in the CD8+ cells from the population of the cells by 10% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 20% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 30% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 40% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 50% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 60% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 70% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 80% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 90% to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 2 to 20 fold of the initial percent of the Vβ17$^+$CD8$^+$ T cells in the CD8+ cells. In some embodiments, the method provided herein increases the percentage of the Vβ17$^+$CD8$^+$ T cells in the CD8+ cells from the population of the cells by 3 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 4 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 5 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 6 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 7 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 8 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 9 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 10 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 11 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 12 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 13 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 14 to 20 fold of the initial percent of the Vβ17⁺CD8⁺ T cells in the CD8+ cells. In some embodiments, the method provided herein increases the percentage of the Vβ17⁺CD8⁺ T cells in the CD8+ cells from the population of the cells by 15 to 20 fold of the initial percent of the Vβ17⁺CD8⁺ T cells in the CD8+ cells.

As illustrated in FIG. 1, the baseline percentage of Vβ17⁺CD8⁺ T cells among CD8⁺ T cells among whole PBMCs of healthy individuals is about 5.5% of the CD8⁺ cells. In some embodiments, after contacting the population of cells comprising T cells with the M1 peptide derived from human influenza A virus (M1$_{58-66}$) and/or IL-2, the percentage of Vβ17⁺CD8⁺ T cells among CD8⁺ T cells is increased.

In some embodiments, the percentage of Vβ17⁺CD8⁺ T cells among CD8⁺ T cells after being contacted with the M1 peptide and/or IL-2 is at least 6% of the CD8⁺ cells. In some embodiments, the percentage of Vβ17⁺CD8⁺ T cells among CD8⁺ T cells after being contacted with the M1 peptide and/or IL-2 is at least 10% of the CD8⁺ cells. In some embodiments, the percentage of Vβ17⁺CD8⁺ T cells among CD8⁺ T cells after being contacted with the M1 peptide and/or IL-2 is at least 15% of the CD8⁺ cells. In some embodiments, the percentage of Vβ17⁺CD8⁺ T cells among CD8⁺ T cells after being contacted with the M1 peptide and/or IL-2 is at least 20% of the CD8⁺ cells. In some embodiments, the percentage of Vβ17⁺CD8⁺ T cells among CD8⁺ T cells after being contacted with the M1 peptide and/or IL-2 is at least 25% of the CD8⁺ cells. In some embodiments, the percentage of Vβ17⁺CD8⁺ T cells among CD8⁺ T cells after being contacted with the M1 peptide and/or IL-2 is at least 30% of the CD8⁺ cells. In some embodiments, the percentage of Vβ17⁺CD8⁺ T cells among CD8⁺ T cells after being contacted with the M1 peptide and/or IL-2 is at least 35% of the CD8⁺ cells. In some embodiments, the percentage of Vβ17⁺CD8⁺ T cells among CD8⁺ T cells after being contacted with the M1 peptide and/or IL-2 is at least 40% of the CD8⁺ cells. In some embodiments, the percentage of Vβ17+CD8+ T cells among CD8⁺ T cells after being contacted with the M1 peptide and/or IL-2 is at least 45% of the CD8⁺ cells. In some embodiments, the percentage of Vβ17⁺CD8⁺ T cells among CD8⁺ T cells after being contacted with the M1 peptide and/or IL-2 is at least 50% of the CD8⁺ cells. In some embodiments, the percentage of Vβ17⁺CD8⁺ T cells among CD8⁺ T cells after being contacted with the M1 peptide and/or IL-2 is at least 55% of the CD8⁺ cells. In some embodiments, the percentage of Vβ17⁺CD8⁺ T cells among CD8⁺ T cells after being contacted with the M1 peptide and/or IL-2 is at least 60% of the CD8⁺ cells. In some embodiments, the percentage of Vβ17⁺CD8⁺ T cells among CD8⁺ T cells after being contacted with the M1 peptide and/or IL-2 is at least 65% of the CD8⁺ cells. In some embodiments, the percentage of Vβ17⁺CD8⁺ T cells among CD8⁺ T cells after being contacted with the M1 peptide and/or IL-2 is at least 70% of the CD8⁺ cells. In some embodiments, the percentage of Vβ17⁺CD8⁺ T cells among CD8⁺ T cells after being contacted with the M1 peptide and/or IL-2 is at least 75% of the CD8⁺ cells. In some embodiments, the percentage of Vβ17⁺CD8⁺ T cells among CD8⁺ T cells after being contacted with the M1 peptide and/or IL-2 is at least 80% of the CD8⁺ cells. In some embodiments, the percentage of Vβ17⁺CD8⁺ T cells among CD8⁺ T cells after being contacted with the M1 peptide and/or IL-2 is at least 85% of the CD8⁺ cells. In some embodiments, the percentage of Vβ17⁺CD8⁺ T cells among CD8⁺ T cells after being contacted with the M1 peptide and/or IL-2 is at least 90% of the CD8⁺ cells. In some embodiments, the percentage of Vβ17⁺CD8⁺ T cells among CD8⁺ T cells is after being contacted with the M1 peptide. In some embodiments, the percentage of Vβ17⁺CD8⁺ T cells among CD8⁺ T cells is after being contacted with IL-2. In some embodiments, the percentage of Vβ17⁺CD8⁺ T cells among CD8⁺ T cells is after being contacted with the M1 peptide and IL-2.

In some embodiments, the percentage of Vβ17⁺CD8⁺ T cells among CD8⁺ T cells after being contacted with the M1 peptide and/or IL-2 is 6% to 99% of the CD8⁺ cells. In some embodiments, the percentage of Vβ17⁺CD8⁺ T cells among CD8⁺ T cells after being contacted with the M1 peptide and/or IL-2 is 10% to 99% of the CD8⁺ cells. In some embodiments, the percentage of Vβ17⁺CD8⁺ T cells among CD8⁺ T cells after being contacted with the M1 peptide and/or IL-2 is 15% to 99% of the CD8⁺ cells. In some embodiments, the percentage of Vβ17⁺CD8⁺ T cells among CD8⁺ T cells after being contacted with the M1 peptide and/or IL-2 is 20% to 99% of the CD8⁺ cells. In some embodiments, the percentage of Vβ17⁺CD8⁺ T cells among CD8⁺ T cells after being contacted with the M1 peptide and/or IL-2 is 25% to 99% of the CD8⁺ cells. In some embodiments, the percentage of Vβ17⁺CD8⁺ T cells among CD8$^+$ T cells after being contacted with the M1 peptide and/or IL-2 is 30% to 99% of the CD8$^+$ cells. In some embodiments, the percentage of Vβ17$^+$CD8$^+$ T cells among CD8$^+$ T cells after being contacted with the M1 peptide and/or IL-2 is 35% to 99% of the CD8+ cells. In some embodiments, the percentage of Vβ17$^+$CD8$^+$ T cells among CD8$^+$ T cells after being contacted with the M1 peptide and/or IL-2 is 40% to 99% of the CD8+ cells. In some embodiments, the percentage of Vβ17$^+$CD8$^+$ T cells among CD8$^+$ T cells after being contacted with the M1 peptide and/or IL-2 is 45% to 99% of the CD8+ cells. In some embodiments, the percentage of Vβ17$^+$CD8$^+$ T cells among CD8$^+$ T cells after being contacted with the M1 peptide and/or IL-2 is 50% to 99% of the CD8+ cells. In some embodiments, the percentage of Vβ17$^+$CD8$^+$ T cells among CD8$^+$ T cells after being contacted with the M1 peptide and/or IL-2 is 55% to 99% of the CD8+ cells. In some embodiments, the percentage of Vβ17$^+$CD8$^+$ T cells among CD8$^+$ T cells after being contacted with the M1 peptide and/or IL-2 is 60% to 99% of the CD8+ cells. In some embodiments, the percentage of Vβ17$^+$CD8$^+$ T cells among CD8$^+$ T cells after being contacted with the M1 peptide and/or IL-2 is 65% to 99% of the CD8+ cells. In some embodiments, the percentage of Vβ17$^+$CD8$^+$ T cells among CD8$^+$ T cells after being contacted with the M1 peptide and/or IL-2 is 70% to 99% of the CD8+ cells. In some embodiments, the percentage of Vβ17$^+$CD8$^+$ T cells among CD8$^+$ T cells after being contacted with the M1 peptide and/or IL-2 is 75% to 99% of the CD8+ cells. In some embodiments, the percentage of Vβ17$^+$CD8$^+$ T cells among CD8$^+$ T cells after being contacted with the M1 peptide and/or IL-2 is 80% to 99% of the CD8+ cells. In some embodiments, the percentage of Vβ17$^+$CD8$^+$ T cells among CD8$^+$ T cells after being contacted with the M1 peptide and/or IL-2 is 85% to 99% of the CD8+ cells. In some embodiments, the percentage of Vβ17$^+$CD8$^+$ T cells among CD8$^+$ T cells after being contacted with the M1 peptide and/or IL-2 is 90% to 99% of the CD8+ cells. In some embodiments, the percentage of Vβ17$^+$CD8$^+$ T cells among CD8$^+$ T cells is after being contacted with the M1 peptide. In some embodiments, the percentage of Vβ17$^+$CD8$^+$ T cells among CD8$^+$ T cells is after being contacted with IL-2. In some embodiments, the percentage of Vβ17$^+$CD8$^+$ T cells among CD8$^+$ T cells is after being contacted with the M1 peptide and IL-2.

5.2.3. Enrichment of CD8 Positive Cells

In some embodiments, the methods or processes provided here comprises isolating or enriching Vβ17+CD8+ T cells after M1 peptide stimulation.

In a specific embodiments, the method comprises isolating CD8+ cells first and then isolating Vβ17 positive cells. In a specific embodiments, the method comprises isolating Vβ17 positive cells first and then isolating CD8+ cells. In another specific embodiments, the method comprises isolating CD8+ cells and Vβ17 positive cells simultaneously.

CD8 is a transmembrane glycoprotein expressed on the surface of cytotoxic T-cells. CD8 forms a homo- or heterodimer comprised of either CD8 alpha and/or CD8 beta chains. CD8 interacts with class I MHC receptors during antigen-specific activation, and participates in T-cell receptor-mediated activation.

The method of isolating and enriching CD8+ cells are known to those of skill in the art. In some embodiments, the method of enriching CD8+ cells comprises positive or negative selection.

In some embodiments, the method of enriching CD8+ cells comprises using magnetic beads that are directly coated with anti-CD8 antibody or using anti-CD8 antibodies to coat cells and then the beads with a secondary reagent to bind antibodies. In some embodiments, the method of enriching CD8+ cells comprises using magnetic microparticles that are directly coated with anti-CD8 antibody or using anti-CD8 antibodies to coat cells and then the magnetic microparticles with a secondary reagent to bind antibodies. In some embodiments, the method of enriching CD8+ cells comprises using magnetic nanoparticle that are directly coated with anti-CD8 antibody or using anti-CD8 antibodies to coat cells and then the magnetic nanoparticle with a secondary reagent to bind antibodies. In some embodiments, the method of enriching CD8+ cells comprises density gradient centrifugation, for example but not limiting to using albumin, dextran, Ficoll, metrizamid, Percoll and the like, to remove undesired cells.

In other embodiments, the method of enriching CD8+ cells comprises a negative selection by incubating the cell mixture with reagents that bind to undesired cells. In some embodiments, the method of enriching CD8+ cells comprises a positive selection by selecting out cells with surface expression of CD8. In some specific embodiments, the method of enriching CD8+ cells comprises FACS sorting of CD8+ cells. In some other specific embodiments, the method of enriching CD8+ cells comprises using an anti-CD8 antibody which targets any of CD8 chains. In some specific embodiments, the method of enriching CD8+ cells comprises an affinity column immobilized with a binding agent to CD8. In some embodiments, the method of enriching CD8+ cells comprises a combination of two or more of the above methods.

In some more specific embodiments, the method for enriching or isolating CD8+ cells is as described in Section 7 below.

5.2.4. Enrichment of Vβ17 Positive Cells

In some embodiments, the method, provided herein, of enriching Vβ17 positive cells comprises selecting out cells with surface expression of Vβ17. In some other specific embodiments, the method of enriching Vβ17 positive cells comprises using an anti-Vβ17 antibody. In some embodiments, the method of enriching Vβ17 positive cells comprises using magnetic beads that are directly coated with anti-Vβ17 antibody or using anti-Vβ17 antibodies to coat cells and then the beads with a secondary reagent to bind antibodies. In some embodiments, the method of enriching Vβ17 positive cells comprises using magnetic microparticles that are directly coated with anti-Vβ17 antibody or using anti-Vβ17 antibodies to coat cells and then the magnetic microparticles with a secondary reagent to bind antibodies. In some embodiments, the method of enriching Vβ17 positive cells comprises using magnetic nanoparticle that are directly coated with anti-Vβ17 antibody or using anti-Vβ17 antibodies to coat cells and then the magnetic nanoparticle with a secondary reagent to bind antibodies. In some specific embodiments, the method of enriching Vβ17 positive cells comprises FACS sorting of Vβ17 positive cells. In some specific embodiments, the method of enriching Vβ17 positive cells comprises an affinity column immobilized with the a binding agent to Vβ17. In some embodiments, the method of enriching Vβ17 positive cells comprises a combination of two or more of the above methods.

In some more specific embodiments, the method for enriching or isolating Vβ17 positive cells is as described in Section 7 below.

5.2.5. Activation of the Enriched Vβ17$^+$CD8$^+$ T Cells

The method provided herein further comprises a step of activation and/or expansion of Vβ17$^+$CD8$^+$ T cells.

In some embodiments, the step of activation and/or expansion of Vβ17$^+$CD8$^+$ T cells comprises adding cytokines to the cells, and the cytokines include but are not limited to lectin, hepatic growth factor, prostaglandin, fibroblast growth factor, prolactin, placental lactogen, OB protein, tumor necrosis factor-α, tumor necrosis factor-β, mullerian-inhibiting substance, mouse gonadotropin-associated peptide, inhibin, activin, vascular endothelial growth factor, integrin, thrombopoietin (TPO), a nerve growth factor (NGF), platelet-growth factor, TGF-α, TGF-β, insulin-like growth factor-I, insulin-like growth factor-II, erythropoietin (EPO), an osteoinductive factor, interferon-α, interferon-β, interferon-λ, macrophage-CSF (M-CSF), granulocyte-macrophage-CSF (GM-CSF), granulocyte-CSF (G-CSF), interleukin-1 (IL-1), IL-1a, IL-2, IL-3, IL-4, IL-5, IL-6, IL-7, IL-8, IL-9, IL-10, IL-11, IL-12, IL-13, IL-14, IL-15, IL-16, IL-17, IL-18, IL-21, LIF, kit-ligand, FLT-3, angiostatin, thrombospondin, endostatin, tumor necrosis factor and LT (lymphotoxin). In some embodiments, the step of activation and/or expansion of Vβ17$^+$CD8$^+$ T cells comprises co-culturing the cells with feeder cells. In some embodiments, the step of activation and/or expansion of Vβ17$^+$CD8$^+$ T cells comprises adding an agent that inhibit immunosuppressive signals. In specific embodiments, the step of activation and/or expansion of Vβ17$^+$CD8$^+$ T cells comprises immune checkpoint inhibitors. In specific embodiments, the step of activation and/or expansion of Vβ17$^+$CD8$^+$ T cells comprises anti-PD-1 antibody or antigen-binding fragment thereof. In a specific embodiment, the step of activation and/or expansion of Vβ17$^+$CD8$^+$ T cells comprises anti-CD3/CD28 beads.

5.3. Vβ17$^+$CD8$^+$ T Cells

In another aspect, provided herein is a T cell, wherein the T cell is a Vβ17$^+$CD8$^+$ T cell, and wherein the T cell express a cell surface receptor capable of binding the M1 peptide comprising an amino acid sequence of SEQ ID NO:1.

In another aspect, provided herein is an isolated population of Vβ17$^+$CD8$^+$ T cells produced by the method provided herein. In some embodiments, the Vβ17$^+$CD8$^+$ T cells comprises a cell surface receptor (e.g., TCR) capable of binding M1 peptide comprising an amino acid sequence of SEQ ID NO:1.

In yet another aspect, provided herein is an isolated population of cells, wherein the percentage of Vβ17$^+$CD8$^+$ T cells in the isolated population of the cells is more than 6%, 10%, 15%, 20%, 25%, 30%, 35%, 40%, 45%, 50%, 55%, 60%, 65%, 70%, 75%, 80%, 85%, or 90% of the isolated population of the cells. In some embodiments, provided herein is an isolated population of cells, wherein the percentage of Vβ17$^+$CD8$^+$ T cells in the isolated population of the cells is more than 10% of the isolated population of the cells. In some embodiments, provided herein is an isolated population of cells, wherein the percentage of Vβ17$^+$CD8$^+$ T cells in the isolated population of the cells is more than 15% of the isolated population of the cells. In some embodiments, provided herein is an isolated population of cells, wherein the percentage of Vβ17$^+$CD8$^+$ T cells in the isolated population of the cells is more than 20% of the isolated population of the cells. In some embodiments, provided herein is an isolated population of cells, wherein the percentage of Vβ17$^+$CD8$^+$ T cells in the isolated population of the cells is more than 25% of the isolated population of the cells. In some embodiments, provided herein is an isolated population of cells, wherein the percentage of Vβ17$^+$CD8$^+$ T cells in the isolated population of the cells is more than 30% of the isolated population of the cells. In some embodiments, provided herein is an isolated population of cells, wherein the percentage of Vβ17$^+$CD8$^+$ T cells in the isolated population of the cells is more than 35% of the isolated population of the cells. In some embodiments, provided herein is an isolated population of cells, wherein the percentage of Vβ17$^+$CD8$^+$ T cells in the isolated population of the cells is more than 40% of the isolated population of the cells. In some embodiments, provided herein is an isolated population of cells, wherein the percentage of Vβ17$^+$CD8$^+$ T cells in the isolated population of the cells is more than 45% of the isolated population of the cells. In some embodiments, provided herein is an isolated population of cells, wherein the percentage of Vβ17$^+$CD8$^+$ T cells in the isolated population of the cells is more than 50% of the isolated population of the cells. In some embodiments, provided herein is an isolated population of cells, wherein the percentage of Vβ17$^+$CD8$^+$ T cells in the isolated population of the cells is more than 55% of the isolated population of the cells. In some embodiments, provided herein is an isolated population of cells, wherein the percentage of Vβ17$^+$CD8$^+$ T cells in the isolated population of the cells is more than 60% of the isolated population of the cells. In some embodiments, provided herein is an isolated population of cells, wherein the percentage of Vβ17$^+$CD8$^+$ T cells in the isolated population of the cells is more than 65% of the isolated population of the cells. In some embodiments, provided herein is an isolated population of cells, wherein the percentage of Vβ17$^+$CD8$^+$ T cells in the isolated population of the cells is more than 70% of the isolated population of the cells. In some embodiments, provided herein is an isolated population of cells, wherein the percentage of Vβ17$^+$CD8$^+$ T cells in the isolated population of the cells is more than 75% of the isolated population of the cells. In some embodiments, provided herein is an isolated population of cells, wherein the percentage of Vβ17$^+$CD8$^+$ T cells in the isolated population of the cells is more than 80% of the isolated population of the cells. In some embodiments, provided herein is an isolated population of cells, wherein the percentage of Vβ17$^+$CD8$^+$ T cells in the isolated population of the cells is more than 85% of the isolated population of the cells. In some embodiments, provided herein is an isolated population of cells, wherein the percentage of Vβ17$^+$CD8$^+$ T cells in the isolated population of the cells is more than 90% of the isolated population of the cells. In some embodiments, provided herein is an isolated population of cells, wherein the percentage of Vβ17$^+$CD8$^+$ T cells in the isolated population of the cells is more than 95% of the isolated population of the cells.

In some embodiments, provided herein is an isolated population of cells, wherein the percentage of Vβ17$^+$CD8$^+$ T cells in the isolated population of the cells is 6% to 99% of the isolated population of the cells. In some embodiments, provided herein is an isolated population of cells, wherein the percentage of Vβ17$^+$CD8$^+$ T cells in the isolated population of the cells is 10% to 99% of the isolated population of the cells. In some embodiments, provided herein is an isolated population of cells, wherein the percentage of Vβ17⁺CD8⁺ T cells in the isolated population of the cells is 15% to 99% of the isolated population of the cells. In some embodiments, provided herein is an isolated population of cells, wherein the percentage of Vβ17+CD8+ T cells in the isolated population of the cells is 20% to 99% of the isolated population of the cells. In some embodiments, provided herein is an isolated population of cells, wherein the percentage of Vβ17⁺CD8⁺ T cells in the isolated population of the cells is 25% to 99% of the isolated population of the cells. In some embodiments, provided herein is an isolated population of cells, wherein the percentage of Vβ17⁺CD8⁺ T cells in the isolated population of the cells is 30% to 99% of the isolated population of the cells. In some embodiments, provided herein is an isolated population of cells, wherein the percentage of Vβ17⁺CD8⁺ T cells in the isolated population of the cells is 35% to 99% of the isolated population of the cells. In some embodiments, provided herein is an isolated population of cells, wherein the percentage of Vβ17⁺CD8⁺ T cells in the isolated population of the cells is 40% to 99% of the isolated population of the cells. In some embodiments, provided herein is an isolated population of cells, wherein the percentage of Vβ17⁺CD8⁺ T cells in the isolated population of the cells is 45% to 99% of the isolated population of the cells. In some embodiments, provided herein is an isolated population of cells, wherein the percentage of Vβ17⁺CD8⁺ T cells in the isolated population of the cells is 50% to 99% of the isolated population of the cells. In some embodiments, provided herein is an isolated population of cells, wherein the percentage of Vβ17⁺CD8⁺ T cells in the isolated population of the cells is 55% to 99% of the isolated population of the cells. In some embodiments, provided herein is an isolated population of cells, wherein the percentage of Vβ17+CD8+ T cells in the isolated population of the cells is 60% to 99% of the isolated population of the cells. In some embodiments, provided herein is an isolated population of cells, wherein the percentage of Vβ17⁺CD8⁺ T cells in the isolated population of the cells is 65% to 99% of the isolated population of the cells. In some embodiments, provided herein is an isolated population of cells, wherein the percentage of Vβ17⁺CD8⁺ T cells in the isolated population of the cells is 70% to 99% of the isolated population of the cells. In some embodiments, provided herein is an isolated population of cells, wherein the percentage of Vβ17⁺CD8⁺ T cells in the isolated population of the cells is 75% to 99% of the isolated population of the cells. In some embodiments, provided herein is an isolated population of cells, wherein the percentage of Vβ17⁺CD8⁺ T cells in the isolated population of the cells is 80% to 99% of the isolated population of the cells. In some embodiments, provided herein is an isolated population of cells, wherein the percentage of Vβ17⁺CD8⁺ T cells in the isolated population of the cells is 85% to 99% of the isolated population of the cells. In some embodiments, provided herein is an isolated population of cells, wherein the percentage of Vβ17⁺CD8⁺ T cells in the isolated population of the cells is 90% to 99% of the isolated population of the cells.

In some embodiments, at least part of the Vβ17⁺CD8⁺ T cells express a cell surface receptor (e.g., TCR) capable of binding to the M1 peptide.

In yet another aspect, provided herein are methods for using the Vβ17⁺CD8⁺ T cells provided herein, for example, for allogenic CAR-T cell therapies as described in more detail below in Section 5.4 to Section 5.8 below.

5.4. Methods for Producing Influenza A Virus Specific Vβ17⁺CD8⁺ T Cells Expressing Chimeric Antigen Receptors In another aspect, provided herein is a method for making a CAR-T cell, comprising introducing a nucleic acid encoding a chimeric antigen receptor (CAR) into a Vβ17⁺CD8⁺ T cell. In some embodiments, the Vβ17⁺CD8⁺ T cell is produced according the method or process described in Section 5.2 and Section 5.3 above.

More specifically, in some embodiments of the present method for making a CAR-T cell comprises activating or enriching Vβ17⁺CD8⁺ T cells by contacting a peptide from matrix protein derived from human influenza A virus with a population of cells comprising T cells provided herein.

The population of T cells can be obtained from a number of sources. In some embodiments, the population of cells comprising T cells is collected, isolated, purified or induced from a body fluid, a tissue or an organ including but not limited to peripheral blood, umbilical cord blood, bone marrow, lymph node, the thymus, spleen, or other tissues or fluids of a mammal. In other embodiments, the population of cells comprising T cells is obtained from a cultured T-cell line. In specific embodiments, the population of cells comprising T cells is peripheral blood lymphocytes, precursor cells of T cells (such as hematopoietic stem cells, lymphocyte precursor cells etc.) or a cell population containing them. In a specific embodiment, the population of cells comprising T cells is PBMCs. In some embodiments, the PBMCs are from a healthy donor.

In some embodiments, the peptide from matrix protein derived from human influenza A virus is a M1 peptide derived from human influenza A virus ($M1_{58-66}$) comprising an amino acid sequence of GILGFVFTL (SEQ ID NO:1). In other embodiments, the peptide from matrix protein derived from human influenza A virus is peptide 57-68 (KGILGFVFTLTV (SEQ ID NO:9)). In other embodiments, the peptide from matrix protein derived from human influenza A virus is peptide 57-67 (KGILGFVFTLT (SEQ ID NO:10)). In other embodiments, the peptide from matrix protein derived from human influenza A virus is peptide 57-66 (KGILGFVFTL (SEQ ID NO:11)). In other embodiments, the peptide from matrix protein derived from human influenza A virus is peptide 58-68 (GILGFVFTLV (SEQ ID NO:12)). In other embodiments, the peptide from matrix protein derived from human influenza A virus is peptide 58-67 (GILGFVFTLT (SEQ ID NO:13)).

In some embodiments, the method provided herein comprises contacting the M1 peptide derived from human influenza A virus ($M1_{58-66}$) with the population of cells comprising T cells with a certain M1 peptide to cell ratio, for example, 1 to 10 µg/ml of M1 peptide with $10^3$ to $10^{11}$ cells. In some embodiments, the M1 peptide to cell ratio is 1 µg/ml of M1 peptide with about $2.5 \times 10^3$ cells, about $2.5 \times 10^4$ cells, about $2.5 \times 10^5$ cells, about $2.5 \times 10^6$ cells, about $2.5 \times 10^7$ cells, about $2.5 \times 10^8$ cells, about $2.5 \times 10^9$ cells, or about $2.5 \times 10^{10}$ cells.

In some embodiments, the method provided herein comprises contacting the M1 peptide derived from human influenza A virus ($M1_{58-66}$) with the population of cells comprising T cells for certain amount of time. In some embodiments, the M1 peptide contacts the cells for 1 day, 2 days, 3 days, 4 days, 5 days, 6 days, 7 days, 8 days, 9 days, 10 days, 11 days, 12 days, 13 days, 14 days or longer. In some embodiments, the M1 peptide contacts the cells for 1 day. In some embodiments, the M1 peptide contacts the cells for 2 days. In some embodiments, the M1 peptide contacts the cells for 2 days. In some embodiments, the M1 peptide contacts the cells for 3 days. In some embodiments, the M1 peptide contacts the cells for 4 days. In some embodiments, the M1 peptide contacts the cells for 5 days. In some embodiments, the M1 peptide contacts the cells for 6 days. In some embodiments, the M1 peptide contacts the cells for 7 days. In some embodiments, the M1 peptide contacts the cells for 8 days. In some embodiments, the M1 peptide contacts the cells for 9 days. In some embodiments, the M1 peptide contacts the cells for 10 days. In some embodiments, the M1 peptide contacts the cells for 11 days. In some embodiments, the M1 peptide contacts the cells for 12 days. In some embodiments, the M1 peptide contacts the cells for 13 days. In some embodiments, the M1 peptide contacts the cells for 14 days. In some embodiments, the M1 peptide contacts the cells for 1 to 20 days. In some embodiments, the M1 peptide contacts the cells for 2 to 18 days. In some embodiments, the M1 peptide contacts the cells for 3 to 16 days. In some embodiments, the M1 peptide contacts the cells for 4 to 14 days. In some embodiments, the M1 peptide contacts the cells for 5 to 14 days. In some embodiments, the M1 peptide contacts the cells for 6 to 14 days. In some embodiments, the M1 peptide contacts the cells for 7 to 14 days. In some embodiments, the M1 peptide contacts the cells for 8 to 14 days. In some embodiments, the M1 peptide contacts the cells for 9 to 14 days. In some embodiments, the M1 peptide contacts the cells for 10 to 14 days. In some embodiments, the M1 peptide contacts the cells for 11 to 14 days. In some embodiments, the M1 peptide contacts the cells for 12 to 14 days. In some embodiments, the cells are contacted with the M1 peptide continuously for a period of time. In some embodiments, the cells are contacted with the M1 peptide for a period of time, and then the cells are cultured without the M1 peptide for another period of time before the cells are contacted with the M1 peptide again.

In some embodiments, the method provided herein further comprises contacting an agent of immunostimulation or immunoregulation with the population of the cells comprising the T cells that have been contacted with the M1 peptide. In some specific embodiments, the agent of immunostimulation or immunoregulation is able to stimulate T cells. In a preferred embodiment, the agent of immunostimulation or immunoregulation is IL-2.

In some embodiments, the method provided herein further comprises contacting IL-2 with the population of the cells comprising the T cells with a certain IL-2 to cell ratio, e.g., 100 to 250 IU of IL-2 with $10^3$ to $10^{11}$ cells. In some embodiments, the IL-2 to cell ratio is 210 IU of IL-2 with about $2.5\times10^3$ cells, about $2.5\times10^4$ cells, about $2.5\times10^5$ cells, about $2.5\times10^6$ cells, about $2.5\times10^7$ cells, about $2.5\times10^8$ cells, about $2.5\times10^9$ cells, or about $2.5\times10^{10}$ cells.

In some embodiments, the method provided herein further comprises contacting IL-2 with the population of the cells comprising the T cells for certain amount of time. In some embodiments, IL-2 contacts the cells for 1 day, 2 days, 3 days, 4 days, 5 days, 6 days, 7 days, 8 days, 9 days, 10 days, 11 days, 12 days, 13 days, 14 days or longer. In some embodiments, the IL-2 contacts the cells for 1 day. In some embodiments, the IL-2 contacts the cells for 2 days. In some embodiments, the IL-2 contacts the cells for 2 days. In some embodiments, the IL-2 contacts the cells for 3 days. In some embodiments, the IL-2 contacts the cells for 4 days. In some embodiments, the IL-2 contacts the cells for 5 days. In some embodiments, the IL-2 contacts the cells for 6 days. In some embodiments, the IL-2 contacts the cells for 7 days. In some embodiments, the IL-2 contacts the cells for 8 days. In some embodiments, the IL-2 contacts the cells for 9 days. In some embodiments, the IL-2 contacts the cells for 10 days. In some embodiments, the IL-2 contacts the cells for 11 days. In some embodiments, the IL-2 contacts the cells for 12 days. In some embodiments, the IL-2 contacts the cells for 13 days. In some embodiments, the IL-2 contacts the cells for 14 days. In some embodiments, the cells are contacted with IL-2 for 1 to 20 days. In some embodiments, the cells are contacted with IL-2 for 2 to 18 days. In some embodiments, the cells are contacted with IL-2 for 3 to 16 days. In some embodiments, the cells are contacted with IL-2 for 4 to 14 days. In some embodiments, the cells are contacted with IL-2 for 5 to 14 days. In some embodiments, the cells are contacted with IL-2 for 6 to 14 days. In some embodiments, the cells are contacted with IL-2 for 7 to 14 days. In some embodiments, the cells are contacted with IL-2 for 8 to 14 days. In some embodiments, the cells are contacted with IL-2 for 9 to 14 days. In some embodiments, the cells are contacted with IL-2 for 10 to 14 days. In some embodiments, the cells are contacted with IL-2 for 11 to 14 days. In some embodiments, the cells are contacted with IL-2 for 12 to 14 days.

In certain embodiments, the population of the cells comprising T cells provided herein are contacted with the M1 peptide and/or IL-2 ex vivo, e.g., in a culture medium. In some embodiments, the method comprises culturing the population of the cells ex vivo in a medium comprising the M1 peptide and IL-2 for a period of time, e.g., for 5 to 20 days.

In other embodiments, the method comprises culturing the population of the cells ex vivo in a medium comprising the M1 peptide for a period of time, e.g., for 5 to 10 days, and then culturing the population of the cells ex vivo in a medium comprising IL-2 for a period of time, e.g., for another 5 to 10 days.

In yet other embodiments, the method comprises culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2. For example, the population of the cells is first cultured ex vivo in a medium comprising the M1 peptide for a period of time, and then IL-2 is added into the medium for a period of time. Then the cells are washed and cultured again in a medium comprising IL-2. In a specific embodiment, the population of the cells is first cultured ex vivo in a medium comprising the M1 peptide for 1 to 3 days before IL-2 is added into the medium; the population of the cells is then cultured ex vivo in the medium comprising both M1 peptide and IL-2 for 1 to 7 days; and then the cells are washed and cultured in a medium comprising IL-2 for 1 to 10 days. In another specific embodiment, the population of the cells comprising the T cells are cultured using a method as illustrated in Section 7 below.

In some embodiments, the amount of a specific type of cells is measured by methods well known to those skilled in the art. In some embodiments, the amount of a specific type of cells is measured by flow cytometry analysis.

In some embodiments, the initial percent of the Vβ17+CD8+ T cells in the CD8+ cells from the population of the cells is 2-10% of the CD8+ cells. In some embodiments, the initial percent of the Vβ17$^+$CD8$^+$ T cells in the CD8+ cells from the population of the cells is 3-8% of the CD8+ cells. In some embodiments, the initial percent of the Vβ17$^+$CD8$^+$ T cells in the CD8+ cells from the population of the cells is 4-6% of the CD8+ cells. In some embodiments, the initial percent of the Vβ17$^+$CD8$^+$ T cells in the CD8+ cells from the population of the cells is 4-5% of the CD8+ cells. In some embodiments, the initial percent of the Vβ17$^+$CD8$^+$ T cells in the CD8+ cells from the population of the cells is 5-6% of the CD8+ cells. In some embodiments, the initial percent of the Vβ17$^+$CD8$^+$ T cells in the CD8+ cells from the population of the cells is 5.5% of the CD8+ cells.

In some embodiments, M1 stimulation increases the percentage of the Vβ17$^+$CD8$^+$ T cells in the CD8+ cells from the population of the cells by at least 10%, at least 20%, at least 30%, at least 40%, at least 50%, at least 60%, at least 70%, at least 80%, at least 90%, at least 2 fold, at least 3 fold, at least 4 fold, at least 5 fold, at least 6 fold, at least 7 fold, at least 8 fold, at least 9 fold, at least 10 fold, at least 11 fold, at least 12 fold, at least 13 fold, at least 14 fold, at least 15 fold or more of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 10% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 20% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 30% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 40% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 50% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 60% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 70% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 80% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 90% of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 2 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 3 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 4 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 5 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 6 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 7 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 8 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 9 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 10 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 11 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 12 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 13 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 14 fold of the initial percent of the Vβ17$^+$CD8$^+$ T cells in the CD8+ cells. In some embodiments, M1 stimulation increases the percentage of the Vβ17$^+$CD8$^+$ T cells in the CD8+ cells from the population of the cells by at least 15 fold of the initial percent of the Vβ17$^+$CD8$^+$ T cells in the CD8+ cells.

In some embodiments, M1 stimulation increases the percentage of the Vβ17$^+$CD8$^+$ T cells in the CD8+ cells from the population of the cells by 10% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 20% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 30% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 40% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 50% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 60% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 70% to 20 fold of the initial percent of the Vβ17+CD8+ T cells in the CD8+ cells. In some embodiments, M1 stimulation increases the percentage of the Vβ17$^+$CD8$^+$ T cells in the CD8+ cells from the population of the cells by 80% to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 90% to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 2 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 3 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 4 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 5 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 6 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 7 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 8 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 9 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 10 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 11 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 12 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 13 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 14 to 20 fold of the initial percent of the Vβ17+CD8+ T cells in the CD8+ cells. In some embodiments, M1 stimulation increases the percentage of the Vβ17⁺CD8⁺ T cells in the CD8+ cells from the population of the cells by 15 to 20 fold of the initial percent of the Vβ17+CD8+ T cells in the CD8+ cells.

In some embodiments, after contacting the population of cells comprising T cells with the M1 peptide derived from human influenza A virus ($M1_{58-66}$) and/or IL-2, the percentage of Vβ17⁺CD8⁺ T cells among CD8⁺ T cells is increased. In some embodiments, the percentage of Vβ17⁺CD8⁺ T cells among CD8⁺ T cells after being contacted with the M1 peptide and/or IL-2 is at least 6%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or more of the CD8+ cells.

In some embodiments, the percentage of Vβ17⁺CD8⁺ T cells among CD8⁺ T cells after being contacted with the M1 peptide and/or IL-2 is 6% to 99% of the CD8+ cells. In some embodiments, the percentage of Vβ17⁺CD8⁺ T cells among CD8⁺ T cells after being contacted with the M1 peptide and/or IL-2 is 10% to 99% of the CD8+ cells. In some embodiments, the percentage of Vβ17⁺CD8⁺ T cells among CD8⁺ T cells after being contacted with the M1 peptide and/or IL-2 is 15% to 99% of the CD8+ cells. In some embodiments, the percentage of Vβ17⁺CD8⁺ T cells among CD8⁺ T cells after being contacted with the M1 peptide and/or IL-2 is 20% to 99% of the CD8+ cells. In some embodiments, the percentage of Vβ17⁺CD8⁺ T cells among CD8⁺ T cells after being contacted with the M1 peptide and/or IL-2 is 25% to 99% of the CD8+ cells. In some embodiments, the percentage of Vβ17⁺CD8⁺ T cells among CD8⁺ T cells after being contacted with the M1 peptide and/or IL-2 is 30% to 99% of the CD8+ cells. In some embodiments, the percentage of Vβ17⁺CD8⁺ T cells among CD8⁺ T cells after being contacted with the M1 peptide and/or IL-2 is 35% to 99% of the CD8+ cells. In some embodiments, the percentage of Vβ17⁺CD8⁺ T cells among CD8⁺ T cells after being contacted with the M1 peptide and/or IL-2 is 40% to 99% of the CD8+ cells. In some embodiments, the percentage of Vβ17⁺CD8⁺ T cells among CD8⁺ T cells after being contacted with the M1 peptide and/or IL-2 is 45% to 99% of the CD8+ cells. In some embodiments, the percentage of Vβ17⁺CD8⁺ T cells among CD8⁺ T cells after being contacted with the M1 peptide and/or IL-2 is 50% to 99% of the CD8+ cells. In some embodiments, the percentage of Vβ17⁺CD8⁺ T cells among CD8⁺ T cells after being contacted with the M1 peptide and/or IL-2 is 55% to 99% of the CD8+ cells. In some embodiments, the percentage of Vβ17⁺CD8⁺ T cells among CD8⁺ T cells after being contacted with the M1 peptide and/or IL-2 is 60% to 99% of the CD8+ cells. In some embodiments, the percentage of Vβ17⁺CD8⁺ T cells among CD8⁺ T cells after being contacted with the M1 peptide and/or IL-2 is 65% to 99% of the CD8+ cells. In some embodiments, the percentage of Vβ17⁺CD8⁺ T cells among CD8⁺ T cells after being contacted with the M1 peptide and/or IL-2 is 70% to 99% of the CD8+ cells. In some embodiments, the percentage of Vβ17⁺CD8⁺ T cells among CD8⁺ T cells after being contacted with the M1 peptide and/or IL-2 is 75% to 99% of the CD8+ cells. In some embodiments, the percentage of Vβ17⁺CD8⁺ T cells among CD8⁺ T cells after being contacted with the M1 peptide and/or IL-2 is 80% to 99% of the CD8+ cells. In some embodiments, the percentage of Vβ17⁺CD8⁺ T cells among CD8⁺ T cells after being contacted with the M1 peptide and/or IL-2 is 85% to 99% of the CD8+ cells. In some embodiments, the percentage of Vβ17⁺CD8⁺ T cells among CD8⁺ T cells after being contacted with the M1 peptide and/or IL-2 is 90% to 99% of the CD8+ cells.

In some embodiments, the methods or processes provided here comprises isolating or enriching Vβ17⁺CD8⁺ T cells after M1 peptide stimulation. In a specific embodiments, the method comprises isolating CD8+ cells first and then isolating Vβ17 positive cells. In a specific embodiments, the method comprises isolating Vβ17 positive cells first and then isolating CD8+ cells. In another specific embodiments, the method comprises isolating CD8+ cells and Vβ17 positive cells simultaneously.

The method provided herein further comprises a step of activation and/or expansion of Vβ17+CD8+ T cells. In some embodiments, the step of activation and/or expansion of Vβ17+CD8+ T cells comprises adding cytokines to the cells, and the cytokines include but are not limited to lectin, hepatic growth factor, prostaglandin, fibroblast growth factor, prolactin, placental lactogen, OB protein, tumor necrosis factor-α, tumor necrosis factor-β, mullerian-inhibiting substance, mouse gonadotropin-associated peptide, inhibin, activin, vascular endothelial growth factor, integrin, thrombopoietin (TPO), a nerve growth factor (NGF), platelet-growth factor, TGF-α, TGF-β, insulin-like growth factor-I, insulin-like growth factor-II, erythropoietin (EPO), an osteoinductive factor, interferon-α, interferon-β, interferon-λ, macrophage-CSF (M-CSF), granulocyte-macrophage-CSF (GM-CSF), granulocyte-CSF (G-CSF), interleukin-1 (IL-1), IL-1α, IL-2, IL-3, IL-4, IL-5, IL-6, IL-7, IL-8, IL-9, IL-10, IL-11, IL-12, IL-13, IL-14, IL-15, IL-16, IL-17, IL-18, IL-21, LIF, kit-ligand, FLT-3, angiostatin, thrombospondin, endostatin, tumor necrosis factor and LT (lymphotoxin). In some embodiments, the step of activation and/or expansion of Vβ17+CD8+ T cells comprises co-culturing the cells with feeder cells. In some embodiments, the step of activation and/or expansion of Vβ17+CD8+ T cells comprises adding an agent that inhibit immunosuppressive signals. In specific embodiments, the step of activation and/or expansion of Vβ17+CD8+ T cells comprises immune checkpoint inhibitors. In specific embodiments, the step of activation and/or expansion of Vβ17+CD8+ T cells comprises anti-PD-1 antibody or antigen-binding fragment thereof. In a specific embodiment, the step of activation and/or expansion of Vβ17+CD8+ T cells comprises anti-CD3/CD28 beads.

5.4.1. Chimeric Antigen Receptors

The method provided herein for generating a CAR-T cell comprises introducing a nucleic acid encoding a chimeric antigen receptor (CAR) into a Vβ17+CD8+ T cell.

In some embodiments, the CAR provided herein comprises a polypeptide comprising: (a) an extracellular antigen binding domain; (b) a transmembrane domain; and (c) an intracellular signaling domain.
Signal Peptide In certain embodiments, the CARs provided herein may comprise a signal peptide (also known as a signal sequence) at the N-terminus of the polypeptide. In general, signal peptides are peptide sequences that target a polypeptide to the desired site in a cell. In some embodiments, the signal peptide targets the effector molecule to the secretory pathway of the cell and will allow for integration and anchoring of the effector molecule into the lipid bilayer. Signal peptides including signal sequences of naturally occurring proteins or synthetic, non-naturally occurring signal sequences, which are compatible for use in the CARs described herein will be evident to one of skill in the art. In some embodiments, the signal peptide is derived from a molecule selected from the group consisting of CD8α, GM-CSF receptor α, and IgG1 heavy chain. In a specific embodiment, the signal peptide comprises an amino acid sequence of SEQ ID NO:2.
Extracellular Antigen Binding Domain The extracellular antigen binding domain of the CARs described herein comprises one or more antigen binding domains. In some embodiments, the extracellular antigen binding domain of the CAR provided herein is monospecific. In other embodiments, the extracellular antigen binding domain of the CAR provided herein is multispecific. In some embodiments, the extracellular antigen binding domain comprises two or more antigen binding domains which are fused to each other directly via peptide bonds, or via peptide linkers.

In some embodiments, the extracellular antigen binding domain comprises an antibody or a fragment thereof. For example, the binding domain may be derived from monoclonal antibodies (including agonist, antagonist, neutralizing antibodies, full length or intact monoclonal antibodies), antibody with polyepitopic or monoepitopic specificity, polyclonal or monovalent antibodies, multivalent antibodies, multispecific antibodies (e.g., bispecific antibodies so long as they exhibit the desired biological activity), formed from at least two intact antibodies, single chain antibodies, and fragments thereof (e.g., domain antibodies). An antibody can be human, humanized, chimeric and/or affinity matured, as well as an antibody from other species, for example, mouse, rabbit, llama, etc. In some embodiments, the antibody include a polypeptide product of B cells within the immunoglobulin class of polypeptides that is able to bind to a specific molecular antigen and is composed of two identical pairs of polypeptide chains, wherein each pair has one heavy chain (about 50-70 kDa) and one light chain (about 25 kDa), each amino-terminal portion of each chain includes a variable region of about 100 to about 130 or more amino acids, and each carboxy-terminal portion of each chain includes a constant region. See, e.g., *Antibody Engineering* (Borrebaeck ed., 2d ed. 1995); and Kuby, *Immunology* (3d ed. 1997). Antibodies also include, but are not limited to, synthetic antibodies, recombinantly produced antibodies, single domain antibodies including from Camelidae species (e.g., llama or alpaca) or their humanized variants, intrabodies, anti-idiotypic (anti-Id) antibodies, and functional fragments (e.g., antigen-binding fragments) of any of the above, which refers to a portion of an antibody heavy or light chain polypeptide that retains some or all of the binding activity of the antibody from which the fragment was derived. Non-limiting examples of functional fragments (e.g., antigen-binding fragments) include single-chain Fvs (scFv) (e.g., including monospecific, bispecific, etc.), Fab fragments, F(ab') fragments, F(ab)$_2$ fragments, F(ab')$_2$ fragments, disulfide-linked Fvs (dsFv), Fd fragments, Fv fragments, diabody, triabody, tetrabody, and minibody. In particular, antibodies provided herein include immunoglobulin molecules and immunologically active portions of immunoglobulin molecules, for example, antigen-binding domains or molecules that contain an antigen-binding site that binds to an antigen (e.g., one or more CDRs of an antibody). Such antibody fragments can be found in, for example, Harlow and Lane, *Antibodies: A Laboratory Manual* (1989); *Mol. Biology and Biotechnology: A Comprehensive Desk Reference* (Myers ed., 1995); Huston et al., 1993, Cell Biophysics 22:189-224; Pluckthun and Skerra, 1989, Meth. Enzymol. 178:497-515; and Day, *Advanced Immunochemistry* (2d ed. 1990). The antibodies provided herein can be of any class (e.g., IgG, IgE, IgM, IgD, and IgA) or any subclass (e.g., IgG1, IgG2, IgG3, IgG4, IgA1, and IgA2) of immunoglobulin molecule. Antibodies may be agonistic antibodies or antagonistic antibodies. Antibodies may be neither agonistic nor antagonistic.

In a specific embodiment, the extracellular antigen binding domain of the present CARs comprise a single-chain FIT (sFv or scFv). ScFvs are antibody fragments that comprise the VH and VL antibody domains connected into a single polypeptide chain. Preferably, the scFv polypeptide further comprises a polypeptide linker between the VH and VL domains which enables the sFv to form the desired structure for antigen binding. See Pluckthun in The Pharmacology of Monoclonal Antibodies, vol. 113, Rosenburg and Moore eds., Springer-Verlag, New York, pp. 269-315 (1994).

In another specific embodiment, the extracellular antigen binding domain of the present CARs comprises one or more single domain antibodies (sdAbs). The sdAbs may be of the same or different origins, and of the same or different sizes. Exemplary sdAbs include, but are not limited to, heavy chain variable domains from heavy-chain only antibodies (e.g., VHH or $V_{NAR}$), binding molecules naturally devoid of light chains, single domains (such as $V_H$ or $V_L$) derived from conventional 4-chain antibodies, humanized heavy-chain only antibodies, human single domain antibodies produced by transgenic mice or rats expressing human heavy chain segments, and engineered domains and single domain scaffolds other than those derived from antibodies. Any sdAbs known in the art or developed by the present disclosure, including the single domain antibodies described above in the present disclosure, may be used to construct the CARs described herein. The sdAbs may be derived from any species including, but not limited to mouse, rat, human, camel, llama, lamprey, fish, shark, goat, rabbit, and bovine. Single domain antibodies contemplated herein also include naturally occurring single domain antibody molecules from species other than Camelidae and sharks.

In some embodiments, the sdAb is derived from a naturally occurring single domain antigen binding molecule known as heavy chain antibody devoid of light chains (also referred herein as "heavy chain only antibodies"). Such single domain molecules are disclosed in WO 94/04678 and Hamers-Casterman, C. et al., *Nature* 363:446-448 (1993), for example. For clarity reasons, the variable domain derived from a heavy chain molecule naturally devoid of light chain is known herein as a VHH to distinguish it from the conventional $V_H$ of four chain immunoglobulins. Such a VHH molecule can be derived from antibodies raised in *Camelidae* species, for example, camel, llama, vicuna, dromedary, alpaca and guanaco. Other species besides Camelidae may produce heavy chain molecules naturally devoid of light chain, and such VHHs are within the scope of the present disclosure. In addition, humanized versions of VHHs as well as other modifications and variants are also contemplated and within the scope of the present disclosure. In some embodiments, the sdAb is derived from a variable region of the immunoglobulin found in cartilaginous fish. For example, the sdAb can be derived from the immunoglobulin isotype known as Novel Antigen Receptor (NAR) found in the serum of shark. Methods of producing single domain molecules derived from a variable region of NAR ("IgNARs") are described in WO 03/014161 and Streltsov, *Protein Sci.* 14:2901-2909 (2005).

In some embodiments, naturally occurring VHH domains against a particular antigen or target, can be obtained from (naïve or immune) libraries of Camelid VHH sequences. Such methods may or may not involve screening such a library using said antigen or target, or at least one part, fragment, antigenic determinant or epitope thereof using one or more screening techniques known in the field. Such libraries and techniques are for example described in WO 99/37681, WO 01/90190, WO 03/025020 and WO 03/035694. Alternatively, improved synthetic or semi-synthetic libraries derived from (naïve or immune) VHH libraries may be used, such as VHH libraries obtained from (naïve or immune) VHH libraries by techniques such as random mutagenesis and/or CDR shuffling, as for example described in WO 00/43507.

In some embodiments, the sdAb is recombinant, CDR-grafted, humanized, camelized, de-immunized and/or in vitro generated (e.g., selected by phage display). In some embodiments, the amino acid sequence of the framework regions may be altered by "camelization" of specific amino acid residues in the framework regions. Camelization refers to the replacing or substitution of one or more amino acid residues in the amino acid sequence of a (naturally occurring) VH domain from a conventional 4-chain antibody by one or more of the amino acid residues that occur at the corresponding position(s) in a VHH domain of a heavy chain antibody. This can be performed in a manner known in the field, which will be clear to the skilled person. Such "camelizing" substitutions are preferably inserted at amino acid positions that form and/or are present at the VH-VL interface, and/or at the so-called Camelidae hallmark residues, as defined herein (see for example WO 94/04678, Davies and Riechmann FEBS Letters 339: 285-290 (1994); Davies and Riechmann, Protein Engineering 9 (6): 531-537 (1996); Riechmann, J. Mol. Biol. 259: 957-969 (1996); and Riechmann and Muyldermans, J. Immunol. Meth. 231: 25-38 (1999)).

In some embodiments, the sdAb is a human single domain antibody produced by transgenic mice or rats expressing human heavy chain segments. See, e.g., US20090307787, U.S. Pat. No. 8,754,287, US20150289489, US20100122358, and WO2004049794.

In some embodiments, the single domain antibodies are generated from conventional four-chain antibodies. See, for example, EP 0 368 684; Ward et al., Nature, 341 (6242): 544-6 (1989); Holt et al., Trends Biotechnol., 21(11):484-490 (2003); WO 06/030220; and WO 06/003388.

In some embodiments, the extracellular antigen binding domain comprises humanized antibodies or fragment thereof. A humanized antibody can comprise human framework region and human constant region sequences.

Humanized antibodies can be produced using a variety of techniques known in the art, including but not limited to, CDR-grafting (European Patent No. EP 239,400; International publication No. WO 91/09967; and U.S. Pat. Nos. 5,225,539, 5,530,101, and 5,585,089), veneering or resurfacing (European Patent Nos. EP 592,106 and EP 519,596; Padlan, 1991, Molecular Immunology 28(4/5):489-498; Studnicka et al., 1994, Protein Engineering 7(6):805-814; and Roguska et al., 1994, PNAS 91:969-973), chain shuffling (U.S. Pat. No. 5,565,332), and techniques disclosed in, e.g., U.S. Pat. Nos. 6,407,213, 5,766,886, WO 93/17105, Tan et al., J. Immunol. 169:1119 25 (2002), Caldas et al., Protein Eng. 13(5):353-60 (2000), Morea et al., Methods 20(3):267 79 (2000), Baca et al., J. Biol. Chem. 272(16): 10678-84 (1997), Roguska et al., Protein Eng. 9(10):895 904 (1996), Couto et al., Cancer Res. 55 (23 Supp):5973s-5977s (1995), Couto et al., Cancer Res. 55(8):1717-22 (1995), Sandhu J S, Gene 150(2):409-10 (1994), and Pedersen et al., J. Mol. Biol. 235(3):959-73 (1994). See also U.S. Patent Pub. No. US 2005/0042664 A1 (Feb. 24, 2005), each of which is incorporated by reference herein in its entirety.

Various methods for humanizing non-human antibodies are known in the art. For example, a humanized antibody can have one or more amino acid residues introduced into it from a source that is non-human. These non-human amino acid residues are often referred to as "import" residues, which are typically taken from an "import" variable domain. Humanization may be performed, for example, following the method of Jones et al., 1986, Nature 321:522-25; Riechmann et al., 1988, Nature 332:323-27; and Verhoeyen et al., 1988, Science 239:1534-36), by substituting hypervariable region sequences for the corresponding sequences of a human antibody.

In some cases, the humanized antibodies are constructed by CDR grafting, in which the amino acid sequences of the six CDRs of the parent non-human antibody (e.g., rodent) are grafted onto a human antibody framework. For example, Padlan et al. determined that only about one third of the residues in the CDRs actually contact the antigen, and termed these the "specificity determining residues," or SDRs (Padlan et al., 1995, FASEB J. 9:133-39). In the technique of SDR grafting, only the SDR residues are grafted onto the human antibody framework (see, e.g., Kashmiri et al., 2005, Methods 36:25-34).

The choice of human variable domains, both light and heavy, to be used in making the humanized antibodies can be important to reduce antigenicity. For example, according to the so-called "best-fit" method, the sequence of the variable domain of a non-human (e.g., rodent) antibody is screened against the entire library of known human variable-domain sequences. The human sequence that is closest to that of the rodent may be selected as the human framework for the humanized antibody (Sims et al., 1993, J. Immunol. 151:2296-308; and Chothia et al., 1987, J. Mol. Biol. 196:901-17). Another method uses a particular framework derived from the consensus sequence of all human antibodies of a particular subgroup of light or heavy chains. The same framework may be used for several different humanized antibodies (Carter et al., 1992, Proc. Natl. Acad. Sci. USA 89:4285-89; and Presta et al., 1993, J. Immunol. 151:2623-32). In some cases, the framework is derived from the consensus sequences of the most abundant human subclasses, VL6 subgroup I (VL6I) and VH subgroup III (VHIII). In another method, human germline genes are used as the source of the framework regions.

In an alternative paradigm based on comparison of CDRs, called superhumanization, FR homology is irrelevant. The method consists of comparison of the non-human sequence with the functional human germline gene repertoire. Those genes encoding the same or closely related canonical structures to the murine sequences are then selected. Next, within the genes sharing the canonical structures with the non-human antibody, those with highest homology within the CDRs are chosen as FR donors. Finally, the non-human CDRs are grafted onto these FRs (see, e.g., Tan et al., 2002, J. Immunol. 169:1119-25).

It is further generally desirable that antibodies be humanized with retention of their affinity for the antigen and other favorable biological properties. To achieve this goal, according to one method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. These include, for example, WAM (Whitelegg and Rees, 2000, Protein Eng. 13:819-24), Modeller (Sali and Blundell, 1993, J. Mol. Biol. 234:779-815), and Swiss PDB Viewer (Guex and Peitsch, 1997, Electrophoresis 18:2714-23). Inspection of these displays permits analysis of the likely role of the residues in the functioning of the candidate immunoglobulin sequence, e.g., the analysis of residues that influence the ability of the candidate immunoglobulin to bind its antigen. In this way, FR residues can be selected and combined from the recipient and import sequences so that the desired antibody characteristic, such as increased affinity for the target antigen(s), is achieved. In general, the hypervariable region residues are directly and most substantially involved in influencing antigen binding.

Another method for antibody humanization is based on a metric of antibody humanness termed Human String Content (HSC). This method compares the mouse sequence with the repertoire of human germline genes, and the differences are scored as HSC. The target sequence is then humanized by maximizing its HSC rather than using a global identity measure to generate multiple diverse humanized variants (Lazar et al., 2007, Mol. Immunol. 44:1986-98).

In addition to the methods described above, empirical methods may be used to generate and select humanized antibodies. These methods include those that are based upon the generation of large libraries of humanized variants and selection of the best clones using enrichment technologies or high throughput screening techniques. Antibody variants may be isolated from phage, ribosome, and yeast display libraries as well as by bacterial colony screening (see, e.g., Hoogenboom, 2005, Nat. Biotechnol. 23:1105-16; Dufner et al., 2006, Trends Biotechnol. 24:523-29; Feldhaus et al., 2003, Nat. Biotechnol. 21:163-70; and Schlapschy et al., 2004, Protein Eng. Des. Sel. 17:847-60).

In the FR library approach, a collection of residue variants are introduced at specific positions in the FR followed by screening of the library to select the FR that best supports the grafted CDR. The residues to be substituted may include some or all of the "Vernier" residues identified as potentially contributing to CDR structure (see, e.g., Foote and Winter, 1992, J. Mol. Biol. 224:487-99), or from the more limited set of target residues identified by Baca et al. (1997, J. Biol. Chem. 272:10678-84).

In FR shuffling, whole FRs are combined with the non-human CDRs instead of creating combinatorial libraries of selected residue variants (see, e.g., Dall'Acqua et al., 2005, Methods 36:43-60). The libraries may be screened for binding in a two-step process, first humanizing VL, followed by VH. Alternatively, a one-step FR shuffling process may be used. Such a process has been shown to be more efficient than the two-step screening, as the resulting antibodies exhibited improved biochemical and physicochemical properties including enhanced expression, increased affinity, and thermal stability (see, e.g., Damschroder et al., 2007, Mol. Immunol. 44:3049-60).

The "humaneering" method is based on experimental identification of essential minimum specificity determinants (MSDs) and is based on sequential replacement of non-human fragments into libraries of human FRs and assessment of binding. It begins with regions of the CDR3 of non-human VH and VL chains and progressively replaces other regions of the non-human antibody into the human FRs, including the CDR1 and CDR2 of both VH and VL. This methodology typically results in epitope retention and identification of antibodies from multiple subclasses with distinct human V-segment CDRs. Humaneering allows for isolation of antibodies that are 91-96% homologous to human germline gene antibodies (see, e.g., Alfenito, Cambridge Healthtech Institute's Third Annual PEGS, The Protein Engineering Summit, 2007).

The "human engineering" method involves altering a non-human antibody or antibody fragment, such as a mouse or chimeric antibody or antibody fragment, by making specific changes to the amino acid sequence of the antibody so as to produce a modified antibody with reduced immunogenicity in a human that nonetheless retains the desirable binding properties of the original non-human antibodies. Generally, the technique involves classifying amino acid residues of a non-human (e.g., mouse) antibody as "low risk," "moderate risk," or "high risk" residues. The classification is performed using a global risk/reward calculation that evaluates the predicted benefits of making particular substitution (e.g., for immunogenicity in humans) against the risk that the substitution will affect the resulting antibody's folding. The particular human amino acid residue to be substituted at a given position (e.g., low or moderate risk) of a non-human (e.g., mouse) antibody sequence can be selected by aligning an amino acid sequence from the non-human antibody's variable regions with the corresponding region of a specific or consensus human antibody sequence. The amino acid residues at low or moderate risk positions in the non-human sequence can be substituted for the corresponding residues in the human antibody sequence according to the alignment. Techniques for making human engineered proteins are described in greater detail in Studnicka et al., 1994, Protein Engineering 7:805-14; U.S. Pat. Nos. 5,766,886; 5,770,196; 5,821,123; and 5,869,619; and PCT Publication WO 93/11794.

A composite human antibody can be generated using, for example, Composite Human Antibody™ technology (Antitope Ltd., Cambridge, United Kingdom). To generate composite human antibodies, variable region sequences are designed from fragments of multiple human antibody variable region sequences in a manner that avoids T cell epitopes, thereby minimizing the immunogenicity of the resulting antibody. Such antibodies can comprise human constant region sequences, e.g., human light chain and/or heavy chain constant regions.

A deimmunized antibody is an antibody in which T-cell epitopes have been removed. Methods for making deimmunized antibodies have been described. See, e.g., Jones et al., Methods Mol Biol. 2009; 525:405-23, xiv, and De Groot et al., Cell. Immunol. 244:148-153(2006)). Deimmunized antibodies comprise T-cell epitope-depleted variable regions and human constant regions. Briefly, VH and VL of an antibody are cloned and T-cell epitopes are subsequently identified by testing overlapping peptides derived from the VH and VL of the antibody in a T cell proliferation assay. T cell epitopes are identified via in silico methods to identify peptide binding to human MHC class II. Mutations are introduced in the VH and VL to abrogate binding to human MHC class II. Mutated VH and VL are then utilized to generate the deimmunized antibody.

In certain embodiments, the extracellular antigen binding domain comprises multiple binding domains. In some embodiments, the extracellular antigen binding domain comprises multispecific antibodies or fragments thereof. In other embodiments, the extracellular antigen binding domain comprises multivalent antibodies or fragments thereof. The term "specificity" refers to selective recognition of an antigen binding protein for a particular epitope of an antigen. The term "multispecific" as used herein denotes that an antigen binding protein has two or more antigen-binding sites of which at least two bind different antigens. The term "valent" as used herein denotes the presence of a specified number of binding sites in an antigen binding protein. A full length antibody has two binding sites and is bivalent. As such, the terms "trivalent", "tetravalent", "pentavalent" and "hexavalent" denote the presence of two binding site, three binding sites, four binding sites, five binding sites, and six binding sites, respectively, in an antigen binding protein.

Multispecific antibodies such as bispecific antibodies are antibodies that have binding specificities for at least two different antigens. Methods for making multispecific antibodies are known in the art, such as, by co-expression of two immunoglobulin heavy chain-light chain pairs, where the two heavy chains have different specificities (see, e.g., Milstein and Cuello, 1983, Nature 305:537-40). For further details of generating multispecific antibodies (e.g., bispecific antibodies), see, for example, Bispecific Antibodies (Kontermann ed., 2011).

The antibodies of the present disclosure can be multivalent antibodies with two or more antigen binding sites (e.g., tetravalent antibodies), which can be readily produced by recombinant expression of nucleic acid encoding the polypeptide chains of the antibody. In certain embodiments, a multivalent antibody comprises (or consists of) three to about eight antigen binding sites. In one such embodiment, a multivalent antibody comprises (or consists of) four antigen binding sites. The multivalent antibody comprises at least one polypeptide chain (e.g., two polypeptide chains), wherein the polypeptide chain(s) comprise two or more variable domains. For instance, the polypeptide chain(s) may comprise VD1-(X1)n-VD2-(X2)n-Fc, wherein VD1 is a first variable domain, VD2 is a second variable domain, Fc is one polypeptide chain of an Fc region, X1 and X2 represent an amino acid or polypeptide, and n is 0 or 1. For instance, the polypeptide chain(s) may comprise: VH-CH1-flexible linker-VH-CH1-Fc region chain; or VH-CH1-VH-CH1-Fc region chain. The multivalent antibody herein may further comprise at least two (e.g., four) light chain variable domain polypeptides. The multivalent antibody herein may, for instance, comprise from about two to about eight light chain variable domain polypeptides. The light chain variable domain polypeptides contemplated here comprise a light chain variable domain and, optionally, further comprise a CL domain.

In case there are multiple binding domains in the extracellular antigen binding domain of the present CARs. The various domains may be fused to each other via peptide linkers. In some embodiments, the domains are directly fused to each other without any peptide linkers. The peptide linkers may be the same or different. Each peptide linker may have the same or different length and/or sequence depending on the structural and/or functional features of the various domains. Each peptide linker may be selected and optimized independently. The length, the degree of flexibility and/or other properties of the peptide linker(s) used in the CARs may have some influence on properties, including but not limited to the affinity, specificity or avidity for one or more particular antigens or epitopes. In some embodiment, a peptide linker comprises flexible residues (such as glycine and serine) so that the adjacent domains are free to move relative to each other. For example, a glycine-serine doublet can be a suitable peptide linker.

The peptide linker may have a naturally occurring sequence, or a non-naturally occurring sequence. For example, a sequence derived from the hinge region of heavy chain only antibodies may be used as the linker. See, for example, WO1996/34103. In some embodiments, the peptide linker is a flexible linker. Exemplary flexible linkers include but not limited to glycine polymers $(G)_n$, glycine-serine polymers (including, for example, $(GS)_n$, $(GSGGS)_n$, $(GGGS)_n$, and $(GGGGS)_n$, where n is an integer of at least one), glycine-alanine polymers, alanine-serine polymers, and other flexible linkers known in the art. Other linkers known in the art, for example, as described in WO2016014789, WO2015158671, WO2016102965, US20150299317, WO2018067992, U.S. Pat. No. 7,741,465, Colcher et al., *J. Nat. Cancer Inst.* 82:1191-1197 (1990), and Bird et al., *Science* 242:423-426 (1988) may also be included in the CARs provided herein, the disclosure of each of which is incorporated herein by reference.

In some embodiments, the extracellular antigen binding domain provided in the present CARs recognizes an antigen that acts as a cell surface marker on target cells associated with a special disease state. In some embodiments, the antigen is a tumor antigen. Tumors express a number of proteins that can serve as a target antigen for an immune response, particularly T cell mediated immune responses. The antigens targeted by the CAR may be antigens on a single diseased cell or antigens that are expressed on different cells that each contribute to the disease. The antigens targeted by the CAR may be directly or indirectly involved in the diseases.

Tumor antigens are proteins that are produced by tumor cells that can elicit an immune response, particularly T-cell mediated immune responses. Exemplary tumor antigens include, but not limited to, a glioma-associated antigen, carcinoembryonic antigen (CEA), β-human chorionic gonadotropin, alphafetoprotein (AFP), lectin-reactive AFP, thyroglobulin, RAGE-1, MN-CAIX, human telomerase reverse transcriptase, RU1, RU2 (AS), intestinal carboxyl esterase, mut hsp70-2, M-CSF, prostase, prostate-specific antigen (PSA), PAP, NY-ESO-1, LAGE-1a, p53, prostein, PSMA, HER2/neu, survivin and telomerase, prostate-carcinoma tumor antigen-1 (PCTA-1), MAGE, ELF2M, neutrophil elastase, ephrinB2, insulin growth factor (IGF)-I, IGF-II, IGF-I receptor, and mesothelin.

In some embodiments, the tumor antigen comprises one or more antigenic cancer epitopes associated with a malignant tumor. Malignant tumors express a number of proteins that can serve as target antigens for an immune attack. These molecules include, but are not limited to, tissue-specific antigens such as MART-1, tyrosinase and gp100 in melanoma and prostatic acid phosphatase (PAP) and prostate-specific antigen (PSA) in prostate cancer. Other target molecules belong to the group of transformation-related molecules such as the oncogene HER2/Neu/ErbB-2. Yet another group of target antigens are onco-fetal antigens such as carcinoembryonic antigen (CEA).

In some embodiments, the tumor antigen is a tumor-specific antigen (TSA) or a tumor-associated antigen (TAA). A TSA is unique to tumor cells and does not occur on other cells in the body. A TAA associated antigen is not unique to a tumor cell, and instead is also expressed on a normal cell under conditions that fail to induce a state of immunologic tolerance to the antigen. The expression of the antigen on the tumor may occur under conditions that enable the immune system to respond to the antigen. TAAs may be antigens that are expressed on normal cells during fetal development, when the immune system is immature, and unable to respond or they may be antigens that are normally present at extremely low levels on normal cells, but which are expressed at much higher levels on tumor cells.

Non-limiting examples of TSA or TAA antigens include: differentiation antigens such as MART-1/MelanA (MART-I), gp 100 (Pmel 17), tyrosinase, TRP-1, TRP-2 and tumor-specific multilineage antigens such as MAGE-1, MAGE-3, BAGE, GAGE-1, GAGE-2, p15; overexpressed embryonic antigens such as CEA; overexpressed oncogenes and mutated tumor-suppressor genes such as p53, Ras, HER2/neu; unique tumor antigens resulting from chromosomal translocations; such as BCR-ABL, E2A-PRL, H4-RET, IGH-IGK, MYL-RAR; and viral antigens, such as the Epstein Barr virus antigens EBVA and the human papillomavirus (HPV) antigens E6 and E7.

Other large, protein-based antigens include TSP-180, MAGE-4, MAGE-5, MAGE-6, RAGE, NY-ESO, p185erbB2, p180erbB-3, c-met, nm-23HI, PSA, TAG-72, CA 19-9, CA 72-4, CAM 17.1, NuMa, K-ras, beta-Catenin, CDK4, Mum-1, p 15, p 16, 43-9F, 5T4, 791Tgp72, alpha-fetoprotein, beta-HCG, BCA225, BTAA, CA 125, CA 15-3\CA 27.29\BCAA, CA 195, CA 242, CA-50, CAM43, CD68\P1, CO-029, FGF-5, G250, Ga733\EpCAM, HTgp-175, M344, MA-50, MG7-Ag, MOV18, NB/70K, NY-CO-1, RCAS 1, SDCCAG16, TA-90\Mac-2 binding protein\cyclophilin C-associated protein, TAAL6, TAG72, TLP, and TPS.

In some more specific embodiments, the antigen is CD123. In a specific embodiment, the CARs provided herein comprise an extracellular antigen binding domain that comprises scFv capable of binding CD123 and comprising an amino acid sequence of SEQ ID NO:3.

In other more specific embodiments, the antigen is PSMA. In a specific embodiment, the CARs provided herein comprise an extracellular antigen binding domain that comprises scFv capable of binding PSMA and comprising an amino acid sequence of SEQ ID NO:4.

Hinge Region

In some embodiments, the CARs provided herein comprise a hinge domain that is located between the extracellular antigen binding domain and the transmembrane domain. A hinge domain is an amino acid segment that is generally found between two domains of a protein and may allow for flexibility of the protein and movement of one or both of the domains relative to one another. Any amino acid sequence that provides such flexibility and movement of the extracellular antigen binding domain relative to the transmembrane domain of the effector molecule can be used.

Hinge domains of antibodies, such as an IgG, IgA, IgM, IgE, or IgD antibodies, are also compatible for use in the pH-dependent chimeric receptor systems described herein. In some embodiments, the hinge domain is the hinge domain that joins the constant domains CH1 and CH2 of an antibody. In some embodiments, the hinge domain is of an antibody and comprises the hinge domain of the antibody and one or more constant regions of the antibody. In some embodiments, the hinge domain comprises the hinge domain of an antibody and the CH3 constant region of the antibody. In some embodiments, the hinge domain comprises the hinge domain of an antibody and the CH2 and CH3 constant regions of the antibody. In some embodiments, the antibody is an IgG, IgA, IgM, IgE, or IgD antibody. In some embodiments, the antibody is an IgG antibody. In some embodiments, the antibody is an IgG1, IgG2, IgG3, or IgG4 antibody. In some embodiments, the hinge region comprises the hinge region and the CH2 and CH3 constant regions of an IgG1 antibody. In some embodiments, the hinge region comprises the hinge region and the CH3 constant region of an IgG1 antibody.

Non-naturally occurring peptides may also be used as hinge domains for the chimeric receptors described herein. In some embodiments, the hinge domain between the C-terminus of the extracellular ligand-binding domain of an Fc receptor and the N-terminus of the transmembrane domain is a peptide linker, such as a (GxS)n linker, wherein x and n, independently can be an integer between 3 and 12, including 3, 4, 5, 6, 7, 8, 9, 10, 11, 12, or more.

The hinge domain may contain about 10-100 amino acids, e.g., about any one of 15-75 amino acids, 20-50 amino acids, or 30-60 amino acids. In some embodiments, the hinge domain may be at least about any one of 10, 11, 12, 13, 14, 15, 16, 17, 18, 19, 20, 21, 22, 23, 24, 25, 26, 27, 28, 29, 30, 35, 40, 45, 50, 55, 60, 65, 70, or 75 amino acids in length.

In some embodiments, the hinge domain is a hinge domain of a naturally occurring protein. Hinge domains of any protein known in the art to comprise a hinge domain are compatible for use in the chimeric receptors described herein. In some embodiments, the hinge domain is at least a portion of a hinge domain of a naturally occurring protein and confers flexibility to the chimeric receptor. In some embodiments, the hinge domain is derived from CD8α. In some embodiments, the hinge domain is a portion of the hinge domain of CD8α, e.g., a fragment containing about 15-100 (e.g., 20, 25, 30, 35, or 40) consecutive amino acids of the hinge domain of CD8α. In some embodiments, the hinge domain of CD8α comprises the amino acid sequence of SEQ ID NO:5.

Transmembrane Domain

The CARs of the present disclosure comprise a transmembrane domain that can be directly or indirectly fused to the extracellular antigen binding domain. The transmembrane domain may be derived either from a natural or from a synthetic source. As used herein, a "transmembrane domain" refers to any protein structure that is thermodynamically stable in a cell membrane, preferably an eukaryotic cell membrane. Transmembrane domains compatible for use in the CARs described herein may be obtained from a naturally occurring protein. Alternatively, it can be a synthetic, non-naturally occurring protein segment, e.g., a hydrophobic protein segment that is thermodynamically stable in a cell membrane.

Transmembrane domains are classified based on the three dimensional structure of the transmembrane domain. For example, transmembrane domains may form an alpha helix, a complex of more than one alpha helix, a beta-barrel, or any other stable structure capable of spanning the phospholipid bilayer of a cell. Furthermore, transmembrane domains may also or alternatively be classified based on the transmembrane domain topology, including the number of passes that the transmembrane domain makes across the membrane and the orientation of the protein. For example, single-pass membrane proteins cross the cell membrane once, and multi-pass membrane proteins cross the cell membrane at least twice (e.g., 2, 3, 4, 5, 6, 7 or more times). Membrane proteins may be defined as Type I, Type II or Type III depending upon the topology of their termini and membrane-passing segment(s) relative to the inside and outside of the cell. Type I membrane proteins have a single membrane-spanning region and are oriented such that the N-terminus of the protein is present on the extracellular side of the lipid bilayer of the cell and the C-terminus of the protein is present on the cytoplasmic side. Type II membrane proteins also have a single membrane-spanning region but are oriented such that the C-terminus of the protein is present on the extracellular side of the lipid bilayer of the cell and the N-terminus of the protein is present on the cytoplasmic side. Type III membrane proteins have multiple membrane-spanning segments and may be further sub-classified based on the number of transmembrane segments and the location of N- and C-termini.

In some embodiments, the transmembrane domain of the CAR described herein is derived from a Type I single-pass membrane protein. In some embodiments, transmembrane domains from multi-pass membrane proteins may also be compatible for use in the CARs described herein. Multi-pass membrane proteins may comprise a complex (at least 2, 3, 4, 5, 6, 7 or more) alpha helices or a beta sheet structure. In some embodiments, the N-terminus and the C-terminus of a multi-pass membrane protein are present on opposing sides of the lipid bilayer, e.g., the N-terminus of the protein is present on the cytoplasmic side of the lipid bilayer and the C-terminus of the protein is present on the extracellular side.

Transmembrane domains for use in the CARs described herein can also comprise at least a portion of a synthetic, non-naturally occurring protein segment. In some embodiments, the transmembrane domain is a synthetic, non-naturally occurring alpha helix or beta sheet. In some embodiments, the protein segment is about 15-100 amino acids. In some embodiments, the protein segment is at least approximately 20 amino acids, e.g., at least 18, 19, 20, 21, 22, 23, 24, 25, 26, 27, 28, 29, 30, or more amino acids. Examples of synthetic transmembrane domains are known in the art, for example in U.S. Pat. No. 7,052,906 and PCT Publication No. WO 2000/032776, the relevant disclosures of which are incorporated by reference herein.

The transmembrane domain provided herein may comprise a transmembrane region and a cytoplasmic region located at the C-terminal side of the transmembrane domain. The cytoplasmic region of the transmembrane domain may comprise three or more amino acids and, in some embodiments, helps to orient the transmembrane domain in the lipid bilayer. In some embodiments, one or more cysteine residues are present in the transmembrane region of the transmembrane domain. In some embodiments, one or more cysteine residues are present in the cytoplasmic region of the transmembrane domain. In some embodiments, the cytoplasmic region of the transmembrane domain comprises positively charged amino acids. In some embodiments, the cytoplasmic region of the transmembrane domain comprises the amino acids arginine, serine, and lysine.

In some embodiments, the transmembrane region of the transmembrane domain comprises hydrophobic amino acid residues. In some embodiments, the transmembrane domain of the CAR provided herein comprises an artificial hydrophobic sequence. For example, a triplet of phenylalanine, tryptophan and valine may be present at the C terminus of the transmembrane domain. In some embodiments, the transmembrane region comprises mostly hydrophobic amino acid residues, such as alanine, leucine, isoleucine, methionine, phenylalanine, tryptophan, or valine. In some embodiments, the transmembrane region is hydrophobic. In some embodiments, the transmembrane region comprises a poly-leucine-alanine sequence. The hydropathy, or hydrophobic or hydrophilic characteristics of a protein or protein segment, can be assessed by any method known in the art, for example the Kyte and Doolittle hydropathy analysis.

In some embodiments, the transmembrane domain of the CAR comprises a transmembrane domain chosen from the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), CD160, CD19, IL-2R beta, IL-2R gamma, IL-7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CDIOO (SEMA4D), SLAMF6 (NTB-A, Ly108), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

In some specific embodiments, the transmembrane domain is derived from CD8α. In some embodiments, the transmembrane domain is a transmembrane domain of CD8α comprising the amino acid sequence of SEQ ID NO:6.

Intracellular Signaling Domain

The intracellular signaling domain in the CARs provided herein is responsible for activation of at least one of the normal effector functions of the immune effector cell expressing the CARs. The term "effector function" refers to a specialized function of a cell. Effector function of a T cell, for example, may be cytolytic activity or helper activity including the secretion of cytokines. Thus the term "cytoplasmic signaling domain" refers to the portion of a protein which transduces the effector function signal and directs the cell to perform a specialized function. While usually the entire cytoplasmic signaling domain can be employed, in many cases it is not necessary to use the entire chain. To the extent that a truncated portion of the cytoplasmic signaling domain is used, such truncated portion may be used in place of the intact chain as long as it transduces the effector function signal. The term cytoplasmic signaling domain is thus meant to include any truncated portion of the cytoplasmic signaling domain sufficient to transduce the effector function signal.

In some embodiments, the intracellular signaling domain comprises a primary intracellular signaling domain of an immune effector cell. In some embodiments, the CAR comprises an intracellular signaling domain consisting essentially of a primary intracellular signaling domain of an immune effector cell. "Primary intracellular signaling domain" refers to cytoplasmic signaling sequence that acts in a stimulatory manner to induce immune effector functions. In some embodiments, the primary intracellular signaling domain contains a signaling motif known as immunoreceptor tyrosine-based activation motif, or ITAM. An "ITAM," as used herein, is a conserved protein motif that is generally present in the tail portion of signaling molecules expressed in many immune cells. The motif may comprises two repeats of the amino acid sequence YxxL/I separated by 6-8 amino acids, wherein each x is independently any amino acid, producing the conserved motif YxxL/Ix(6-8)YxxL/I. ITAMs within signaling molecules are important for signal transduction within the cell, which is mediated at least in part by phosphorylation of tyrosine residues in the ITAM following activation of the signaling molecule. ITAMs may also function as docking sites for other proteins involved in signaling pathways. Exemplary ITAM-containing primary cytoplasmic signaling sequences include those derived from CD3z, FcR gamma (FCER1G), FcR beta (Fc Epsilon R1b), CD3 gamma, CD3 delta, CD3 epsilon, CD5, CD22, CD79a, CD79b, and CD66d.

In some embodiments, the primary intracellular signaling domain is derived from CD3z. In some embodiments, the intracellular signaling domain consists of the cytoplasmic signaling domain of CD3z. In some embodiments, the primary intracellular signaling domain is a cytoplasmic signaling domain of wild-type CD3z. In some embodiments, the primary intracellular signaling domain of CD3z comprises the amino acid sequence of SEQ ID NO:8.

Co-Stimulatory Signaling Domain

In some embodiments, the CAR comprises at least one co-stimulatory signaling domain. The term "co-stimulatory signaling domain," as used herein, refers to at least a portion of a protein that mediates signal transduction within a cell to induce an immune response such as an effector function. Many immune effector cells require co-stimulation, in addition to stimulation of an antigen-specific signal, to promote cell proliferation, differentiation and survival, as well as to activate effector functions of the cell.

The co-stimulatory signaling domain of the chimeric receptor described herein can be a cytoplasmic signaling domain from a co-stimulatory protein, which transduces a signal and modulates responses mediated by immune cells, such as T cells, NK cells, macrophages, neutrophils, or eosinophils. "Co-stimulatory signaling domain" can be the cytoplasmic portion of a co-stimulatory molecule. The term "co-stimulatory molecule" refers to a cognate binding partner on an immune cell (such as T cell) that specifically binds with a co-stimulatory ligand, thereby mediating a co-stimulatory response by the immune cell, such as, but not limited to, proliferation and survival.

In some embodiments, the intracellular signaling domain comprises a single co-stimulatory signaling domain. In some embodiments, the intracellular signaling domain comprises two or more (such as about any of 2, 3, 4, or more) co-stimulatory signaling domains. In some embodiments, the intracellular signaling domain comprises two or more of the same co-stimulatory signaling domains. In some embodiments, the intracellular signaling domain comprises two or more co-stimulatory signaling domains from different co-stimulatory proteins, such as any two or more co-stimulatory proteins described herein. In some embodiments, the intracellular signaling domain comprises a primary intracellular signaling domain (such as cytoplasmic signaling domain of CD3z) and one or more co-stimulatory signaling domains. In some embodiments, the one or more co-stimulatory signaling domains and the primary intracellular signaling domain (such as cytoplasmic signaling domain of CD3z) are fused to each other via optional peptide linkers. The primary intracellular signaling domain, and the one or more co-stimulatory signaling domains may be arranged in any suitable order. In some embodiments, the one or more co-stimulatory signaling domains are located between the transmembrane domain and the primary intracellular signaling domain (such as cytoplasmic signaling domain of CD3z). Multiple co-stimulatory signaling domains may provide additive or synergistic stimulatory effects.

Activation of a co-stimulatory signaling domain in a host cell (e.g., an immune cell) may induce the cell to increase or decrease the production and secretion of cytokines, phagocytic properties, proliferation, differentiation, survival, and/or cytotoxicity. The co-stimulatory signaling domain of any co-stimulatory molecule may be compatible for use in the CARs described herein. The type(s) of co-stimulatory signaling domain is selected based on factors such as the type of the immune effector cells in which the effector molecules would be expressed (e.g., T cells, NK cells, macrophages, neutrophils, or eosinophils) and the desired immune effector function (e.g., ADCC effect). Examples of co-stimulatory signaling domains for use in the CARs can be the cytoplasmic signaling domain of co-stimulatory proteins, including, without limitation, members of the B7/CD28 family (e.g., B7-1/CD80, B7-2/CD86, B7-H1/PD-L1, B7-H2, B7-H3, B7-H4, B7-H6, B7-H7, BTLA/CD272, CD28, CTLA-4, Gi24/VISTA/B7-H5, ICOS/CD278, PD-1, PD-L2/B7-DC, and PDCD6); members of the TNF superfamily (e.g., 4-1BB/TNF SF9/CD137, 4-1BB Ligand/TNFSF9, BAFF/BLyS/TNFSF13B, BAFF R/TNFRSF13C, CD27/TNFRSF7, CD27 Ligand/TNFSF7, CD30/TNFRSF8, CD30 Ligand/TNFSF8, CD40/TNFRSF5, CD40/TNFSF5, CD40

Ligand/TNFSF5, DR3/TNFRSF25, GITR/TNFRSF18, GITR Ligand/TNFSF18, HVEM/TNFRSF14, LIGHT/TNFSF14, Lymphotoxin-alpha/TNF-beta, OX40/TNFRSF4, OX40 Ligand/TNFSF4, RELT/TNFRSF19L, TACI/TNFRSF13B, TL1A/TNFSF15, TNF-alpha, and TNF RII/TNFRSF1B); members of the SLAM family (e.g., 2B4/CD244/SLAMF4, BLAME/SLAMF8, CD2, CD2F-10/SLAMF9, CD48/SLAMF2, CD58/LFA-3, CD84/SLAMF5, CD229/SLAMF3, CRACC/SLAMF7, NTB-A/SLAMF6, and SLAM/CD150); and any other co-stimulatory molecules, such as CD2, CD7, CD53, CD82/Kai-1, CD90/Thy1, CD96, CD160, CD200, CD300a/LMIR1, HLA Class I, HLA-DR, Ikaros, Integrin alpha 4/CD49d, Integrin alpha 4 beta 1, Integrin alpha 4 beta 7/LPAM-1, LAG-3, TCL1A, TCL1B, CRTAM, DAP12, Dectin-1/CLEC7A, DPPIV/CD26, EphB6, TIM-1/KIM-1/HAVCR, TIM-4, TSLP, TSLP R, lymphocyte function associated antigen-1 (LFA-1), and NKG2C. In some embodiments, the one or more co-stimulatory signaling domains are selected from the group consisting of CD27, CD28, CD137, OX40, CD30, CD40, CD3, lymphocyte function-associated antigen-1 (LFA-1), CD2, CD7, LIGHT, NKG2C, B7-H3 and ligands that specially bind to CD83.

In some embodiments, the intracellular signaling domain in the CAR of the present disclosure comprises a co-stimulatory signaling domain derived from CD137 (i.e., 4-1BB). In some embodiments, the intracellular signaling domain comprises a cytoplasmic signaling domain of CDz and a co-stimulatory signaling domain of CD137. In some embodiments, the intracellular signaling domain comprises a co-stimulatory signaling domain of CD137 comprising the amino acid sequence of SEQ ID NO:7.

In some embodiments, the co-stimulatory signaling domains are variants of any of the co-stimulatory signaling domains described herein, such that the co-stimulatory signaling domain is capable of modulating the immune response of the immune cell. In some embodiments, the co-stimulatory signaling domains comprises up to 10 amino acid residue variations (e.g., 1, 2, 3, 4, 5, or 8) as compared to a wild-type counterpart. Such co-stimulatory signaling domains comprising one or more amino acid variations may be referred to as variants. Mutation of amino acid residues of the co-stimulatory signaling domain may result in an increase in signaling transduction and enhanced stimulation of immune responses relative to co-stimulatory signaling domains that do not comprise the mutation. Mutation of amino acid residues of the co-stimulatory signaling domain may result in a decrease in signaling transduction and reduced stimulation of immune responses relative to co-stimulatory signaling domains that do not comprise the mutation.

Exemplary CARs

Exemplary multispecific CARs are generated as shown in Section 7 below.

In a specific embodiment, the CAR provided herein comprises from the N-terminus to the C-terminus: a signal peptide comprising an amino acid sequence of SEQ ID NO:2, the extracellular antigen binding domain comprising a scFv that binds CD123 and comprises an amino acid sequence of SEQ ID NO:3, a CD8α hinge domain comprising an amino acid sequence of SEQ ID NO:5, a CD8α transmembrane domain comprising an amino acid sequence of SEQ ID NO:6, a co-stimulatory signaling domain derived from CD137 comprising an amino acid sequence of SEQ ID NO:7, and a primary intracellular signaling domain derived from CD3z comprising an amino acid sequence of SEQ ID NO:8.

In a specific embodiment, the CAR provided herein comprises from the N-terminus to the C-terminus: a signal peptide comprising an amino acid sequence of SEQ ID NO:2, the extracellular antigen binding domain comprising a scFv that binds PSMA and comprises an amino acid sequence of SEQ ID NO:4, a CD8α hinge domain comprising an amino acid sequence of SEQ ID NO:5, a CD8α transmembrane domain comprising an amino acid sequence of SEQ ID NO:6, a co-stimulatory signaling domain derived from CD137 comprising an amino acid sequence of SEQ ID NO:7, and a primary intracellular signaling domain derived from CD3z comprising an amino acid sequence of SEQ ID NO:8.

In certain embodiments, the CAR provided herein comprises amino acid sequences with certain percent identity relative to any one of the CARs exemplified in the Section 7 below. In some embodiments, provided herein is a CAR comprising or consisting of an extracellular domain having at least 75%, 80%, 85%, 86%, 87%, 88%, 89%, 90%, 91%, 92%, 93%, 94%, 95%, 96%, 97%, 98%, 99%, or 100% sequence identity to the amino acid sequence of SEQ ID NO:3. In some embodiments, provided herein is a CAR comprising or consisting of an extracellular domain having at least 75%, 80%, 85%, 86%, 87%, 88%, 89%, 90%, 91%, 92%, 93%, 94%, 95%, 96%, 97%, 98%, 99%, or 100% sequence identity to the amino acid sequence of SEQ ID NO:4.

The determination of percent identity between two sequences (e.g., amino acid sequences or nucleic acid sequences) can be accomplished using a mathematical algorithm. A preferred, non-limiting example of a mathematical algorithm utilized for the comparison of two sequences is the algorithm of Karlin and Altschul, Proc. Natl. Acad. Sci. U.S.A. 87:2264 2268 (1990), modified as in Karlin and Altschul, Proc. Natl. Acad. Sci. U.S.A. 90:5873 5877 (1993). Such an algorithm is incorporated into the NBLAST and)(BLAST programs of Altschul et al., J. Mol. Biol. 215:403 (1990). BLAST nucleotide searches can be performed with the NBLAST nucleotide program parameters set, e.g., for score=100, word length=12 to obtain nucleotide sequences homologous to a nucleic acid molecules described herein. BLAST protein searches can be performed with the)(BLAST program parameters set, e.g., to score 50, word length=3 to obtain amino acid sequences homologous to a protein molecule described herein. To obtain gapped alignments for comparison purposes, Gapped BLAST can be utilized as described in Altschul et al., Nucleic Acids Res. 25:3389 3402 (1997). Alternatively, PSI BLAST can be used to perform an iterated search which detects distant relationships between molecules (Id.). When utilizing BLAST, Gapped BLAST, and PSI Blast programs, the default parameters of the respective programs (e.g., of)(BLAST and NBLAST) can be used (see, e.g., National Center for Biotechnology Information (NCBI) on the worldwide web, ncbi.nlm.nih.gov). Another non-limiting example of a mathematical algorithm utilized for the comparison of sequences is the algorithm of Myers and Miller, CABIOS 4:11-17 (1998). Such an algorithm is incorporated in the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used.

In some embodiments, amino acid sequence modification(s) of the CARs described herein are contemplated. For example, it may be desirable to optimize the binding affinity and/or other biological properties of the extracellular domain, including but not limited to specificity, thermostability, expression level, effector functions, glycosylation, reduced immunogenicity, or solubility. Thus, in addition to the extracellular domain described herein, it is contemplated that variants of the domains described herein can be prepared. For example, scFv variants can be prepared by introducing appropriate nucleotide changes into the encoding DNA, and/or by synthesis of the desired antibody or polypeptide. Those skilled in the art who appreciate that amino acid changes may alter post-translational processes of the antibody.

Variations may be a substitution, deletion, or insertion of one or more codons encoding the polypeptide that results in a change in the amino acid sequence as compared with the original antibody or polypeptide. Sites of interest for substitutional mutagenesis include the CDRs and FRs.

Amino acid substitutions can be the result of replacing one amino acid with another amino acid having similar structural and/or chemical properties, such as the replacement of a leucine with a serine, e.g., conservative amino acid replacements. Standard techniques known to those of skill in the art can be used to introduce mutations in the nucleotide sequence encoding a molecule provided herein, including, for example, site-directed mutagenesis and PCR-mediated mutagenesis which results in amino acid substitutions. Insertions or deletions may optionally be in the range of about 1 to 5 amino acids. In certain embodiments, the substitution, deletion, or insertion includes fewer than 25 amino acid substitutions, fewer than 20 amino acid substitutions, fewer than 15 amino acid substitutions, fewer than 10 amino acid substitutions, fewer than 5 amino acid substitutions, fewer than 4 amino acid substitutions, fewer than 3 amino acid substitutions, or fewer than 2 amino acid substitutions relative to the original molecule. In a specific embodiment, the substitution is a conservative amino acid substitution made at one or more predicted non-essential amino acid residues. The variation allowed may be determined by systematically making insertions, deletions, or substitutions of amino acids in the sequence and testing the resulting variants for activity exhibited by the parental antibodies.

The antibodies generated by conservative amino acid substitutions are included in the present disclosure. In a conservative amino acid substitution, an amino acid residue is replaced with an amino acid residue having a side chain with a similar charge. As described above, families of amino acid residues having side chains with similar charges have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Alternatively, mutations can be introduced randomly along all or part of the coding sequence, such as by saturation mutagenesis, and the resultant mutants can be screened for biological activity to identify mutants that retain activity. Following mutagenesis, the encoded protein can be expressed and the activity of the protein can be determined. Conservative (e.g., within an amino acid group with similar properties and/or side chains) substitutions may be made, so as to maintain or not significantly change the properties.

Amino acids may be grouped according to similarities in the properties of their side chains (see, e.g., Lehninger, *Biochemistry* 73-75 (2d ed. 1975)): (1) non-polar: Ala (A), Val (V), Leu (L), Ile (I), Pro (P), Phe (F), Trp (W), Met (M); (2) uncharged polar: Gly (G), Ser (S), Thr (T), Cys (C), Tyr (Y), Asn (N), Gln (Q); (3) acidic: Asp (D), Glu (E); and (4) basic: Lys (K), Arg (R), His (H). Alternatively, naturally occurring residues may be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; and (6) aromatic: Trp, Tyr, Phe. For example, any cysteine residue not involved in maintaining the proper conformation of the antibody also may be substituted, for example, with another amino acid, such as alanine or serine, to improve the oxidative stability of the molecule and to prevent aberrant crosslinking. Non-conservative substitutions will entail exchanging a member of one of these classes for another class.

One type of substitutional variant involves substituting one or more hypervariable region residues of a parent antibody (e.g., a humanized or human antibody). Generally, the resulting variant(s) selected for further study will have modifications (e.g., improvements) in certain biological properties (e.g., increased affinity, reduced immunogenicity) relative to the parent antibody and/or will have substantially retained certain biological properties of the parent antibody. An exemplary substitutional variant is an affinity matured antibody, which may be conveniently generated, e.g., using phage display-based affinity maturation techniques such as those described herein. Briefly, one or more CDR residues are mutated and the variant antibodies displayed on phage and screened for a particular biological activity (e.g. binding affinity).

Alterations (e.g., substitutions) may be made in CDRs, e.g., to improve antibody affinity. Such alterations may be made in CDR "hotspots," i.e., residues encoded by codons that undergo mutation at high frequency during the somatic maturation process (see, e.g., Chowdhury, *Methods Mol. Biol.* 207:179-196 (2008)), and/or SDRs (a-CDRs), with the resulting variant antibody or fragment thereof being tested for binding affinity. Affinity maturation by constructing and reselecting from secondary libraries has been described, e.g., in Hoogenboom et al. in *Methods in Molecular Biology* 178:1-37 (O'Brien et al., ed., Human Press, Totowa, NJ, (2001).) In some embodiments of affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired affinity. Another method to introduce diversity involves CDR-directed approaches, in which several CDR residues (e.g., 4-6 residues at a time) are randomized. CDR residues involved in antigen binding may be specifically identified, e.g., using alanine scanning mutagenesis or modeling.

In some embodiments, substitutions, insertions, or deletions may occur within one or more CDRs so long as such alterations do not substantially reduce the ability of the antibody to bind antigen. For example, conservative alterations (e.g., conservative substitutions as provided herein) that do not substantially reduce binding affinity may be made in CDRs. In some embodiments, each CDR either is unaltered, or contains no more than one, two or three amino acid substitutions.

A useful method for identification of residues or regions of an antibody that may be targeted for mutagenesis is called "alanine scanning mutagenesis" as described by Cunningham and Wells, *Science,* 244:1081-1085 (1989). In this method, a residue or group of target residues (e.g., charged residues such as Arg, Asp, His, Lys, and Glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions.

Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody.

The variations can be made using methods known in the art such as oligonucleotide-mediated (site-directed) mutagenesis, alanine scanning, and PCR mutagenesis. Site-directed mutagenesis (see, e.g., Carter, Biochem J. 237:1-7 (1986); and Zoller et al., Nucl. Acids Res. 10:6487-500 (1982)), cassette mutagenesis (see, e.g., Wells et al., Gene 34:315-23 (1985)), or other known techniques can be performed on the cloned DNA to produce the antibody variant DNA.

5.4.2. Polynucleotides

In certain embodiments, the disclosure provides polynucleotides that encode the CARs provided herein. The polynucleotides of the disclosure can be in the form of RNA or in the form of DNA. DNA includes cDNA, genomic DNA, and synthetic DNA; and can be double-stranded or single-stranded, and if single stranded can be the coding strand or non-coding (anti-sense) strand. In some embodiments, the polynucleotide is in the form of cDNA. In some embodiments, the polynucleotide is a synthetic polynucleotide. In some embodiments, the polynucleotide provided herein encodes the CD123 binding CAR provided herein. In some embodiments, the polynucleotide provided herein encodes the PSMA binding CAR provided herein.

The present disclosure further relates to variants of the polynucleotides described herein, wherein the variant encodes, for example, fragments, analogs, and/or derivatives of the antibody or CAR of the disclosure. In certain embodiments, the present disclosure provides a polynucleotide comprising a polynucleotide having a nucleotide sequence at least about 75% identical, at least about 80% identical, at least about 85% identical, at least about 90% identical, at least about 95% identical, and in some embodiments, at least about 96%, 97%, 98% or 99% identical to a polynucleotide encoding CAR of the disclosure. As used herein, the phrase "a polynucleotide having a nucleotide sequence at least, for example, 95% "identical" to a reference nucleotide sequence" is intended to mean that the nucleotide sequence of the polynucleotide is identical to the reference sequence except that the polynucleotide sequence can include up to five point mutations per each 100 nucleotides of the reference nucleotide sequence. In other words, to obtain a polynucleotide having a nucleotide sequence at least 95% identical to a reference nucleotide sequence, up to 5% of the nucleotides in the reference sequence can be deleted or substituted with another nucleotide, or a number of nucleotides up to 5% of the total nucleotides in the reference sequence can be inserted into the reference sequence. These mutations of the reference sequence can occur at the 5' or 3' terminal positions of the reference nucleotide sequence or anywhere between those terminal positions, interspersed either individually among nucleotides in the reference sequence or in one or more contiguous groups within the reference sequence.

The polynucleotide variants can contain alterations in the coding regions, non-coding regions, or both. In some embodiments, a polynucleotide variant contains alterations which produce silent substitutions, additions, or deletions, but does not alter the properties or activities of the encoded polypeptide. In some embodiments, a polynucleotide variant comprises silent substitutions that results in no change to the amino acid sequence of the polypeptide (due to the degeneracy of the genetic code). Polynucleotide variants can be produced for a variety of reasons, for example, to optimize codon expression for a particular host (i.e., change codons in the human mRNA to those preferred by a bacterial host such as E. coli). In some embodiments, a polynucleotide variant comprises at least one silent mutation in a non-coding or a coding region of the sequence.

In some embodiments, a polynucleotide variant is produced to modulate or alter expression (or expression levels) of the encoded polypeptide. In some embodiments, a polynucleotide variant is produced to increase expression of the encoded polypeptide. In some embodiments, a polynucleotide variant is produced to decrease expression of the encoded polypeptide. In some embodiments, a polynucleotide variant has increased expression of the encoded polypeptide as compared to a parental polynucleotide sequence. In some embodiments, a polynucleotide variant has decreased expression of the encoded polypeptide as compared to a parental polynucleotide sequence.

5.4.3. Vectors

Also provided are vectors comprising the nucleic acid molecules described herein. In an embodiment, the nucleic acid molecules can be incorporated into a recombinant expression vector.

The present disclosure provides vectors for cloning and expressing any one of the CARs described herein. In some embodiments, the vector is suitable for replication and integration in eukaryotic cells, such as mammalian cells. In some embodiments, the vector is a viral vector. Examples of viral vectors include, but are not limited to, adenoviral vectors, adeno-associated virus vectors, lentiviral vector, retroviral vectors, vaccinia vector, herpes simplex viral vector, and derivatives thereof. Viral vector technology is well known in the art and is described, for example, in Sambrook et al. (2001, Molecular Cloning: A Laboratory Manual, Cold Spring Harbor Laboratory, New York), and in other virology and molecular biology manuals.

A number of viral based systems have been developed for gene transfer into mammalian cells. For example, retroviruses provide a convenient platform for gene delivery systems. The heterologous nucleic acid can be inserted into a vector and packaged in retroviral particles using techniques known in the art. The recombinant virus can then be isolated and delivered to the engineered mammalian cell in vitro or ex vivo. A number of retroviral systems are known in the art.

In some embodiments, adenovirus vectors are used. A number of adenovirus vectors are known in the art. In some embodiments, lentivirus vectors are used. In some embodiments, self-inactivating lentiviral vectors are used. For example, self-inactivating lentiviral vectors carrying the immunomodulator (such as immune checkpoint inhibitor) coding sequence and/or self-inactivating lentiviral vectors carrying chimeric antigen receptors can be packaged with protocols known in the art. The resulting lentiviral vectors can be used to transduce a mammalian cell (such as primary human T cells) using methods known in the art. Vectors derived from retroviruses such as lentivirus are suitable tools to achieve long-term gene transfer, because they allow long-term, stable integration of a transgene and its propagation in progeny cells. Lentiviral vectors also have low immunogenicity, and can transduce non-proliferating cells.

In some embodiments, the vector comprises any one of the nucleic acids encoding a CAR described herein. The nucleic acid can be cloned into the vector using any known molecular cloning methods in the art, including, for example, using restriction endonuclease sites and one or more selectable markers. In some embodiments, the nucleic acid is operably linked to a promoter. Varieties of promoters have been explored for gene expression in mammalian cells, and any of the promoters known in the art may be used in the present disclosure. Promoters may be roughly categorized as constitutive promoters or regulated promoters, such as inducible promoters.

In some embodiments, the nucleic acid encoding the CAR is operably linked to a constitutive promoter. Constitutive promoters allow heterologous genes (also referred to as transgenes) to be expressed constitutively in the host cells. Exemplary constitutive promoters contemplated herein include, but are not limited to, Cytomegalovirus (CMV) promoters, human elongation factors-1 alpha (hEF1α), ubiquitin C promoter (UbiC), phosphoglycerokinase promoter (PGK), simian virus 40 early promoter (SV40), and chicken β-Actin promoter coupled with CMV early enhancer (CAGG). The efficiencies of such constitutive promoters on driving transgene expression have been widely compared in a huge number of studies. For example, Michael C. Milone et al compared the efficiencies of CMV, hEF1α, UbiC and PGK to drive chimeric antigen receptor expression in primary human T cells, and concluded that hEF1α promoter not only induced the highest level of transgene expression, but was also optimally maintained in the CD4 and CD8 human T cells (Molecular Therapy, 17(8): 1453-1464 (2009)). In some embodiments, the nucleic acid encoding the CAR is operably linked to a hEF1α promoter.

In some embodiments, the nucleic acid encoding the CAR is operably linked to an inducible promoter. Inducible promoters belong to the category of regulated promoters. The inducible promoter can be induced by one or more conditions, such as a physical condition, microenvironment of the engineered immune effector cell, or the physiological state of the engineered immune effector cell, an inducer (i.e., an inducing agent), or a combination thereof.

In some embodiments, the inducing condition does not induce the expression of endogenous genes in the engineered mammalian cell, and/or in the subject that receives the pharmaceutical composition. In some embodiments, the inducing condition is selected from the group consisting of: inducer, irradiation (such as ionizing radiation, light), temperature (such as heat), redox state, tumor environment, and the activation state of the engineered mammalian cell.

In some embodiments, the vector also contains a selectable marker gene or a reporter gene to select cells expressing the CAR from the population of host cells transfected through lentiviral vectors. Both selectable markers and reporter genes may be flanked by appropriate regulatory sequences to enable expression in the host cells. For example, the vector may contain transcription and translation terminators, initiation sequences, and promoters useful for regulation of the expression of the nucleic acid sequences.

5.5. Influenza A Virus Specific Vβ17$^+$CD8$^+$ T Cells Expressing CARs

In yet another aspect, provided herein is CAR-T cells produced according to the methods provided herein, e.g., as described Section 5.4 above.

In yet another aspect, provided herein is a CAR-T cell expressing a CAR, wherein the CAR-T cell is a Vβ17+CD8+ T cell. In certain embodiments, provided herein is a CAR-T cell expressing a CAR, wherein the CAR-T cell is a Vβ17$^+$CD8$^+$ T cell, and wherein the CAR-T cell expresses a cell surface receptor capable of binding to a M1 peptide comprising an amino acid sequence of SEQ ID NO:1.

In some embodiments, the CAR in the present CAR-T cells comprises an extracellular antigen binding domain; a transmembrane domain; and an intracellular signaling domain. In some embodiments, the CAR further comprises one or more additional regions/domains such as a signal peptide, hinge region, co-stimulatory signaling domain, linkers, etc., each of which can be as described in Section 5.4.1 above.

Specifically, in certain embodiments, the CARs provided herein may comprise a signal peptide at the N-terminus of the polypeptide. In some embodiments, the signal peptide targets the effector molecule to the secretory pathway of the cell and will allow for integration and anchoring of the effector molecule into the lipid bilayer. Signal peptides including signal sequences of naturally occurring proteins or synthetic, non-naturally occurring signal sequences, which are compatible for use in the CARs described herein will be evident to one of skill in the art. In some embodiments, the signal peptide is derived from a molecule selected from the group consisting of CD8α, GM-CSF receptor α, and IgG1 heavy chain. In a specific embodiment, the signal peptide comprises an amino acid sequence of SEQ ID NO:2.

The extracellular antigen binding domain of the CARs described herein comprises one or more antigen binding domains. In some embodiments, the extracellular antigen binding domain comprises an antibody or a fragment thereof. In a specific embodiment, the extracellular antigen binding domain of the present CARs comprise a single-chain Fv (sFv or scFv). In some embodiments, the extracellular antigen binding domain comprises humanized antibodies or fragment thereof.

In certain embodiments, the extracellular antigen binding domain comprises multiple binding domains. In some embodiments, the extracellular antigen binding domain comprises multispecific antibodies or fragments thereof. In other embodiments, the extracellular antigen binding domain comprises multivalent antibodies or fragments thereof. In case there are multiple binding domains in the extracellular antigen binding domain of the present CARs. The various domains may be fused to each other via peptide linkers. In some embodiments, the domains are directly fused to each other without any peptide linkers. The peptide linkers may be the same or different. Each peptide linker may have the same or different length and/or sequence depending on the structural and/or functional features of the various domains. Each peptide linker may be selected and optimized independently.

In some embodiments, the extracellular antigen binding domain provided in the present CARs recognizes an antigen that acts as a cell surface marker on target cells associated with a special disease state. In some embodiments, the antigen is a tumor antigen. Tumors express a number of proteins that can serve as a target antigen for an immune response, particularly T cell mediated immune responses. The antigens targeted by the CAR may be antigens on a single diseased cell or antigens that are expressed on different cells that each contribute to the disease. The antigens targeted by the CAR may be directly or indirectly involved in the diseases.

Tumor antigens are proteins that are produced by tumor cells that can elicit an immune response, particularly T-cell mediated immune responses. Exemplary tumor antigens include, but not limited to, a glioma-associated antigen, carcinoembryonic antigen (CEA), β-human chorionic gonadotropin, alphafetoprotein (AFP), lectin-reactive AFP, thyroglobulin, RAGE-1, MN-CAIX, human telomerase reverse transcriptase, RU1, RU2 (AS), intestinal carboxyl esterase, mut hsp70-2, M-CSF, prostase, prostate-specific antigen (PSA), PAP, NY-ESO-1, LAGE-1a, p53, prostein, PSMA, HER2/neu, survivin and telomerase, prostate-carcinoma tumor antigen-1 (PCTA-1), MAGE, ELF2M, neutrophil elastase, ephrinB2, insulin growth factor (IGF)-I, IGF-II, IGF-I receptor, and mesothelin.

In some embodiments, the tumor antigen comprises one or more antigenic cancer epitopes associated with a malignant tumor. Malignant tumors express a number of proteins that can serve as target antigens for an immune attack. These molecules include, but are not limited to, tissue-specific antigens such as MART-1, tyrosinase and gp100 in melanoma and prostatic acid phosphatase (PAP) and prostate-specific antigen (PSA) in prostate cancer. Other target molecules belong to the group of transformation-related molecules such as the oncogene HER2/Neu/ErbB-2. Yet another group of target antigens are onco-fetal antigens such as carcinoembryonic antigen (CEA).

In some embodiments, the tumor antigen is a tumor-specific antigen (TSA) or a tumor-associated antigen (TAA). A TSA is unique to tumor cells and does not occur on other cells in the body. A TAA associated antigen is not unique to a tumor cell, and instead is also expressed on a normal cell under conditions that fail to induce a state of immunologic tolerance to the antigen. The expression of the antigen on the tumor may occur under conditions that enable the immune system to respond to the antigen. TAAs may be antigens that are expressed on normal cells during fetal development, when the immune system is immature, and unable to respond or they may be antigens that are normally present at extremely low levels on normal cells, but which are expressed at much higher levels on tumor cells.

Non-limiting examples of TSA or TAA antigens include: differentiation antigens such as MART-1/MelanA (MART-I), gp 100 (Pmel 17), tyrosinase, TRP-1, TRP-2 and tumor-specific multilineage antigens such as MAGE-1, MAGE-3, BAGE, GAGE-1, GAGE-2, p15; overexpressed embryonic antigens such as CEA; overexpressed oncogenes and mutated tumor-suppressor genes such as p53, Ras, HER2/neu; unique tumor antigens resulting from chromosomal translocations; such as BCR-ABL, E2A-PRL, H4-RET, IGH-IGK, MYL-RAR; and viral antigens, such as the Epstein Barr virus antigens EBVA and the human papillomavirus (HPV) antigens E6 and E7.

Other large, protein-based antigens include TSP-180, MAGE-4, MAGE-5, MAGE-6, RAGE, NY-ESO, pl85erbB2, pl80erbB-3, c-met, nm-23HI, PSA, TAG-72, CA 19-9, CA 72-4, CAM 17.1, NuMa, K-ras, beta-Catenin, CDK4, Mum-1, p 15, p 16, 43-9F, 5T4, 791Tgp72, alpha-fetoprotein, beta-HCG, BCA225, BTAA, CA 125, CA 15-3\CA 27.29\BCAA, CA 195, CA 242, CA-50, CAM43, CD68\P1, CO-029, FGF-5, G250, Ga733\EpCAM, HTgp-175, M344, MA-50, MG7-Ag, MOV18, NB/70K, NY-CO-1, RCAS 1, SDCCAG16, TA-90\Mac-2 binding protein\cyclophilin C-associated protein, TAAL6, TAG72, TLP, and TPS.

In some more specific embodiments, the antigen is CD123. In a specific embodiment, the CARs provided herein comprise an extracellular antigen binding domain that comprises scFv capable of binding CD123 and comprising an amino acid sequence of SEQ ID NO:3.

In other more specific embodiments, the antigen is PSMA. In a specific embodiment, the CARs provided herein comprise an extracellular antigen binding domain that comprises scFv capable of binding PSMA and comprising an amino acid sequence of SEQ ID NO:4.

In some embodiments, the CARs provided herein comprise a hinge domain that is located between the extracellular antigen binding domain and the transmembrane domain. In some embodiments, the hinge domain is a hinge domain of a naturally occurring protein. Hinge domains of any protein known in the art to comprise a hinge domain are compatible for use in the chimeric receptors described herein. In some embodiments, the hinge domain is at least a portion of a hinge domain of a naturally occurring protein and confers flexibility to the chimeric receptor. In some embodiments, the hinge domain is derived from CD8α. In some embodiments, the hinge domain is a portion of the hinge domain of CD8α, e.g., a fragment containing about 15-100 (e.g., 20, 25, 30, 35, or 40) consecutive amino acids of the hinge domain of CD8α. In some embodiments, the hinge domain of CD8α comprises the amino acid sequence of SEQ ID NO:5.

The CARs of the present disclosure comprise a transmembrane domain that can be directly or indirectly fused to the extracellular antigen binding domain. The transmembrane domain may be derived either from a natural or from a synthetic source. Transmembrane domains compatible for use in the CARs described herein may be obtained from a naturally occurring protein. Alternatively, it can be a synthetic, non-naturally occurring protein segment, e.g., a hydrophobic protein segment that is thermodynamically stable in a cell membrane. In some embodiments, the transmembrane domains are derived from membrane proteins of Type I, Type II or Type III. In some embodiments, the transmembrane domain of the CAR described herein is derived from a Type I single-pass membrane protein. In some embodiments, transmembrane domains from multi-pass membrane proteins may also be compatible for use in the CARs described herein. Transmembrane domains for use in the CARs described herein can also comprise at least a portion of a synthetic, non-naturally occurring protein segment. In some embodiments, the protein segment is about 15-100 amino acids. In some embodiments, the transmembrane domain is a synthetic, non-naturally occurring alpha helix or beta sheet. In some embodiments, the protein segment is at least approximately 20 amino acids, e.g., at least 18, 19, 20, 21, 22, 23, 24, 25, 26, 27, 28, 29, 30, or more amino acids.

The transmembrane domain provided herein may comprise a transmembrane region and a cytoplasmic region located at the C-terminal side of the transmembrane domain. In some embodiments, the transmembrane region of the transmembrane domain comprises hydrophobic amino acid residues.

In some embodiments, the transmembrane domain of the CAR comprises a transmembrane domain chosen from the transmembrane domain of an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), CD160, CD19, IL-2R beta, IL-2R gamma, IL-7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD111c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CDIOO (SEMA4D), SLAMF6 (NTB-A, Ly108), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

In some specific embodiments, the transmembrane domain is derived from CD8α. In some embodiments, the transmembrane domain is a transmembrane domain of CD8α comprising the amino acid sequence of SEQ ID NO:6.

The intracellular signaling domain in the CARs provided herein is responsible for activation of at least one of the normal effector functions of the immune effector cell expressing the CARs. In some embodiments, the intracellular signaling domain comprises a primary intracellular signaling domain of an immune effector cell. In some embodiments, the CAR comprises an intracellular signaling domain consisting essentially of a primary intracellular signaling domain of an immune effector cell. In some embodiments, the primary intracellular signaling domain contains a signaling motif known as immunoreceptor tyrosine-based activation motif, or ITAM. Exemplary ITAM-containing primary cytoplasmic signaling sequences include those derived from CD3z, FcR gamma (FCER1G), FcR beta (Fc Epsilon Rib), CD3 gamma, CD3 delta, CD3 epsilon, CD5, CD22, CD79a, CD79b, and CD66d.

In some embodiments, the primary intracellular signaling domain is derived from CD3z. In some embodiments, the intracellular signaling domain consists of the cytoplasmic signaling domain of CD3z. In some embodiments, the primary intracellular signaling domain is a cytoplasmic signaling domain of wild-type CD3z. In some embodiments, the primary intracellular signaling domain of CD3z comprises the amino acid sequence of SEQ ID NO:8.

In some embodiments, the CAR comprises at least one co-stimulatory signaling domain. The co-stimulatory signaling domain of the chimeric receptor described herein can be a cytoplasmic signaling domain from a co-stimulatory protein, which transduces a signal and modulates responses mediated by immune cells. In some embodiments, the intracellular signaling domain comprises a single co-stimulatory signaling domain. In some embodiments, the intracellular signaling domain comprises two or more (such as about any of 2, 3, 4, or more) co-stimulatory signaling domains. In some embodiments, the intracellular signaling domain comprises two or more of the same co-stimulatory signaling domains. In some embodiments, the intracellular signaling domain comprises two or more co-stimulatory signaling domains from different co-stimulatory proteins, such as any two or more co-stimulatory proteins described herein. In some embodiments, the intracellular signaling domain comprises a primary intracellular signaling domain (such as cytoplasmic signaling domain of CD3z) and one or more co-stimulatory signaling domains. In some embodiments, the one or more co-stimulatory signaling domains and the primary intracellular signaling domain (such as cytoplasmic signaling domain of CD3z) are fused to each other via optional peptide linkers. The primary intracellular signaling domain, and the one or more co-stimulatory signaling domains may be arranged in any suitable order. In some embodiments, the one or more co-stimulatory signaling domains are located between the transmembrane domain and the primary intracellular signaling domain (such as cytoplasmic signaling domain of CD3z). Multiple co-stimulatory signaling domains may provide additive or synergistic stimulatory effects.

The co-stimulatory signaling domain of any co-stimulatory molecule may be compatible for use in the CARs described herein. Examples of co-stimulatory signaling domains for use in the CARs can be the cytoplasmic signaling domain of co-stimulatory proteins, including, without limitation, members of the B7/CD28 family (e.g., B7-1/CD80, B7-2/CD86, B7-H1/PD-L1, B7-H2, B7-H3, B7-H4, B7-H6, B7-H7, BTLA/CD272, CD28, CTLA-4, Gi24/VISTA/B7-H5, ICOS/CD278, PD-1, PD-L2/B7-DC, and PDCD6); members of the TNF superfamily (e.g., 4-1BB/TNFSF9/CD137, 4-1BB Ligand/TNFSF9, BAFF/BLyS/TNFSF13B, BAFF R/TNFRSF13C, CD27/TNFRSF7, CD27 Ligand/TNFSF7, CD30/TNFRSF8, CD30 Ligand/TNFSF8, CD40/TNFRSF5, CD40/TNFSF5, CD40 Ligand/TNFSF5, DR3/TNFRSF25, GITR/TNFRSF18, GITR Ligand/TNFSF18, HVEM/TNFRSF14, LIGHT/TNFSF14, Lymphotoxin-alpha/TNF-beta, OX40/TNFRSF4, OX40 Ligand/TNFSF4, RELT/TNFRSF19L, TACI/TNFRSF13B, TL1A/TNFSF15, TNF-alpha, and TNF RII/TNFRSF1B); members of the SLAM family (e.g., 2B4/CD244/SLAMF4, BLAME/SLAMF8, CD2, CD2F-10/SLAMF9, CD48/SLAMF2, CD58/LFA-3, CD84/SLAMF5, CD229/SLAMF3, CRACC/SLAMF7, NTB-A/SLAMF6, and SLAM/CD150); and any other co-stimulatory molecules, such as CD2, CD7, CD53, CD82/Kai-1, CD90/Thy1, CD96, CD160, CD200, CD300a/LMIR1, HLA Class I, HLA-DR, Ikaros, Integrin alpha 4/CD49d, Integrin alpha 4 beta 1, Integrin alpha 4 beta 7/LPAM-1, LAG-3, TCL1A, TCL1B, CRTAM, DAP12, Dectin-1/CLEC7A, DPPIV/CD26, EphB6, TIM-1/KIM-1/HAVCR, TIM-4, TSLP, TSLP R, lymphocyte function associated antigen-1 (LFA-1), and NKG2C. In some embodiments, the one or more co-stimulatory signaling domains are selected from the group consisting of CD27, CD28, CD137, OX40, CD30, CD40, CD3, lymphocyte function-associated antigen-1 (LFA-1), CD2, CD7, LIGHT, NKG2C, B7-H3 and ligands that specially bind to CD83.

In some embodiments, the intracellular signaling domain in the CAR of the present disclosure comprises a co-stimulatory signaling domain derived from CD137 (i.e., 4-1BB). In some embodiments, the intracellular signaling domain comprises a cytoplasmic signaling domain of CDz and a co-stimulatory signaling domain of CD137. In some embodiments, the intracellular signaling domain comprises a co-stimulatory signaling domain of CD137 comprising the amino acid sequence of SEQ ID NO:7.

In a specific embodiment, the CAR provided herein comprises from the N-terminus to the C-terminus: a signal peptide comprising an amino acid sequence of SEQ ID NO:2, the extracellular antigen binding domain comprising a scFv that binds CD123 and comprises an amino acid sequence of SEQ ID NO:3, a CD8α hinge domain comprising an amino acid sequence of SEQ ID NO:5, a CD8α transmembrane domain comprising an amino acid sequence of SEQ ID NO:6, a co-stimulatory signaling domain derived from CD137 comprising an amino acid sequence of SEQ ID NO:7, and a primary intracellular signaling domain derived from CD3z comprising an amino acid sequence of SEQ ID NO:8.

In a specific embodiment, the CAR provided herein comprises from the N-terminus to the C-terminus: a signal peptide comprising an amino acid sequence of SEQ ID NO:2, the extracellular antigen binding domain comprising a scFv that binds PSMA and comprises an amino acid sequence of SEQ ID NO:4, a CD8α hinge domain comprising an amino acid sequence of SEQ ID NO:5, a CD8α transmembrane domain comprising an amino acid sequence of SEQ ID NO:6, a co-stimulatory signaling domain derived from CD137 comprising an amino acid sequence of SEQ ID NO:7, and a primary intracellular signaling domain derived from CD3z comprising an amino acid sequence of SEQ ID NO:8.

In certain embodiments, the CAR provided herein comprises amino acid sequences with certain percent identity relative to any one of the CARs exemplified in Section 7 below. In some embodiments, provided herein is a CAR comprising or consisting of an extracellular domain having at least 75%, 80%, 85%, 86%, 87%, 88%, 89%, 90%, 91%, 92%, 93%, 94%, 95%, 96%, 97%, 98%, 99%, or 100% sequence identity to the amino acid sequence of SEQ ID NO:3. In some embodiments, provided herein is a CAR comprising or consisting of an extracellular domain having at least 75%, 80%, 85%, 86%, 87%, 88%, 89%, 90%, 91%, 92%, 93%, 94%, 95%, 96%, 97%, 98%, 99%, or 100% sequence identity to the amino acid sequence of SEQ ID NO:4.

5.6. Pharmaceutical Compositions

In one aspect, the present disclosure further provides pharmaceutical compositions comprising an engineered T cell of the present disclosure. In some embodiments, a pharmaceutical composition comprises a therapeutically effective amount of the engineered T cell of the present disclosure and a pharmaceutically acceptable excipient.

In a specific embodiment, the term "excipient" can also refer to a diluent, adjuvant (e.g., Freunds' adjuvant (complete or incomplete), carrier or vehicle. Pharmaceutical excipients can be sterile liquids, such as water and oils, including those of petroleum, animal, vegetable or synthetic origin, such as peanut oil, soybean oil, mineral oil, sesame oil and the like. Saline solutions and aqueous dextrose and glycerol solutions can also be employed as liquid excipients. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations and the like. Examples of suitable pharmaceutical excipients are described in Remington's Pharmaceutical Sciences (1990) Mack Publishing Co., Easton, PA Such compositions will contain a prophylactically or therapeutically effective amount of the active ingredient provided herein, such as in purified form, together with a suitable amount of excipient so as to provide the form for proper administration to the patient. The formulation should suit the mode of administration.

In some embodiments, the choice of excipient is determined in part by the particular cell, and/or by the method of administration. Accordingly, there are a variety of suitable formulations.

Typically, acceptable carriers, excipients, or stabilizers are nontoxic to recipients at the dosages and concentrations employed, and include buffers, antioxidants including ascorbic acid, methionine, Vitamin E, sodium metabisulfite; preservatives, isotonicifiers, stabilizers, metal complexes (e.g. Zn-protein complexes); chelating agents such as EDTA and/or non-ionic surfactants.

Buffers may be used to control the pH in a range which optimizes the therapeutic effectiveness, especially if stability is pH dependent. Suitable buffering agents for use with the present disclosure include both organic and inorganic acids and salts thereof. For example, citrate, phosphate, succinate, tartrate, fumarate, gluconate, oxalate, lactate, acetate. Additionally, buffers may comprise histidine and trimethylamine salts such as Tris.

Preservatives may be added to retard microbial growth. Suitable preservatives for use with the present disclosure include octadecyldimethylbenzyl ammonium chloride; hexamethonium chloride; benzalkonium halides (e.g., chloride, bromide, iodide), benzethonium chloride; thimerosal, phenol, butyl or benzyl alcohol; alkyl parabens such as methyl or propyl paraben; catechol; resorcinol; cyclohexanol, 3-pentanol, and m-cresol.

Tonicity agents, sometimes known as "stabilizers" can be present to adjust or maintain the tonicity of liquid in a composition. When used with large, charged biomolecules such as proteins and antibodies, they are often termed "stabilizers" because they can interact with the charged groups of the amino acid side chains, thereby lessening the potential for inter and intra-molecular interactions. Exemplary tonicity agents include polyhydric sugar alcohols, trihydric or higher sugar alcohols, such as glycerin, erythritol, arabitol, xylitol, sorbitol and mannitol.

Additional exemplary excipients include: (1) bulking agents, (2) solubility enhancers, (3) stabilizers and (4) agents preventing denaturation or adherence to the container wall. Such excipients include: polyhydric sugar alcohols (enumerated above); amino acids such as alanine, glycine, glutamine, asparagine, histidine, arginine, lysine, ornithine, leucine, 2-phenylalanine, glutamic acid, threonine, etc.; organic sugars or sugar alcohols such as sucrose, lactose, lactitol, trehalose, stachyose, mannose, sorbose, xylose, ribose, ribitol, myoinisitose, myoinisitol, galactose, galactitol, glycerol, cyclitols (e.g., inositol), polyethylene glycol; sulfur containing reducing agents, such as urea, glutathione, thioctic acid, sodium thioglycolate, thioglycerol, α-monothioglycerol and sodium thio sulfate; low molecular weight proteins such as human serum albumin, bovine serum albumin, gelatin or other immunoglobulins; hydrophilic polymers such as polyvinylpyrrolidone; monosaccharides (e.g., xylose, mannose, fructose, glucose; disaccharides (e.g., lactose, maltose, sucrose); trisaccharides such as raffinose; and polysaccharides such as dextrin or dextran.

Non-ionic surfactants or detergents (also known as "wetting agents") may be present to help solubilize the therapeutic agent as well as to protect the therapeutic protein against agitation-induced aggregation, which also permits the formulation to be exposed to shear surface stress without causing denaturation of the active therapeutic protein or antibody. Suitable non-ionic surfactants include, e.g., polysorbates (20, 40, 60, 65, 80, etc.), polyoxamers (184, 188, etc.), PLURONIC® polyols, TRITON®, polyoxyethylene sorbitan monoethers (TWEEN®-20, TWEEN®-80, etc.), lauromacrogol 400, polyoxyl 40 stearate, polyoxyethylene hydrogenated castor oil 10, 50 and 60, glycerol monostearate, sucrose fatty acid ester, methyl celluose and carboxymethyl cellulose. Anionic detergents that can be used include sodium lauryl sulfate, dioctyle sodium sulfosuccinate and dioctyl sodium sulfonate. Cationic detergents include benzalkonium chloride or benzethonium chloride.

In order for the pharmaceutical compositions to be used for in vivo administration, they are preferably sterile. The pharmaceutical composition may be rendered sterile by filtration through sterile filtration membranes. The pharmaceutical compositions herein generally can be placed into a container having a sterile access port, for example, an intravenous solution bag or vial having a stopper pierceable by a hypodermic injection needle.

The route of administration is in accordance with known and accepted methods, such as by single or multiple bolus or infusion over a long period of time in a suitable manner, e.g., injection or infusion by subcutaneous, intravenous, intraperitoneal, intramuscular, intraarterial, intralesional or intraarticular routes, topical administration, inhalation or by sustained release or extended-release means.

In another embodiment, a pharmaceutical composition can be provided as a controlled release or sustained release system. In one embodiment, a pump may be used to achieve controlled or sustained release (see, e.g., Sefton, Crit. Ref. Biomed. Eng. 14:201-40 (1987); Buchwald et al., Surgery 88:507-16 (1980); and Saudek et al., N. Engl. J. Med. 321:569-74 (1989)). In another embodiment, polymeric materials can be used to achieve controlled or sustained release of a prophylactic or therapeutic agent (e.g., a fusion protein as described herein) or a composition provided herein (see, e.g., Medical Applications of Controlled Release (Langer and Wise eds., 1974); Controlled Drug Bioavailability, Drug Product Design and Performance (Smolen and Ball eds., 1984); Ranger and Peppas, J. Macromol. Sci. Rev. Macromol. Chem. 23:61-126 (1983); Levy et al., Science 228:190-92 (1985); During et al., Ann. Neurol. 25:351-56 (1989); Howard et al., J. Neurosurg. 71:105-12 (1989); U.S. Pat. Nos. 5,679,377; 5,916,597; 5,912,015; 5,989,463; and 5,128,326; PCT Publication Nos. WO 99/15154 and WO 99/20253). Examples of polymers used in sustained release formulations include, but are not limited to, poly(2-hydroxy ethyl methacrylate), poly(methyl methacrylate), poly (acrylic acid), poly(ethylene-co-vinyl acetate), poly(methacrylic acid), polyglycolides (PLG), polyanhydrides, poly (N-vinyl pyrrolidone), poly(vinyl alcohol), polyacrylamide, poly(ethylene glycol), polylactides (PLA), poly(lactide-co-glycolides) (PLGA), and polyorthoesters. In one embodiment, the polymer used in a sustained release formulation is inert, free of leachable impurities, stable on storage, sterile, and biodegradable. In yet another embodiment, a controlled or sustained release system can be placed in proximity of a particular target tissue, for example, the nasal passages or lungs, thus requiring only a fraction of the systemic dose (see, e.g., Goodson, Medical Applications of Controlled Release Vol. 2, 115-38 (1984)). Controlled release systems are discussed, for example, by Langer, Science 249:1527-33 (1990). Any technique known to one of skill in the art can be used to produce sustained release formulations comprising one or more agents as described herein (see, e.g., U.S. Pat. No. 4,526,938, PCT publication Nos. WO 91/05548 and WO 96/20698, Ning et al., Radiotherapy & Oncology 39:179-89 (1996); Song et al., PDA J. of Pharma. Sci. & Tech. 50:372-97 (1995); Cleek et al., Pro. Int'l. Symp. Control. Rel. Bioact. Mater. 24:853-54 (1997); and Lam et al., Proc. Int'l. Symp. Control Rel. Bioact. Mater. 24:759-60 (1997)).

The pharmaceutical compositions described herein may also contain more than one active compound or agent as necessary for the particular indication being treated. Alternatively, or in addition, the composition may comprise a cytotoxic agent, chemotherapeutic agent, cytokine, immunosuppressive agent, or growth inhibitory agent. Such molecules are suitably present in combination in amounts that are effective for the purpose intended.

The active ingredients may also be entrapped in microcapsules prepared, for example, by coascervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are disclosed in Remington's Pharmaceutical Sciences 18th edition.

Various compositions and delivery systems are known and can be used with the therapeutic agents provided herein, including, but not limited to, encapsulation in liposomes, microparticles, microcapsules, recombinant cells capable of expressing the single domain antibody or therapeutic molecule provided herein, construction of a nucleic acid as part of a retroviral or other vector, etc.

In some embodiments, the pharmaceutical composition provided herein contains the binding molecules and/or cells in amounts effective to treat or prevent the disease or disorder, such as a therapeutically effective or prophylactically effective amount. Therapeutic or prophylactic efficacy in some embodiments is monitored by periodic assessment of treated subjects. For repeated administrations over several days or longer, depending on the condition, the treatment is repeated until a desired suppression of disease symptoms occurs. However, other dosage regimens may be useful and can be determined.

5.7. Methods and Uses

In another aspect, provided herein are methods for using and uses of the engineered Vβ17+CD8+ T cells expressing the recombinant receptors, such as those described in Section 5.5 above, including a CAR-T cell, wherein the CAR-T cell is a Vβ17+CD8+ T cell, and wherein the CAR-T cell expresses a cell surface receptor capable of binding to a M1 peptide comprising an amino acid sequence of SEQ ID NO:1.

In some embodiments, the engineered T cells provided herein are useful as allogenic CAR-T cell therapies. In some embodiments, the present CAR-T cell therapy has more safety features that are absent from the traditional autologous CAR-T therapy, for example, no or low cytokine storm, no stimulation of regulatory T cells, reduced self-tissue damage, reduced induction of autoimmunity, reduced graft-versus-host disease, etc.

Such methods and uses include therapeutic methods and uses, for example, involving administration of the cells, or compositions containing the same, to a subject having a disease or disorder. In some embodiments, the cell is administered in an effective amount to effect treatment of the disease or disorder. Uses include uses of the cells in such methods and treatments, and in the preparation of a medicament in order to carry out such therapeutic methods. In some embodiments, the methods are carried out by administering the cells, or compositions comprising the same, to the subject having or suspected of having the disease or condition. In some embodiments, the methods thereby treat the disease or disorder in the subject.

In some embodiments, the treatment provided herein cause complete or partial amelioration or reduction of a disease or disorder, or a symptom, adverse effect or outcome, or phenotype associated therewith. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. The terms include, but do not imply, complete curing of a disease or complete elimination of any symptom or effect(s) on all symptoms or outcomes.

As used herein, in some embodiments, the treatment provided herein delay development of a disease or disorder, e.g., defer, hinder, slow, retard, stabilize, suppress and/or postpone development of the disease (such as cancer). This delay can be of varying lengths of time, depending on the history of the disease and/or individual being treated. As is evident to one skilled in the art, a sufficient or significant delay can, in effect, encompass prevention, in that the individual does not develop the disease or disorder. For example, a late stage cancer, such as development of metastasis, may be delayed. In other embodiments, the method or the use provided herein prevents a disease or disorder.

In some embodiments, the present CAR-T cell therapies are used for treating solid tumor cancer. In other embodiments, the present CAR-T cell therapies are used for treating blood cancer. In other embodiments, the disease or disorder is an autoimmune and inflammatory disease. In some embodiments, the disease or disorder is a CD123 associated disease or disorder. In some embodiments, the disease or disorder is a PSMA associated disease or disorder.

In some embodiments, the methods include adoptive cell therapy, whereby genetically engineered cells are administered to a subject. Such administration can promote activation of the cells (e.g., T cell activation), such that the cells of the disease or disorder are targeted for destruction.

In some embodiments, the methods include administration of the cells or a composition containing the cells to a subject, tissue, or cell, such as one having, at risk for, or suspected of having the disease or disorder. In some embodiments, the cells, populations, and compositions are administered to a subject having the particular disease or disorder to be treated, e.g., via adoptive cell therapy, such as adoptive T cell therapy. In some embodiments, the cells or compositions are administered to the subject, such as a subject having or at risk for the disease or disorder. In some embodiments, the methods thereby treat, e.g., ameliorate one or more symptom of the disease or disorder.

Methods for administration of cells for adoptive cell therapy are known, as described, e.g., in US Patent Application Publication No. 2003/0170238; U.S. Pat. No. 4,690,915; Rosenberg, Nat Rev Clin Oncol. 8 (10):577-85 (2011); Themeli et al., Nat Biotechnol. 31(10): 928-933 (2013); Tsukahara et al., Biochem Biophys Res Commun 438(1): 84-9 (2013); and Davila et al., PLoS ONE 8(4): e61338 (2013). These methods may be used in connection with the methods and compositions provided herein.

In some embodiments, the cell therapy (e.g., adoptive T cell therapy) is carried out by autologous transfer, in which the cells are isolated and/or otherwise prepared from the subject who is to receive the cell therapy, or from a sample derived from such a subject. Thus, in some aspects, the cells are derived from a subject in need of a treatment and the cells, following isolation and processing are administered to the same subject. In other embodiments, the cell therapy (e.g., adoptive T cell therapy) is carried out by allogeneic transfer, in which the cells are isolated and/or otherwise prepared from a subject other than a subject who is to receive or who ultimately receives the cell therapy, e.g., a first subject. In such embodiments, the cells then are administered to a different subject, e.g., a second subject, of the same species. In some embodiments, the first and second subjects are genetically identical. In some embodiments, the first and second subjects are genetically similar. In some embodiments, the second subject expresses the same HLA class or supertype as the first subject.

In some embodiments, the subject, to whom the cells, cell populations, or compositions are administered is a primate, such as a human. The subject can be male or female and can be any suitable age, including infant, juvenile, adolescent, adult, and geriatric subjects. In some examples, the subject is a validated animal model for disease, adoptive cell therapy, and/or for assessing toxic outcomes.

The composition provided herein can be administered by any suitable means, for example, by injection, e.g., intravenous or subcutaneous injections, intraocular injection, periocular injection, subretinal injection, intravitreal injection, trans-septal injection, subscleral injection, intrachoroidal injection, intracameral injection, subconjectval injection, subconjuntival injection, sub-Tenon's injection, retrobulbar injection, peribulbar injection, or posterior juxtascleral delivery. In some embodiments, they are administered by parenteral, intrapulmonary, and intranasal, and, if desired for local treatment, intralesional administration. Parenteral infusions include intramuscular, intravenous, intraarterial, intraperitoneal, or subcutaneous administration.

The amount of a prophylactic or therapeutic agent provided herein that will be effective in the prevention and/or treatment of a disease or condition can be determined by standard clinical techniques. Effective doses may be extrapolated from dose-response curves derived from in vitro or animal model test systems. For the prevention or treatment of disease, the appropriate dosage of the binding molecule or cell may depend on the type of disease or disorder to be treated, the type of binding molecule, the severity and course of the disease or disorder, whether the therapeutic agent is administered for preventive or therapeutic purposes, previous therapy, the patient's clinical history and response to the agent, and the discretion of the attending physician. The compositions, molecules and cells are in some embodiments suitably administered to the patient at one time or over a series of treatments. Multiple doses may be administered intermittently. An initial higher loading dose, followed by one or more lower doses may be administered.

In the context of genetically engineered cells, in some embodiments, a subject may be administered the range of about one million to about 100 billion cells and/or that amount of cells per kilogram of body weight. In some embodiments, wherein the pharmaceutical composition comprises any one of the engineered immune cells described herein, the pharmaceutical composition is administered at a dosage of at least about any of $10^4$, $10^5$, $10^6$, $10^7$, $10^8$, or $10^9$ cells/kg of body weight of the individual. Dosages may vary depending on attributes particular to the disease or disorder and/or patient and/or other treatments.

In some embodiments, the pharmaceutical composition is administered for a single time. In some embodiments, the pharmaceutical composition is administered for multiple times (such as any of 2, 3, 4, 5, 6, or more times). In some embodiments, the pharmaceutical composition is administered once or multiple times during a dosing cycle. A dosing cycle can be, e.g., 1, 2, 3, 4, 5 or more week(s), or 1, 2, 3, 4, 5, or more month(s). The optimal dosage and treatment regime for a particular patient can be determined by one skilled in the art of medicine by monitoring the patient for signs of disease and adjusting the treatment accordingly.

In some embodiments, the compositions provided herein are administered as part of a combination treatment, such as simultaneously with or sequentially with, in any order, another therapeutic intervention, such as another antibody or engineered cell or receptor or agent, such as a cytotoxic or therapeutic agent.

In some embodiments, the compositions provided herein are co-administered with one or more additional therapeutic agents or in connection with another therapeutic intervention, either simultaneously or sequentially in any order. In some embodiments, the cells are co-administered with another therapy sufficiently close in time such that the cell populations enhance the effect of one or more additional therapeutic agents, or vice versa. In some embodiments, the compositions provided herein are administered prior to the one or more additional therapeutic agents. In some embodiments, the compositions provided herein are administered after to the one or more additional therapeutic agents.

In certain embodiments, once the cells are administered to a mammal (e.g., a human), the biological activity of the engineered cell populations is measured by any of a number of known methods. Parameters to assess include specific binding of an engineered or natural T cell or other immune cell to antigen, in vivo, e.g., by imaging, or ex vivo, e.g., by ELISA or flow cytometry. In certain embodiments, the ability of the engineered cells to destroy target cells can be measured using any suitable method known in the art, such as cytotoxicity assays described in, for example, Kochenderfer et al., J. Immunotherapy, 32(7): 689-702 (2009), and Herman et al. J. Immunological Methods, 285(1): 25-40 (2004). In certain embodiments, the biological activity of the cells also can be measured by assaying expression and/or secretion of certain cytokines, such as CD107a, IFNγ, IL-2, and TNF. In some aspects the biological activity is measured by assessing clinical outcome, such as reduction in tumor burden or load.

5.8. Kits and Articles of Manufacture

Further provided are kits, unit dosages, and articles of manufacture comprising any of the engineered immune effector cells described herein. In some embodiments, a kit is provided which contains any one of the pharmaceutical compositions described herein and preferably provides instructions for its use.

The kits of the present application are in suitable packaging. Suitable packaging includes, but is not limited to, vials, bottles, jars, flexible packaging (e.g., sealed Mylar or plastic bags), and the like. Kits may optionally provide additional components such as buffers and interpretative information. The present application thus also provides articles of manufacture, which include vials (such as sealed vials), bottles, jars, flexible packaging, and the like.

The article of manufacture can comprise a container and a label or package insert on or associated with the container. Suitable containers include, for example, bottles, vials, syringes, etc. The containers may be formed from a variety of materials such as glass or plastic. Generally, the container holds a composition which is effective for treating a disease or disorder (such as cancer) described herein, and may have a sterile access port (for example the container may be an intravenous solution bag or a vial having a stopper pierceable by a hypodermic injection needle). The label or package insert indicates that the composition is used for treating the particular condition in an individual. The label or package insert will further comprise instructions for administering the composition to the individual. The label may indicate directions for reconstitution and/or use. The container holding the pharmaceutical composition may be a multi-use vial, which allows for repeat administrations (e.g. from 2-6 administrations) of the reconstituted formulation. Package insert refers to instructions customarily included in commercial packages of therapeutic products that contain information about the indications, usage, dosage, administration, contraindications and/or warnings concerning the use of such therapeutic products. Additionally, the article of manufacture may further comprise a second container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

The kits or article of manufacture may include multiple unit doses of the pharmaceutical composition and instructions for use, packaged in quantities sufficient for storage and use in pharmacies, for example, hospital pharmacies and compounding pharmacies.

For the sake of conciseness, certain abbreviations are used herein. One example is the single letter abbreviation to represent amino acid residues. The amino acids and their corresponding three letter and single letter abbreviations are as follows:

| | | |
|---|---|---|
| alanine | Ala | (A) |
| arginine | Arg | (R) |
| asparagine | Asn | (N) |
| aspartic acid | Asp | (D) |
| cysteine | Cys | (C) |
| glutamic acid | Glu | (E) |
| glutamine | Gln | (Q) |
| glycine | Gly | (G) |
| histidine | His | (H) |
| isoleucine | Ile | (I) |
| leucine | Leu | (L) |
| lysine | Lys | (K) |
| methionine | Met | (M) |
| phenylalanine | Phe | (F) |
| proline | Pro | (P) |
| serine | Ser | (S) |
| threonine | Thr | (T) |
| tryptophan | Trp | (W) |
| tyrosine | Tyr | (Y) |
| valine | Val | (V) |

The disclosure is generally disclosed herein using affirmative language to describe the numerous embodiments. The disclosure also specifically includes embodiments in which particular subject matter is excluded, in full or in part, such as substances or materials, method steps and conditions, protocols, procedures, assays or analysis. Thus, even though the disclosure is generally not expressed herein in terms of what the disclosure does not include, aspects that are not expressly included in the disclosure are nevertheless disclosed herein.

A number of embodiments of the disclosure have been described. Nevertheless, it will be understood that various modifications may be made without departing from the spirit and scope of the disclosure. Accordingly, the following examples are intended to illustrate but not limit the scope of disclosure described in the claims.

6. EMBODIMENTS

This invention provides the following non-limiting embodiments.

In one set of embodiments (embodiment set A), provided are:

A1. A method for activating or enriching Vβ17$^+$CD8$^+$ T cells, comprising contacting a M1 peptide derived from human influenza A virus (M1$_{58-66}$) with a population of cells comprising T cells.

A2. The method of embodiment A1, wherein the M1 peptide comprises an amino acid sequence of GILGFVFTL (SEQ ID NO:1).

A3. The method of embodiment A1 or A2, further comprises contacting IL-2 with the population of the cells comprising the T cells.

A4. The method of any one of embodiments A1 to A3, wherein the population of the cells is cultured ex vivo in a medium comprising the M1 peptide and/or IL-2.

A5. The method of embodiment A3, wherein the method comprises:

(i) culturing the population of the cells ex vivo in a medium comprising the M1 peptide and IL-2;

(ii) culturing the population of the cells ex vivo in a medium comprising the M1 peptide, and then culturing the population of the cells ex vivo in a medium comprising IL-2; or (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

A6. The method of embodiment A4 or A5, wherein the population of the cells is cultured ex vivo for at least 1, 2, 3, 4, 5, 6, 7, 8, 9, 10, 11, 12, 13, or 14 days.

A7. The method of embodiment A4 or A5, wherein the population of the cells is cultured ex vivo for 1-20, 2-18, 3-16, 4-14, 5-14, 6-14, 7-14, 8-14, 9-14, 10-14, 11-14, or 12-14 days. A8. The method of any one of embodiments A1 to A7, wherein the population of the cells is a population of whole peripheral blood mononuclear cells (PBMCs).

A9. The method of embodiment A8, wherein the population of the whole PBMCs is from a healthy donor.

A10. The method of any one of embodiments A1 to A9, wherein the method increases the percent of the Vβ17$^+$CD8$^+$ T cells in the CD8+ cells from the population of the cells by at least 10%, 20%, 30%, 40%, 50%, 60%, 70%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17$^+$CD8$^+$ T cells in the CD8+ cells; or wherein the method increases the percent of Vβ17$^+$CD8$^+$ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

A11. The method of any one of embodiments A1 to A9, wherein the method increases the percent of the Vβ17$^+$CD8$^+$ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17$^+$CD8$^+$ T cells in the CD8+ cells; or wherein the method increases the percent of Vβ17$^+$CD8$^+$ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

A12. The method of any one of embodiments A1 to A11, wherein the method further comprises isolating Vβ17$^+$CD8$^+$ T cells from the population of the cells after contacting the population of cells with the M1 peptide and/or IL-2.

In another set of embodiments (embodiment set B), provided are:

B1. An isolated population of Vβ17$^+$CD8$^+$ T cells produced by a method comprising contacting a M1 peptide derived from human influenza A virus (M1$_{58-66}$) with a population of cells comprising T cells.

B2. The isolated population of Vβ17$^+$CD8$^+$ T cells of embodiment B1, wherein the M1 peptide comprises an amino acid sequence of GILGFVFTL (SEQ ID NO:1).

B3. The isolated population of Vβ17$^+$CD8$^+$ T cells of embodiment B1 or B2, wherein the method further comprises contacting IL-2 with the population of the cells comprising the T cells.

B4. The isolated population of Vβ17$^+$CD8$^+$ T cells of any one of embodiments B1 to B3, wherein the population of the cells is cultured ex vivo in a medium comprising the M1 peptide and/or IL-2.

B5. The isolated population of Vβ17$^+$CD8$^+$ T cells of embodiment B3, wherein the method comprises:

(i) culturing the population of the cells ex vivo in a medium comprising the M1 peptide and IL-2;

(ii) culturing the population of the cells ex vivo in a medium comprising the M1 peptide, and then culturing the population of the cells ex vivo in a medium comprising IL-2; or (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

B6. The isolated population of Vβ17$^+$CD8$^+$ T cells of embodiment B4 or B5, wherein the population of the cells is cultured ex vivo for at least 1, 2, 3, 4, 5, 6, 7, 8, 9, 10, 11, 12, 13, or 14 days.

B7. The isolated population of Vβ17$^+$CD8$^+$ T cells of embodiment B4 or B5, wherein the population of the cells is cultured ex vivo for 1-20, 2-18, 3-16, 4-14, 5-14, 6-14, 7-14, 8-14, 9-14, 10-14, 11-14, or 12-14 days.

B8. The isolated population of Vβ17$^+$CD8$^+$ T cells of any one of embodiments B1 to B7, wherein the population of the cells is a population of whole peripheral blood mononuclear cells (PBMCs).

B9. The isolated population of Vβ17$^+$CD8$^+$ T cells of embodiment B8, wherein the population of the whole PBMCs is from a healthy donor.

B10. The isolated population of Vβ17$^+$CD8$^+$ T cells of any one of embodiments B1 to B9, wherein the method increases the percent of the Vβ17$^+$CD8$^+$ T cells in the CD8+ cells from the population of the cells by at least 10%, 20%, 30%, 40%, 50%, 60%, 70%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17⁺CD8⁺ T cells in the CD8+ cells; or wherein the method increases the percent of Vβ17⁺CD8⁺ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

B11. The isolated population of Vβ17⁺CD8⁺ T cells of any one of embodiments B1 to B9, wherein the method increases the percent of the Vβ17⁺CD8⁺ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17⁺CD8⁺ T cells in the CD8+ cells; or wherein the method increases the percent of Vβ17⁺CD8⁺ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

B12. The isolated population of Vβ17⁺CD8⁺ T cells of any one of embodiments B1 to B11, wherein the method further comprises isolating Vβ17⁺CD8⁺ T cells from the population of the cells after contacting the population of cells with the M1 peptide and/or IL-2.

B13. An isolated population of cells, wherein the percent of Vβ17⁺CD8⁺ T cells in the isolated population of the cells is more than 6%, 10%, 15%, 20%, 25%, 30%, 35%, 40%, 45%, 50%, 55%, 60%, 65%, 70%, 75%, 80%, 85%, or 90% of the isolated population of the cells.

B14. An isolated population of cells, wherein the percent of Vβ17⁺CD8⁺ T cells in the isolated population of the cells is 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the isolated population of the cells.

B15. The isolated population of cells of embodiment B13 or B14, wherein at least part of the Vβ17⁺CD8⁺ T cells express a cell surface receptor capable of binding to the M1 peptide.

In another set of embodiments (embodiment set C), provided are:

C1. A method for making a CAR-T cell, comprising: (i) obtaining a population of cells comprising Vβ17⁺CD8⁺ T cells; and (ii) introducing a nucleic acid encoding a chimeric antigen receptor (CAR) into the Vβ17⁺CD8⁺ T cells.

C2. The method of embodiment C1, wherein the step (i) in the method comprises activating or enriching Vβ17⁺CD8⁺ T cells by contacting a M1 peptide with a population of cells comprising T cells.

C3. The method of embodiment C2, wherein the M1 peptide comprises an amino acid sequence of SEQ ID NO:1.

C4. The method of embodiment C2 or C3, further comprises contacting IL-2 with the population of the cells comprising the T cells.

C5. The method of any one of embodiments C2 to C4, wherein the population of the cells is cultured ex vivo in a medium comprising the M1 peptide and/or IL-2.

C6. The method of embodiment C4, wherein the method comprises:

(i) culturing the population of the cells ex vivo in a medium comprising the M1 peptide and IL-2;

(ii) culturing the population of the cells ex vivo in a medium comprising the M1 peptide, and then culturing the population of the cells ex vivo in a medium comprising IL-2; or (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

C7. The method of embodiment C5 or C6, wherein the population of the cells is cultured ex vivo for at least 1, 2, 3, 4, 5, 6, 7, 8, 9, 10, 11, 12, 13, or 14 days.

C8. The method of embodiment C5 or C6, wherein the population of the cells is cultured ex vivo for 1-20, 2-18, 3-16, 4-14, 5-14, 6-14, 7-14, 8-14, 9-14, 10-14, 11-14, or 12-14 days.

C9. The method of any one of embodiments C2 to C8, wherein the population of the cells is a population of whole PBMCs.

C10. The method of embodiment C9, wherein the population of the whole PBMCs is from a healthy donor.

C11. The method of any one of embodiments C2 to C10, wherein the method increases the percent of the Vβ17⁺CD8⁺ T cells in the CD8+ cells from the population of the cells by at least 10%, 20%, 30%, 40%, 50%, 60%, 70%, 80%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17⁺CD8⁺ T cells in the CD8+ cells; or wherein the method increases the percent of Vβ17⁺CD8⁺ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

C12. The method of any one of embodiments C2 to C10, wherein the method increases the percent of the Vβ17⁺CD8⁺ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17⁺CD8⁺ T cells in the CD8+ cells; or wherein the method increases the percent of Vβ17⁺CD8⁺ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

C13. The method of any one of embodiments C2 to C12, wherein the method further comprises isolating Vβ17⁺CD8⁺ T cells from the population of the cells after contacting the population of cells with the M1 peptide and/or IL-2.

C14. The method of any one of embodiments C1 to C13, wherein the population of cells comprising the Vβ17⁺CD8⁺ T cells comprises more than 6%, 10%, 15%, 20%, 25%, 30%, 35%, 40%, 45%, 50%, 55%, 60%, 65%, 70%, 75%, 80%, 85%, or 90% Vβ17⁺CD8⁺ T cells of the isolated population of the cells.

C15. The method of any one of embodiments C1 to C13, wherein the population of cells comprising the Vβ17⁺CD8⁺ T cells comprises 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% Vβ17$^+$CD8$^+$ T cells of the isolated population of the cells.

C16. The method of any one of embodiments C1 to C15, wherein the CAR comprises an extracellular domain, a transmembrane domain, and an intracellular domain.

C17. The method of embodiment C16, wherein the extracellular domain binds to an antigen expressed on a cancer cell.

C18. The method of embodiment C17, wherein the cancer cell is a blood cancer cell or a solid tumor cancer cell.

C19. The method of embodiment C17, wherein the antigen is CD123.

C20. The method of embodiment C17, wherein the antigen is PSMA.

In another set of embodiments (embodiment set D), provided are:

D1. A CAR-T cell produced by a method comprising: (i) obtaining a population of cells comprising Vβ17$^+$CD8$^+$ T cells; and (ii) introducing a nucleic acid encoding a chimeric antigen receptor (CAR) into the Vβ17$^+$CD8$^+$ T cells.

D2. The CAR-T cell of embodiment D1, wherein the step (i) in the method comprises activating or enriching Vβ17$^+$CD8$^+$ T cells by contacting a M1 peptide with a population of cells comprising T cells.

D3. The CAR-T cell of embodiment D2, wherein the M1 peptide comprises an amino acid sequence of SEQ ID NO:1.

D4. The CAR-T cell of embodiment D2 or D3, further comprises contacting IL-2 with the population of the cells comprising the T cells.

D5. The CAR-T cell of any one of embodiments D2 to D4, wherein the population of the cells is cultured ex vivo in a medium comprising the M1 peptide and/or IL-2.

D6. The CAR-T cell of embodiment D4, wherein the method comprises:

(i) culturing the population of the cells ex vivo in a medium comprising the M1 peptide and IL-2;

(ii) culturing the population of the cells ex vivo in a medium comprising the M1 peptide, and then culturing the population of the cells ex vivo in a medium comprising IL-2; or (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

D7. The CAR-T cell of embodiment D5 or D6, wherein the population of the cells is cultured ex vivo for at least 1, 2, 3, 4, 5, 6, 7, 8, 9, 10, 11, 12, 13, or 14 days.

D8. The CAR-T cell of embodiment D5 or D6, wherein the population of the cells is cultured ex vivo for 1-20, 2-18, 3-16, 4-14, 5-14, 6-14, 7-14, 8-14, 9-14, 10-14, 11-14, or 12-14 days.

D9. The CAR-T cell of any one of embodiments D2 to D8, wherein the population of the cells is a population of whole PBMCs.

D10. The CAR-T cell of embodiment D9, wherein the population of the whole PBMCs is from a healthy donor.

D11. The CAR-T cell of any one of embodiments D2 to D10, wherein the method increases the percent of the Vβ17$^+$CD8$^+$ T cells in the CD8+ cells from the population of the cells by at least 10%, 20%, 30%, 40%, 50%, 60%, 70%, 80%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17$^+$CD8$^+$ T cells in the CD8+ cells; or wherein the method increases the percent of Vβ17$^+$CD8$^+$ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

D12. The CAR-T cell of any one of embodiments D2 to D10, wherein the method increases the percent of the Vβ17$^+$CD8$^+$ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17$^+$CD8$^+$ T cells in the CD8+ cells; or wherein the method increases the percent of Vβ17$^+$CD8$^+$ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

D13. The CAR-T cell of any one of embodiments D2 to D12, wherein the method further comprises isolating Vβ17$^+$CD8$^+$ T cells from the population of the cells after contacting the population of cells with the M1 peptide and/or IL-2.

D14. The CAR-T cell of any one of embodiments D1 to D13, wherein the population of cells comprising the Vβ17$^+$CD8$^+$ T cells comprises more than 6%, 10%, 15%, 20%, 25%, 30%, 35%, 40%, 45%, 50%, 55%, 60%, 65%, 70%, 75%, 80%, 85%, or 90% Vβ17$^+$CD8$^+$ T cells.

D15. The CAR-T cell of any one of embodiments D1 to D13, wherein the population of cells comprising the Vβ17$^+$CD8$^+$ T cells comprises 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% Vβ17$^+$CD8$^+$ T cells.

D16. The CAR-T cell of any one of embodiments D1 to D15, wherein the CAR comprises an extracellular domain, a transmembrane domain, and an intracellular domain.

D17. The CAR-T cell of embodiment D16, wherein the extracellular domain binds to an antigen expressed on a cancer cell.

D18. The CAR-T cell of embodiment D17, wherein the cancer cell is a blood cancer cell or a solid tumor cancer cell.

D19. The CAR-T cell of embodiment D17, wherein the antigen is CD123.

D20. The CAR-T cell of embodiment D17, wherein the antigen is PSMA.

D21. A CAR-T cell comprises a CAR comprising an extracellular domain, a transmembrane domain, and an intracellular domain, wherein the CAR-T cell is a Vβ17$^+$CD8$^+$ T cell.

D22. The CAR-T cell of embodiment D21, wherein the CAR-T cell expresses a cell surface receptor capable of binding to a M1 peptide comprising an amino acid sequence of SEQ ID NO:1.

D23. The CAR-T cell of embodiment D21 or D22, wherein the extracellular domain binds to an antigen expressed on a cancer cell.

D24. The CAR-T cell of embodiment D23, wherein the cancer cell is a blood cancer cell or a solid tumor cancer cell.

D25. The CAR-T cell of embodiment D23, wherein the antigen is CD123 or PSMA.

In yet another set of embodiments (embodiment set E), provided are:

E1. A method for treating a disease or disorder in a subject comprising administering to the subject a therapeutically effective amount of a CAR-T cell, wherein the CAR-T cell is produced by a method comprising: (i) obtaining a population of cells comprising Vβ17⁺CD8⁺ T cells; and (ii) introducing a nucleic acid encoding a chimeric antigen receptor (CAR) into the Vβ17⁺CD8⁺ T cells.

E2. The method of embodiment E1, wherein the step (i) in the method for producing the CAR-T cell comprises activating or enriching Vβ17⁺CD8⁺ T cells by contacting a M1 peptide with a population of cells comprising T cells.

E3. The method of embodiment E2, wherein the M1 peptide comprises an amino acid sequence of SEQ ID NO:1.

E4. The method of embodiment E2 or E3, wherein the method for producing the CAR-T cell further comprises contacting IL-2 with the population of the cells comprising the T cells.

E5. The method of any one of embodiments E2 to E4, wherein the population of the cells is cultured ex vivo in a medium comprising the M1 peptide and/or IL-2.

E6. The method of embodiment E4, wherein the method for producing the CAR-T cell comprises:
(i) culturing the population of the cells ex vivo in a medium comprising the M1 peptide and IL-2;
(ii) culturing the population of the cells ex vivo in a medium comprising the M1 peptide, and then culturing the population of the cells ex vivo in a medium comprising IL-2; or
(iii) culturing the population of the cells ex vivo in a medium comprising the M1 peptide, then culturing a population of the cells ex vivo in a medium comprising the M1 peptide and IL-2; and then culturing the population of the cells ex vivo in a medium comprising IL-2.

E7. The method of embodiment E5 or E6, wherein the population of the cells is cultured ex vivo for at least 1, 2, 3, 4, 5, 6, 7, 8, 9, 10, 11, 12, 13, or 14 days.

E8. The method of embodiment E5 or E6, wherein the population of the cells is cultured ex vivo for 1-20, 2-18, 3-16, 4-14, 5-14, 6-14, 7-14, 8-14, 9-14, 10-14, 11-14, or 12-14 days.

E9. The method of any one of embodiments E2 to E8, wherein the population of the cells is a population of whole PBMCs.

E10. The method of embodiment E9, wherein the population of the whole PBMCs is from a healthy donor.

E11. The method of any one of embodiments E2 to E10, wherein the method for producing the CAR-T cell increases the percent of the Vβ17⁺CD8⁺ T cells in the CD8+ cells from the population of the cells by at least 10%, 20%, 30%, 40%, 50%, 60%, 70%, 80%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17⁺CD8⁺ T cells in the CD8+ cells; or wherein the method for producing the CAR-T cell increases the percent of Vβ17⁺CD8⁺ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

E12. The method of any one of embodiments E2 to E10, wherein the method for producing the CAR-T cell increases the percent of the Vβ17⁺CD8⁺ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17⁺CD8⁺ T cells in the CD8+ cells; or wherein the method for producing the CAR-T cell increases the percent of Vβ17⁺CD8⁺ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

E13. The method of any one of embodiments E2 to E12, wherein the method for producing the CAR-T cell further comprises isolating Vβ17⁺CD8⁺ T cells from the population of the cells after contacting the population of cells with the M1 peptide and/or IL-2.

E14. The method of any one of embodiments E1 to E13, wherein the population of cells comprising the Vβ17⁺CD8⁺ T cells comprises more than 6%, 10%, 15%, 20%, 25%, 30%, 35%, 40%, 45%, 50%, 55%, 60%, 65%, 70%, 75%, 80%, 85%, or 90% Vβ17⁺CD8⁺ T cells.

E15. The method of any one of embodiments E1 to E13, wherein the population of cells comprising the Vβ17⁺CD8⁺ T cells comprises 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% Vβ17⁺CD8⁺ T cells.

E16. The method of any one of embodiments E1 to E15, wherein the CAR comprises an extracellular domain, a transmembrane domain, and an intracellular domain.

E17. The method of embodiment E16, wherein the extracellular domain binds to an antigen expressed on a cancer cell.

E18. The method of embodiment E17, wherein the cancer cell is a blood cancer cell or a solid tumor cancer cell.

E19. The method of embodiment E17, wherein the antigen is CD123.

E20. The method of embodiment E17, wherein the antigen is PSMA.

E21. A method for treating a disease or disorder in a subject comprising administering to the subject a therapeutically effective amount of a CAR-T cell, wherein the CAR-T cell comprises a CAR comprising an extracellular domain, a transmembrane domain, and an intracellular domain, and wherein the CAR-T cell is a Vβ17⁺CD8⁺ T cell.

E22. The method of embodiment E21, wherein the CAR-T cell expresses a cell surface receptor capable of binding to a M1 peptide comprising an amino acid sequence of SEQ ID NO:1.

E23. The method of embodiment E21 or E22, wherein the extracellular domain binds to an antigen expressed on a cancer cell.

E24. The method of embodiment E23, wherein the cancer cell is a blood cancer cell or a solid tumor cancer cell.

E25. The method of embodiment E23, wherein the antigen is CD123 or PSMA.

E26. The method of any one of embodiments E1 to E25, wherein the disease or disorder is cancer.

E27. The method of embodiment E26, wherein the cancer is blood cancer.

E28. The method of embodiment E26, wherein the cancer is solid tumor cancer.

E29. The method of any one of embodiments E1 to E28, wherein the subject is a human subject in need thereof.

In yet another set of embodiments (embodiment set F), provided are:

F1. A process for making a CAR-T cell, comprising: (i) a step of performing a function of obtaining a Vβ17$^+$CD8$^+$ T cell; and (ii) a step of performing a function of expressing a CAR in the Vβ17$^+$CD8$^+$ T cell.

F2. The process of embodiment F1, wherein the step (i) in the process comprises a step of performing a function of activating or enriching Vβ17$^+$CD8$^+$ T cells in a population of cells comprising T cells.

F3. The process of embodiment F2, wherein the step of performing the function of activating or enriching Vβ17$^+$CD8$^+$ T cells in the population of the cells comprising the T cells comprises contacting a M1 peptide with the population of the cells comprising the T cells, and wherein the M1 peptide comprises an amino acid sequence of SEQ ID NO:1.

F4. The process of embodiment F3, further comprises contacting IL-2 with the population of the cells comprising the T cells.

F5. The process of embodiment F3 or F4, wherein the population of the cells is cultured ex vivo in a medium comprising the M1 peptide and/or IL-2.

F6. The process of embodiment F4, wherein the process comprises:
  (i) culturing the population of the cells ex vivo in a medium comprising the M1 peptide and IL-2;
  (ii) culturing the population of the cells ex vivo in a medium comprising the M1 peptide, and then culturing the population of the cells ex vivo in a medium comprising IL-2; or
  (iii) culturing the population of the cells ex vivo in a medium comprising the M1 peptide, then culturing the population of the cells ex vivo in a medium comprising the M1 peptide and IL-2; and then culturing the population of the cells ex vivo in a medium comprising IL-2.

F7. The process of embodiment F5 or F6, wherein the population of the cells is cultured ex vivo for at least 1, 2, 3, 4, 5, 6, 7, 8, 9, 10, 11, 12, 13, or 14 days.

F8. The process of embodiment F5 or F6, wherein the population of the cells is cultured ex vivo for 1-20, 2-18, 3-16, 4-14, 5-14, 6-14, 7-14, 8-14, 9-14, 10-14, 11-14, or 12-14 days.

F9. The process of any one of embodiments F2 to F8, wherein the population of the cells is a population of whole PBMCs.

F10. The process of embodiment F9, wherein the population of the whole PBMCs is from a healthy donor.

F11. The process of any one of embodiments F2 to F10, wherein the process increases the percent of the Vβ17$^+$CD8$^+$ T cells in the CD8+ cells from the population of the cells by at least 10%, 20%, 30%, 40%, 50%, 60%, 70%, 80%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold of the initial percent of the Vβ17$^+$CD8$^+$ T cells in the CD8+ cells; or wherein the process increases the percent of Vβ17$^+$CD8$^+$ T cells in the CD8+ cells from the population of the cells to at least 6%, 10%, 15%, 20%, 25%, 30%, 35%, 40%, 45%, 50%, 55%, 60%, 65%, 70%, 75%, 80%, 85%, or 90% of the CD8+ cells.

F12. The process of any one of embodiments F2 to F10, wherein the process increases the percent of the Vβ17$^+$CD8$^+$ T cells in the CD8+ cells from the population of the cells by 10% to 20 fold, by 20% to 20 fold, by 30% to 20 fold, by 40% to 20 fold, by 50% to 20 fold, by 60% to 20 fold, by 70% to 20 fold, by 80% to 20 fold, by 90% to 20 fold, by 2 to 20 fold, by 3 to 20 fold, by 4 to 20 fold, by 5 to 20 fold, by 6 to 20 fold, by 7 to 20 fold, by 8 to 20 fold, by 9 to 20 fold, by 10 to 20 fold, by 11 to 20 fold, by 12 to 20 fold, by 13 to 20 fold, by 14 to 20 fold, or by 15 to 20 fold of the initial percent of the Vβ17$^+$CD8$^+$ T cells in the CD8+ cells; or wherein the process increases the percent of Vβ17$^+$CD8$^+$ T cells in the CD8+ cells from the population of the cells to 6% to 99%, 10% to 99%, 15% to 99%, 20% to 99%, 25% to 99%, 30% to 99%, 35% to 99%, 40% to 99%, 45% to 99%, 50% to 99%, 55% to 99%, 60% to 99%, 65% to 99%, 70% to 99%, 75% to 99%, 80% to 99%, 85% to 99%, or 90% to 99% of the CD8+ cells.

F13. The process of any one of embodiments F2 to F12, wherein the process further comprises isolating Vβ17$^+$CD8$^+$ T cells from the population of the cells after contacting the population of cells with the M1 peptide and/or IL-2.

F14. The process of any one of embodiments F1 to F13, wherein the step of performing the function of expressing the CAR in the Vβ17$^+$CD8$^+$ T cell comprises introducing a nucleic acid encoding the CAR into the Vβ17$^+$CD8$^+$ T cell.

In yet another set of embodiments (embodiment set G), provided are:

G1. A system comprising a first means capable of binding an antigen on the surface of a cancer cell; and a second means capable of reducing alloreactivity against a donor T cell.

G2. The system of embodiment G1, wherein the first means capable of binding an antigen on the surface of a cancer cell comprises a CAR comprising an extracellular domain, a transmembrane domain, and an intracellular domain.

G3. The system of embodiment G2, wherein the extracellular domain binds to an antigen expressed on a cancer cell.

G4. The system of embodiment G3, wherein the cancer cell is a blood cancer cell or a solid tumor cancer cell.

G5. The system of embodiment G3, wherein the antigen is CD123.

G6. The system of embodiment G3, wherein the antigen is PSMA.

G7. The system of any one of embodiments G1 to G6, wherein the second means capable of reducing alloreactivity against the donor T cell comprises a Vβ17$^+$CD8$^+$ T cell.

G8. A T cell comprising a first means capable of binding an antigen on the surface of a cancer cell and a second means capable of binding a M1 peptide comprising an amino acid sequence of SEQ ID NO:1.

G9. The T cell of embodiment G8, wherein the T cell is a Vβ17$^+$CD8$^+$ T cell.

G10. The T cell of embodiment G8 or G9, wherein the first means capable of binding an antigen on the surface of a cancer cell comprises a CAR comprising an extracellular domain, a transmembrane domain, and an intracellular domain.

G11. The T cell of embodiment G10, wherein the extracellular domain binds to an antigen expressed on a cancer cell.

G12. The T cell of embodiment G11, wherein the cancer cell is a blood cancer cell or a solid tumor cancer cell.

G13. The T cell of embodiment G12, wherein the antigen is CD123.

G14. The T cell of embodiment G12, wherein the antigen is PSMA.

G15. The T cell of any one of embodiments G8 to G14, wherein the second means capable of binding the M1 peptide comprises a T cell receptor (TCR) capable of binding the M1 peptide.

7. EXAMPLES

The following is a description of various methods and materials used in the studies, and are put forth so as to provide those of ordinary skill in the art with a complete disclosure and description of how to make and use the present disclosure, and are not intended to limit the scope of what the inventors regard as their disclosure nor are they intended to represent that the experiments below were performed and are all of the experiments that may be performed. It is to be understood that exemplary descriptions written in the present tense were not necessarily performed, but rather that the descriptions can be performed to generate the data and the like associated with the teachings of the present disclosure. Efforts have been made to ensure accuracy with respect to numbers used (e.g., amounts, percentages, etc.), but some experimental errors and deviations should be accounted for.

7.1. Example 1—Generation of Influenza-A Virus Specific Vβ17$^+$CD8$^+$ CAR-T Cells

7.1.1. Isolation of PBMCs from Whole Blood

PBMCs were either procured from HemaCare (HLA*0201 donors) or in-house sources (Clinigen/NH). For in-house donors, heparinized blood was procured from healthy volunteers and diluted by adding equal volumes of room temperature (RT) equilibrated plain roswell park memorial institute medium (RPMI medium) (RPMI and 1% Pen/Strep (Gibco, Catalog No. 15070-063, lot No. 2108965)). 30 ml of diluted blood was carefully layered onto 15 mL of Lymphoprep™ in a 50 mL falcon tube using a steripette. Care was taken to prevent gradient disturbance while layering the blood onto Lymphoprep™. The 50 mL falcon tube was centrifuged at 450×g at RT without any breaks (acceleration and deceleration of the centrifuge was kept at zero) for 30 minutes. After centrifugation, falcon tube was carefully removed from centrifuge and upper plasma layer was discarded without disturbing plasma-buffy coat-Lymphoprep™ interface. The buffy coat from Plasma-Buffy coat-Lymphoprep™ interface was carefully transferred into a new 50 mL falcon tube containing 30 mL of room temperature equilibrated complete RPMI medium (RPMI, 10% fetal bovine serum (FBS)(Gibco, Catalog No. 10099-141, lot No. 2092575P), and 1% Pen/Strep) without disturbing erythrocyte/granulocyte pellet. The 50 mL falcon tube was centrifuged at 350×g for 10 minutes at room temperature, and supernatant was discarded. Red blood cell (RBC) lysis was performed by re-suspending the cell pellet in 1 mL of ACK lysis solution at room temperature for 5 to 8 minutes. After incubation period, RBC lysis was stopped by adding 20 mL of complete RPMI medium. The falcon tube was centrifuged again at 350×g for 10 min at room temperature. The cell pellet was washed once with 35 mL of 1× phosphate buffered saline (PBS). The tube was centrifuged at 350×g for 10 minutes at room temperature. The cell pellet was resuspended in complete RPMI medium and the cells were counted on a hemocytometer. PBMCs were either directly used for downstream applications or frozen down in freezing medium (10% dimethyl sulfoxide (DMSO) (Sigma, Catalog No. D2650, lot No. RNBG1808) and 90% FBS) at a cell density of 25×10$^6$/mL.

Prevalence of Vβ17$^+$CD8$^+$ T cells among whole PBMCs in healthy individuals were measured. To identify frequency of TCR Vβ17$^+$CD8$^+$ cells among healthy individuals, whole PBMCs were stained with anti-human TCR Vβ17, CD3 and CD8 mAbs. Flow cytometry analysis showed that a mean (±SEM) frequency of 4-5% of total CD8$^+$ T cells express TCR Vβ17 on their surface (FIG. 1) in healthy individuals.

7.1.2. M1 Peptide Mediated Activation and Expansion of Vβ17$^+$CD8$^+$ T Cells from Whole PBMCs On day 0, a vial of frozen PBMCs was quickly thawed and added to 49 mL of warm complete RPMI media (RPMI, 10% FBS, and 1× Pen/Strep) in a 50 mL falcon to dilute the freezing medium. PBMCs were centrifuged at 1500 revolutions per minute (RPM) for 5 minutes, and were washed once with the complete RPMI media. The cell pellet was re-suspended in the complete RPMI media. The cells were counted and adjusted to 2.5×10$^6$ cells/1.25 mL in the complete RPMI media.

Meanwhile, FLU MP 58 peptide was prepared. FLU MP 58 peptide (GILGFVFTL) was purchased at New England Peptide (Catalog No. BP10-405, and Lot No. 3677-33/42-2) with a purity of >95%. FLU MP 58 peptide was originally dissolved in 100% DMSO to a concentration of 10 mg/mL (1 mg in 100 μL), aliquoted and frozen at −20° C. On the experimental day, FLU MP 58 peptide was thawed from −20° C. freezer and diluted in 1 mg/mL in DMSO. FLU MP 58 peptide was first made in the complete RPMI media at a 2× concentration (2 μg/ml). Then 1.25 mL of PBMCs (2.5×10$^6$ cells) and 1.25 mL of diluted peptide (2× concentration) were added to the wells in a 6-well microplate. With the final volume per well being 2.5 mL, the final peptide concentration was 1 μg/mL, and the cell concentration was 2.5×10$^6$ cells/well. For unstimulated control, 1.25 mL of PBMCs (2.5×10$^6$ cells) and 1.25 mL of complete RPMI media were added to the wells in a 6-well microplate. With the final volume per well being 2.5 mL, the final cell count was 2.5×10$^6$ cells/well.

On day 2, recombinant human IL-2 (R&D systems, catalog No. AE-6017031, lot No. AE-6017031) was added. The specific activity of IL-2 was approximately 2.1×10$^4$ IU/μg. IL-2 was reconstituted at 100 μg/mL in sterile 100 mM Acetic Acid containing 0.1% bovine serum albumin. For working concentration, 5 μL of IL-2 stock (100m/mL) was diluted in 25 mL of the complete RPMI media (20 ng/mL). 2.5 mL of diluted IL-2 was added to the cells. Therefore, the final volume of the well was 5 mL containing 10 ng/mL (210 IU) of IL-2.

On day 5, PBMCs were collected in 50 ml falcon tubes, and were centrifuged at 1500 rpm for 5 minutes. The spent media was decanted, and the stimulated and unstimulated cells were re-suspended in IL-2 (final concentration 210 IU) containing the complete RPMI media. The cell suspension was added to a 6-well plate with 5 mL/well.

On days 8 and 10, the IL-2 replenishment was repeated as performed on day 5. On days 12 or 14, Vβ17$^+$CD8$^+$ T cell expansion was enumerated by staining the cells with anti-human CD8, CD3, and TCRVβ17 antibodies and acquired on a flow cytometer (Novocyte).

7.1.3. Enrichment of CD8$^+$ T Cells

CD8$^+$ T cell enrichment was carried out from whole PBMCs that were either stimulated or unstimulated with M1 peptide using EasySep™ human CD8$^+$ T cells enrichment kit (negative selection), per manufacturer's instructions. Briefly, FLU MP 58 peptide stimulated PBMCs from day 12 or 14 of culture were collected. For unstimulated PBMCs, fresh PBMCs were collected by quickly thawing the frozen PBMCs and added to 49 mL of warm complete RPMI (RPMI, 10% FBS, and 1× Pen/Strep) medium in a 50 mL falcon tube to dilute the freezing medium.

The above cells were centrifuged at 1500 rpm for 5 minutes at room temperature, and washed once with FACS buffer (1×PBS and 2% FBS). The cells were resuspended in EasySep™ buffer (Stemcell Technologies, Catalog No. 20144, and Lot No. 18D89444) at 5×10$^7$ cells/mL (in a volume of 0.25-2 mL). The cells were transferred to a 5 mL polystyrene round bottom tube. Fifty microlitres of enrichment cocktail was added per one mL (5×10⁷ cells) of resuspended cells. The cocktail was mixed and incubated with the cells at room temperature for 10 minutes. Meanwhile, magnetic particles were vortexed for 30 seconds. 150 µL of vortexed magnetic particles were added to one mL of resuspended cells from the above step. Incubation lasted for 5 minutes after mixing at RT. At the end of the incubation period, the tube was toped up with 2.5 mL of EasySep™ buffer. The tube was placed on standstill magnet for 5 minutes at RT. At the end of the incubation period, the tube was reverted with magnet in one continuous motion to collect the enriched cell suspension. Collected cell suspension was spun down at 1500 rpm for 5 minutes at room temperature. The cell pellet was re-suspended in cell culture medium and counted the cell number on a haemocytometer. For assessing the purity of CD8⁺ T cells, enriched cell suspension was stained with anti-human CD8 (BioLegend, Catalog No. 344724, and lot No. B242233) and CD3 mAbs.

7.1.4. Enrichment of Vβ17⁺ Cells

Vβ17⁺ cells were positively selected from negatively enriched CD8⁺ T cells (as described in Section 7.1.3) from either M1 peptide activated and expanded PBMCs or unstimulated PMBCs using EasySep™ Release Human Biotin Positive Selection Kit (Stem Cell Technologies, Catalog No. 17653A, and Lot No. 1000014862), per the manufacturer's instructions with slight modifications.

Briefly, enriched CD8⁺ T cells were collected and centrifuged at 1500 rpm for 5 minutes at room temperature. The cell concentration was adjusted to 1×10⁸ cells/mL in EasySep™ buffer (0.25-2 mL). Fc receptor blocker (100 µL/mL) was added to block the unspecific binding of antibodies via Fc receptors. Fc-receptor-blocked cells were further Incubated with anti-human Vβ17 biotin mAb (Miltenyi Biotec, Catalog No. 130-115-246, and Lot No. 5180806646) at RT for 15 minutes in the dark. For 30 million CD8⁺ T cells, 30 µ, of Fc block and 30 µ, of anti-human Vβ17 antibody were used. 5 mL polypropylene tubes were used.

At the end of the incubation period, tubes were toped up with 2 mL of EasySep™ buffer. Cells were spun down at 1500 rpm for 5 minutes at RT. The cell pellet was resuspended in EasySep™ buffer and the cell suspension was transferred into a new 5 mL polypropylene tube. To the resuspended cells, EasySep™ Release Biotin positive selection cocktail (100 µL/mL) was added. Specifically, the positive selection cocktail was mixed with the cells by gently resuspending the cells with a pipette. The cell suspension was incubated at RT for 3 minutes. Meanwhile, releasable RapiSpheares™ was prepare by vortexing for 30 seconds. Releasable RapidSpheares™ (100 µl/mL) were added to the resuspended cells. The sample was mixed and incubated at RT for 3 minutes. At the end of the incubation period, the tube was toped up with 2.5 mL EasySep™ buffer, and placed in a stand still magnet for incubation at RT for 10 min. The entire supernatant was carefully collected all at once using a pipette, without being poured off. The washings were repeated for two more times with 2.5 mL of EasySep™ buffer by pipetting cells up and down gently using a pipette. The cells were resuspended in 0.25-2 ml of EasySep™ buffer. During the resuspension, the cells were collected off the sides of the tube, and mixed by gently pipetting up and down 2 to 3 times. 1× release buffer (100 µL/mL) was added to the resuspended cells, followed by mixing and incubation at RT for 3 min. The tube was topped up with 2.5 mL of EasySep™ Buffer, and the cells were mixed by gently pipetting up and down 2-3 times. The tube was placed in a stand still magnet and incubated at RT for 5 min. The cell enriched population was carefully pipetted into a new tube without disturbing the RapidSpheares™ attached to the walls. The cells were spun down at 1500 rpm for 5 min at RT. The cell suspension was resuspended in cell culture medium and counted on haemocytometer. For assessing the purity of Vβ17⁺ T cells, enriched cell suspension was stained with anti-human CD8 and Vβ17 mAbs. As a control for labelling efficiency of biotinylated Vβ17 mAbs, the negative fraction from after the incubation of Releasable RapidSpheares™ but before incubation of release buffer was collected and the abundance of Vβ17⁺ assessed.

Among the enriched CD8⁺ T cells, Vβ17⁺ cells were accounted for approximately 30-50% (FIG. 2A, left). From enriched CD8⁺ T cells, Vβ17⁺ cells were positively selected and enriched as evident by the enriched Vβ17⁺ cells in the positive fraction (FIG. 2A, middle) and residual Vβ17⁺ cells in the negative fraction (FIG. 2A, right). Therefore, Vβ17⁺ cells were successfully enriched in the positive fraction compared to the negative fraction.

7.1.5. Activation of Enriched Vβ17⁺CD8⁺ T Cells

Isolated Vβ17+CD8+ T cells from the above sections were activated using Human T-Activator CD3/CD28 Dynabeads™ per manufacturer instructions. Dynabeads™ were washed by resuspending the desired bead volume into excess volume of DPBS (Gibco, catalog No. 14190-136, lot No. 1929973), preferably 1 mL, in a 5 mL polystyrene tube. The Dynabeads™ were vortexed for 5 seconds and docked onto a magnetic stand for 1-2 min. The supernatant was discarded while the tube was on the magnet stand. Dynabeads™ were washed by resuspending the desired bead volume into excess volume of complete culture medium (RPMI, 10% FBS, and 1× Pen/Strep) (preferably 1 mL) in a 5 mL polystyrene tube. The Dynabeads™ were vortexed for 5 seconds and docked onto a magnetic stand for 1-2 min. The supernatant was discarded while the tube was on the magnet stand. The beads were resuspended in culture medium (RPMI, 10% FBS, and 1× Pen/Strep).

For 1×10⁶ of enriched Vβ17⁺CD8⁺ T cells, 25 µL of washed Human T-Activator CD3/CD28 Dynabeads™ were added to get a cell to bead ratio of 1:1. 30 IU/mL of recombinant human IL-2 was added to the culture. The above solution was incubated in a humidified $CO_2$ incubator at 37° C. for 4 days. At the end of the incubation period, Vβ17⁺CD8⁺ T cells were recovered from 24-well plate and washed once with DPBS.

The cell suspension in DPBS was transferred into a 5 mL round bottom polystyrene tube. Beads were removed from the cell suspension by incubating the tube on a stand still magnet for 5 minutes at RT. Supernatant was carefully collected with a pipette while the tube was on the magnet. The supernatant was spun down. The cell pellet was washed once with the complete culture medium (RPMI, 10% FBS, and 1× Pen/Strep). Cells were counted on haemocytometer. Activation status of Vβ17⁺CD8⁺ T cells was assessed by measuring their surface expression of CD69 (Alexa 647 Anti Human CD69, BioLegend, Catalog No. 310918, and Lot No. B246313), CD25, and CD62L.

7.1.6. Vβ17⁺CD8⁺ T Cells are Influenza-A Virus Specific and can be Activated and Expanded Ex-Vivo Surface phenotype profiling was performed as following. Fresh or cultured PBMCs were harvested and washed once with FACS buffer (PBS and 2% FBS). The cells were counted using hemocytometer. The cells were spun down at 1500 rpm for 5 min. The cell pellet was washed once with 2004, of FACS buffer (PBS and 2% FBS). Cells (1-2×10⁶ cells/mL) were incubated in a 96-well V-bottom plate in 1004, of PBS containing both Live/Dead fixable violet dead cell stain (0.1 μL) (Thermofisher Scientific, Catalog No. L34955, and Lot No. 1910686) and Human Trustain Fc block (5 μL) (BioLegend, Catalog No. 422302, and Lot No. B247182) at 4° C. for 30 min in the dark.

After incubation, cells were spun down at 1500 rpm for 5 min, and washed once with 2004, of FACS buffer (PBS and 2% FBS). Cells were stained by incubating in 1004, of FACS buffer containing antibodies master mix at 4° C. for 30 min. After incubation period, cells were spun down at 1500 rpm for 5 min, washed twice with 2004, of FACS buffer, and re-suspended in 1004, of FACS buffer. The cells were acquired on Novocyte flow cytometer.

Intracellular effector molecule profiling was performed after the surface phenotype profiling. The surface stained cells were fixed by re-suspending the cell pellet in 1004, of BD Cytofix/Cytoperm buffer (BD biosciences, Catalog No. 554722, and Lot No. 7156885). The cell suspension was incubated at 4° C. for 15 min in the dark. After incubation period, cells were spun down at 1500 rpm for 5 min. The supernatant was discarded, and the cells were washed by re-suspending the cell pellet in 2004, of 1×BD Perm/Wash (BD biosciences, Catalog No. 554723, and Lot No. 7180888). The cells were spun down at 1500 rpm for 5 min. The supernatant was discarded and the cell pellet was re-suspended in 1004, of 1× Perm/Wash containing antibodies against intracellular antigens, such as Granzyme B (APC Anti-Human Granzyme B, BioLegend, catalog No. 372204, and lot No. B248651) and Perforin (Brilliant Violet 711 Anti Human Perforin, BioLegend, catalog No. 308130, and lot No. B242465). The cell suspension was incubated at 4° C. for 30 min in the dark.

After the incubation period, the cells were spun down at 1500 rpm for 5 min. The cells were washed by adding 1504, of 1×BD Perm/Wash, then were re-washed one more time by re-suspending the cell pellet in 2004, of 1×BD Perm/Wash. The cells were spun down at 1500 rpm for 5 min. The supernatant was discarded and the cell pellet was re-suspended in 1004, of FACS buffer (PBS and 2% FBS). The cells were acquired on Novocyte flow cytometer.

To identify whether Vβ17⁺CD8⁺ T cells are influenza-A virus specific or not, whole PBMCs from HLA*0201 healthy individuals were stimulated with Influenza A-derived M1 (58-66) peptide and assessed the activation and abundance of Vβ17⁺ cells. M1 peptide-based stimulation activated Vβ17⁺CD8⁺ T cells, as evident by their activation status (surface expression of CD25, CD69 and CD71) and effector profile (intracellular Granzyme B, Perforin and CD107a) on day 8 of the culture (FIG. 2B). Likewise, abundance of Vβ17⁺ cells among total CD8⁺ T cells substantially increased on day 14, compared to day 0 of the culture period (FIG. 2C). IL-2 stimulation alone, on the other hand, resulted in neither activation nor expansion of Vβ17⁺CD8⁺ T cells (FIG. 2B and FIG. 2C). Further, Influenza A derived Matrix protein (M1) peptide loaded MEW class I tetramers (MBL, Catalog No. TS-0012-2C, and Lot No. 004) were detected virtually in all of Vβ17⁺CD8⁺ T cells (about 86%) that were expanded, reaffirming that these cells are indeed influenza-A specific and express cell surface receptors for M1 peptide (FIG. 2D).

7.1.7. Electroporation of Anti-TAA CAR mRNA into Activated Vβ17⁺CD8⁺ T Cells Vβ17⁺CD8⁺ T cells were isolated from either M1 peptide stimulated or unstimulated PBMCs, as described above. In case of unstimulated PBMCs, enriched Vβ17⁺CD8⁺ T cells were activated as described in Section 7.1.5.

The cells were spun down at 1500 rpm for 5 min. Cell pellet was re-suspended very gently with buffer T (1×10⁶ cells/90 μL of buffer T) from Neon transfection kit (Thermo Fisher Scientific, Catalog No. MPK1096, and Lot No. 2K11311). Ten microliters (10 μg) of GFP/anti-tumor associated antigen CAR mRNA (mRNA concentration of about 1 μg/μL) was added to the cell suspension. The cell suspension was gently mixed by pipetting the cell suspension up and down for two times. The Neon Tip (1004, tip) was prepared by taking it from the Neon tip box with a Neon pipette and gently pressed up and down to remove any air that was trapped in. 1004, of cell suspension (904, of cell suspension with 104, of mRNA) was taken slowly into the Neon tip. Care was taken to make sure that there was no air bubble(s) entering the tip. Meanwhile, 3.5 mL of electrolyte buffer (buffer E) was added to the Neon tube. The Neon tip containing the cell suspension was slowly placed into the Neon Tube containing electrolyte buffer. Neon tube (containing the Neon tip) was placed into Neon docking station.

Electroporation was performed at 1400V, 20 ms pulse width and 1 pulse. Immediately after electroporation, Neon tip (containing cell suspension and mRNA) was removed from Neon tube. The cells were added to a 6-well plate containing 2.5 mL of pre-warmed RPMI medium containing 10% FBS, without antibiotics. The plate was gently rocked to ensure the even distribution of the cells in the well, and was incubated at 37° C. in a humidified $CO_2$ incubator. As a non-electroporation control, 104, of mRNA GFP or empty CAR was added to 90 μL of buffer T that contains 1×10⁶ enriched Vβ17⁺CD8⁺ T cells. As an alternative control, Vβ17⁺CD8⁺ T cells were electroporated without any mRNA. Cells were added to a 6-well plate containing 2.5 mL of pre-warmed RPMI medium containing 10% FBS without antibiotics. The plate was gently rocked to ensure the even distribution of the cells in the well, and was incubated at 37° C. in a humidified $CO_2$ incubator.

Cell viability (by measuring cells negative for Live/Dead staining) and the transfection efficiency (by measuring the frequency of GFP⁺ cells) was determined by taking 100-2004, of the culture media containing the cells after overnight of resting period. GFP expression was taken as an indirect readout for CAR expression when assessing the α-CD123 CAR expression (FITC anti-human CD123 antibody, BioLegend, catalog No. 306014, lot No. B201944). For assessing α-PSMA CAR surface expression, rabbit anti Camelid antibody was used (Biolegend, Catalog No. 342506, and Lot No. B224622). Once the viability and CAR surface expression were assessed, cell were recovered from 6-well plates and counted on hemocytometer.

Specifically, two CAR constructs, anti-CD123 or anti-PSMA, were tested (see Table 2 below), and the transfection rate of Vβ17⁺CD8⁺ T cells with the CAR constructs was measured. Since there was no available reagent to detect α-CD123 CAR surface expression, GFP expression was considered as a surrogate marker for estimating the abundance of cells positive or negative for α-CD123 CAR surface expression. Accordingly, around 78% of cells were considered as positive CAR surface expression (FIG. 3 top row). For detecting α-PSMA CAR surface expression on Vβ17⁺CD8⁺ T cells, rabbit anti-camelid antibody mAb was used. Accordingly, around 68% of Vβ17+CD8+ T cells were positive for α-PSMA CAR on their surface (FIG. 3 bottom row).

TABLE 2

Sequences of Chimeric Antigen Receptor Constructs

| Names | Sequence | SEQ ID NO |
|---|---|---|
| Signal sequence | MAWVWTLLFL MAAAQSIQA | SEQ ID NO: 2 |
| scFv for Anti-CD123 CAR | EIVLTQSPAT LSLSPGERAT LSCRASQSVS SYLAWYQQKP GQAPRLLIYD ASNRATGIPA RFSGSGSGTD FTLTISSLEP EDFAVYYCQQ RSNWPLTFGQ GTKVEIKGTE GKSSGSGSES KSTEVQLLES GGGLVQPGGS LRLSCAASGF TFSGYWMHWV RQAPGKGLEW VSAIRSDGSS KYYADSVKGR FTISRDNSKN TLYLQMNSLR AEDTAVYYCA KDGVIEDTFD YWGQGTLVTV SS | SEQ ID NO: 3 |
| scFv for Anti-PSMA CAR | QVQLVESGGG LVQAGGSLRL SCVASGIILN IHAVNWNWYR QAPGKQREWV AQISSGGITT YADSVKGRFS ISRDNAKXTA YLQMNSLKPE DTALYYCYQN RSGWGTGNYW GQGTQVTVSS | SEQ ID NO: 4 |
| CD8α hinge domain | TSTPAPRPPT PAPTIASQPL SLRPEACRPA AGGAVHTRGL DFACD | SEQ ID NO: 5 |
| CD8α transmembrane domain | IYIWAPLAGT CGVLLLSLVI TLYC | SEQ ID NO: 6 |
| co-stimulatory signaling domain of CD137 | KRGRKKLLYI FKQPFMRPVQ TTQEEDGCSC RFPEEEEGGC EL | SEQ ID NO: 7 |

TABLE 2-continued

Sequences of Chimeric Antigen Receptor Constructs

| Names | Sequence | SEQ ID NO |
|---|---|---|
| intracellular signaling domain of CD3z | RVKFSRSADA PAYKQGQNQL YNELNLGRRE EYDVLDKRRG RDPEMGGKPR RKNPQEGLYN ELQKDKMAEA YSEIGMKGER RRGKGHDGLY QGLSTATKDT YDALHMQALP PR | SEQ ID NO: 8 |

7.2. Example 2—Assessing Vβ17+CD8+ CAR-T Cells Cytotoxicity 7.2.1. Preparation of Target Cells, Effector Cells, and the Co-Culture Kasumi-3 cells (ATCC, catalog No. CRL-2725, lot No. 63990133) were cultured in a solution of RPMI, 20% FBS, and 1× Pen/Strep. Cells were passaged every 3 days. Briefly, Kasumi-3 cells were collected from the flask and centrifuged at 1500 rpm for 5 minutes. Supernatant was discarded and the cells were seeded back at 0.3 to $0.5 \times 10^6$ cells and maintained in fresh medium at a cell density of 1.0 to $2.0 \times 10^6$ cells/mL.

22Rv1 cells were cultured in RPMI medium containing 10% FBS and 1× Pen/Strep. Cells were passaged every 3 days. Briefly, 75-80% confluent 22Rv1 monolayer cells were rinsed with DPBS to remove any traces of serum. Cells were detached from the flask by adding 3-5 mL of trypsin-EDTA solution (for T-75 flasks) and incubated at 37° C. for 5 to 10 minutes in a humidified incubator. After incubation period, Trypsin-EDTA solution was neutralized by adding excessive culture medium (20 mL of complete medium for a T-75 flask). Cells were collected and spun down at 1500 rpm for 5 minutes. Supernatant was discarded, and the cells were seeded back in fresh complete RPMI medium at a density of $0.1 \times 10^6$ cells/mL in a total of 15 mL of culture medium CD123 and PSMA expression were detected on target cells. Fifty thousand Kasumi-3 or 22Rv1 cells were stained in 1004, of FACS buffer (DPBS and 2% FBS). Cells were centrifuged at 1500 rpm for 5 minutes and supernatant was discarded. Anti-human CD123 or PSMA antibody was added to the cells at a concentration of 2 μg/mL in FACS buffer (1×PBS and 2% FBS) along with the respective isotype. An aliquot of the sample was left unstained. Cells were incubated at 4° C. for 30 minutes in the dark. Following incubation, cells were centrifuged at 1500 rpm for 5 minutes and washed with FACS buffer (DPBS and 2% FBS) to remove any unbound antibodies. Washing was repeated one more time, so two washes were performed.

Stained samples were fixed by re-suspending the stained cells in 1004, of BD Cytofix buffer (BD, catalog No. 554655, lot No. 7271598) for 15 minutes on ice. After incubation period, cells were washed once with the FACS buffer and re-suspended in the FACS buffer. Stained cells were acquired on a flow cytometer (Novocyte) followed by an analysis by Flow Jo (version 10.3). Gating was established using isotype and/or FMO controls.

Target cells (Kasumi-3/22Rv1) were labelled with CFSE (Thermo fisher, catalog No. C34554, lot No. 1878342). Kasumi-3/22Rv1 cells were harvested, washed once with plain RPMI medium. The cells were counted and adjusted the density to $8\times10^6$ cells/mL. The cells were re-suspended in 1 mL of 0.5 µM CFSE in 1×PBS and incubated for 8 minutes at RT with occasional mixing. One mL FBS was added to stop the labelling reaction, which later was washed twice in complete RPMI media (RPMI, 10% FBS, and 1× Pen/Strep). The cells were counted using a haemocytometer and adjusted the cell density in 1004, volume according to ET ratio. CFSE labelled target cells were seeded on the previous day or on the same day of co-culture for 22Rv1 and kasumi-3 cells respectively. To get a target ratio of one for the co-culture setup, 35,000 and 10,000 22Rv1 and Kasumi-3 cells were seeded respectively per well of a 96-well plate.

Preparation of the effector cells (Vβ17+CD8+ CAR-T Cells) was performed as following. $CD8^+$ T cells were negatively enriched either from fresh PBMCs or PBMCs stimulated with M1 peptide for 12 days as described in Section 7.1.3. Vβ17+ cells among isolated $CD8^+$ T cells were positively enriched as described in Section 7.1.4. Vβ17±CD8+ T cells purity was assessed post enrichment by staining them with anti-human CD8 and anti-human Vβ17 monoclonal antibodies by flow cytometry. Chimeric Antigen Receptor (CAR) mRNA electroporation was carried out on enriched Vβ17±CD8+ T cells with Neon electroporation system at as described in detail in Section 7.1.7. After electroporation, Vβ17±CD8+ T cells were rested for overnight. After resting period, CAR expression and viability of transfected Vβ17±CD8+ T cells (effectors) were assessed and cells were diluted appropriately to accommodate the various Effector to Target (ET) ratios in cytotoxicity experiments. For proliferation experiments, CAR transfected Vβ17±CD8+ T cells were labelled with CTV (Thermo Fischer, Catalog No. C34557, and Lot No. 1942260) by re-suspending them in 1 mL of DPBS containing 1 µM CTV and incubated for 20 minutes at 37° C. with occasional mixing. At the end of the incubation period, labelling was stopped by adding 1 mL of FBS, followed by 8 mL of complete culture medium, so the total volume is 10 mL. Cells were spun down at 1500 rpm for 5 minutes and counted on hemocytometer.

Co-culture was performed after the preparation of target and effector. CFSE labelled target cells were seeded as described above. On the day of the co-culture, culture medium was removed from target cells (in case of 22Rv1) seeded wells and replenished with fresh medium (100 µL). To the target cells, CAR positive Vβ17$^+$CD8$^+$ T cells were added in 1004, volume of complete RPMI medium to get the desired ET ratios. To normalize the differences in CAR transfection efficiency, ET ratios were normalized to $CAR^+$ cells. To this end, GFP expression was taken as a surrogate readout for α-CD123 CAR, and the surface staining mediated by rabbit anti-camelid mAb was measured for α-PSMA CAR expressing effector cells. Effector and Target cells were co-cultured at various ET ratios (after normalizing to $CAR^+$ cells) for a period of 24 hours (for Kasumi-3 target cells) and 72 hours (for 22Rv1 target cells) at 37° C. and 5% $CO_2$ for assessing cytotoxicity and cytokines. For assessing proliferation, effector and target cells were co-cultured at 1:1 ET ratio (after normalizing to $CAR^+$ cells) for 5 days. Target cells (22Rv1/Kasumi-3) alone were cultured to define spontaneous cell death. At the end of the co-culture period, cells were spun down at 1500 rpm at RT for 5 minutes, and 100 µL supernatant was collected for cytokine analysis. In case of adherent target cell co-culture, target cells (22Rv1) were detached by incubating cells with 50 µL trypsin-EDTA for 2-3 min at 37° C. in a humidified incubator. At the end of the incubation, trypsin was neutralized by adding 50 µL of the complete respective culture medium. In case of suspension target cell (kasumi-3) co-culture, both effectors and targets were recovered from the palate. 7-AAD (BioLegend, catalog No. 420404, lot No. B235875) was added (1 µL/well) just before acquiring the cells on Novocyte flow cytometer.

Flow cytometry-based acquisition and analysis were performed as following. For surface phenotype profiling experiments, cells were initially gated on FSC-H vs SSC-H on total cells. Live cells were gated in from the total cells. Doublets were eliminated from live cells by gating on FSC-A Vs FSC-H parameters. From here, surface profiling was done by gating on Vβ17$^+$CD8$^+$ cells. For cytotoxicity and proliferation assays, stained cells were acquired on a Novocyte flow cytometer with NovoExpress® software. Data was transferred via general folder to a desktop with Flow Jo (version 10.3). For cytotoxicity experiments, CFSE positive cells were first gated on to identify the target cells. Within the CFSE positive cells, dead cells were identified as 7-AAD$^+$ FSC$^{low}$ cells. Gates were set based on the CFSE unstained and 7-AAD unstained cells. To calculate the cell lysis specifically resulting from the CAR transfected Vβ17$^+$CD8$^+$ T cell, spontaneous target cell lysis values were subtracted from cell lysis values obtained from wells containing Vβ17$^+$CD8$^+$ T cells electroporated with GFP, α-CD123 CAR, or α-PSMA CAR mRNA. For proliferation assays, after excluding doublets, live Vβ17$^+$CD8$^+$ T cells were gated on and assessed their proliferation by plotting CTV (in histogram mode). Histograms were overlaid from effectors alone or effectors co-cultured with target cells to identify antigen proliferation of effector cells.

7.2.2. Measurement of Cytotoxicity and Cytokines Secretion from Vβ17+CD8+ CAR-T Cells in Co-Culture Cytokine analysis in cell culture supernatant was performed using Human magnetic Luminex Assay LXSAHM (R&D systems) kit (R&D Systems, Catalog No. LXSAHM-15, and Lot No. L132268) per the manufacturer's instructions. Briefly, cell culture supernatant was collected at the end of the co-culture period (post 24 hours for Kasumi-3 and 3 days for 22Rv1 target cells). 200 µL of cell culture supernatant was taken from the co-culture wells and spun down at RT for 1500 rpm for 4 minutes. 1004, of supernatant was collected from the spun-down samples, which was to minimize the cellular source in the supernatant. Collected supernatant was stored at −20° C. until analysis. On the day of analysis, samples were thawed slowly on ice and fifty microliters of cell culture supernatant or standard of each was added to microplate. If the concentration of analytes is high, supernatant needed to be diluted at 1:1 or 1:2. Thereafter, fifty microliters of diluted microparticle cocktail was added to each well of the microplate. Fifty microlitres of both standards and test samples were added to the respective wells. The plate was securely covered with foil sealer and incubated for 2 hours at RT on a MixMate (Eppendorf) shaker (at 300 g).

After the incubation period, plate was docked onto a magnetic stand, and allowed to sit for 2 minutes. The content of the wells was discarded in a single motion without losing the microparticles in the plate. Afterwards, the plate with the magnetic stand was pressed against the paper towels to remove any excessive seeping liquid. The plate was made sure to firmly sit on the magnetic stand.

Microplate was washed thrice by adding 100 μL of wash buffer with the discarding step as described above. Fifty microliters of diluted biotin antibody cocktail was added to each well. The plate was covered with foil sealer and incubated for 1 hour at RT on a MixMate (Eppendorf) shaker (at 300 g). The contents of the wells of microplate were discard with the discarding step as described above. The plate was washed thrice with 100 μL of wash buffer.

Fifty microliters of diluted Streptavidin-PE was added to each well of the microplate. The plate was incubated for 30 minutes at room temperature on a MixMate (Eppendorf) shaker (at 300 g). Microplate was washed thrice by adding 1004, of wash buffer with the discarding step as described above. The microparticles were resuspended by adding 1004, of wash buffer to each well of microplate. The plate was incubated for 2 minutes at RT on a MixMate (Eppendorf) shaker (at 300 g).

The plate was read on MAGPIX® analyser within 90 minutes of the last step of the protocol. Blank (plain cell culture medium) values were subtracted from the test values while plotting the concentrations of analytes in test samples.

The cytotoxicity of CAR mediated Vβ17$^+$CD8$^+$ T cell was measured. CFSE labelled target (Kasumi-3/22Rv1) cells were co-cultured with CAR (anti CD123/PSMA) transfected Vβ17$^+$CD8$^+$ T cells (effectors) at various effector to target (ET) ratios for 24 and 72 hours. As a control, CFSE labelled target (Kasumi-3/22Rv1) cells were also cultured with GFP transfected Vβ17$^+$CD8$^+$ T cells at various ET ratios. Owing to the differences in the transfection efficiencies, ET ratios were normalized to CAR$^+$ effector cells. Strikingly, Vβ17$^+$CD8$^+$ T cell showed a profound CAR dependent cytotoxicity against CD123 and PSMA expressing Kasumi-3 and 22Rv1 cells respectively at various ET ratios (FIG. 4A). Of note, Vβ17$^+$CD8$^+$ T cell showed substantial cytotoxicity at a low ET ratio of around 0.3:1, a characteristic hall mark feature of a serial killer T cell (FIG. 4A). While Vβ17$^+$CD8$^+$ T cell cells transfected with CleanCap™ EGFP mRNA (TriLink, Catalog No. L-7201-100, and Lot No. WOTL29206) did not mediate cytotoxicity against Kasumi-3 or 22Rv1 target cells (FIG. 4A).

To analyze the cell proliferation of the anti-CD123/PSMA CAR mediated Vβ17$^+$CD8$^+$ T cell, CTV labelled CAR positive Vβ17$^+$CD8$^+$ T cells were co-cultured with unlabeled target cells (Kasumi-3/22Rv1 cells) for 5 days. CTV dilution was consider as a measure for CAR expressing Vβ17$^+$CD8$^+$ T cell proliferation. Interestingly, CTV dilution of CAR positive Vβ17$^+$CD8$^+$ T cells implied that the anti-CD123/PSMA CAR expressing Vβ17$^+$CD8$^+$ T cells have not undergone any proliferation (FIG. 4B). This is in stark contrast with the cytotoxicity observed with these cells (FIG. 4A).

To evaluate the magnitude and type of cytokines/effector molecules produced from CAR expressing Vβ17$^+$CD8$^+$ T cells, culture supernatants were collected from co-culture experiments and profiled for various pro- and anti-inflammatory cytokines and effector molecules. Interestingly, anti CD123/PSMA CAR expressing Vβ17$^+$CD8$^+$ T cells produced substantial amount of effector signature cytokines (IFNγ and TNFα) and effector molecules (Granzyme A and B) (FIG. 4C). Of note, cytokines like IL-6 and IL-10 were not produced by Vβ17$^+$CD8$^+$ T cells during their co-culture with target cells, a most sought-after feature for any CAR expressing T cell (FIG. 4C). However, GFP mRNA transfected Vβ17$^+$CD8$^+$ T cells did produce considerable quantity of effector signature cytokines and effector molecules (FIG. 4C). To test whether M1 peptide mediated activated and expanded cells mirror highly differentiated cells, Vβ17$^+$CD8$^+$ T cells were stained with anti-CD27 and CD45RA mAbs (BioLegend, catalog No. 304148, and lot No. B228669) and found that a large fraction of them (about 80%) exhibit effector memory phenotype (CD27$^-$CD45RA$^-$) on day 12 of their culture (FIG. 4D). This observation partly explains the lack of proliferation of CAR positive Vβ17$^+$CD8$^+$ T cells in the co-culture setup. In addition, the observed CAR independent effector cytokines or effector molecules secretion by GFP expressing Vβ17$^+$CD8$^+$ T cells could also be attributed to the differentiation status of these cells.

Albeit anti-CD123/PSMA CAR positive Vβ17$^+$CD8$^+$ T cells were effective in mounting cytotoxicity against liquid (kasumi-3) and solid (22Rv1) tumors, no vivid proliferation of these cells was observed during their co-culture with target cells. This observed feature is a reminiscent of highly differentiated CD8$^+$ T cells (effector Memory/EMRA cells), who exhibit a strong cytotoxicity potential with a residual proliferation or self-renewal ability. To circumvent the activation-induced terminal differentiation and to promote CAR-mediated proliferation, Vβ17$^+$CD8$^+$ T cells were isolated from whole fresh PBMCs and were activated transiently with anti CD3/CD28 beads, followed by transfection with anti-CD123/PSMA CAR mRNA. Effectors cells (CAR positive Vβ17$^+$CD8$^+$ T cells) were co-cultured with target cells (Kasumi-3/22Rv1 cells) at various ET ratios for assessing cytotoxicity (FIG. 5A) and at 1:1 for proliferation (FIG. 5B). Like the M1-peptide-activated cells, anti-CD3/CD28-bead-activated Vβ17$^+$CD8$^+$ T cells showed prominent, comparable, and CAR mediated cytotoxicity against Kasumi-3 and 22Rv1 cells (FIG. 5A). Interestingly, Vβ17$^+$CD8$^+$ T cells transiently activated by anti CD3/CD28 beads (effectors) showed a prominent and CAR-dependent proliferation upon their co-culture with target cell lines (FIG. 5B). This observation was further strengthened by the presence of substantial amount of less differentiated cells (central memory phenotype: CCR7$^+$CD45RA$^-$) among effector cells at the end of the co-culture period (FIG. 5D). The observed differences in differentiation of Vβ17$^+$CD8$^+$ T cells induced by M1-peptide-mediated versus anti-CD3/CD28-beads-mediated activation could be due to a) mode of activation (TCR vs CD3/CD28); b) duration of the activation; c) strength of TCR signaling, or a cumulative effect of a), b) and c). Furthermore, neither CAR positive Vβ17$^+$CD8$^+$ T cells (effectors) alone nor GFP transfected or non-transfected Vβ17$^+$CD8$^+$ T cells co-cultured with target cells had led to proliferation of these cells (FIG. 5B). This shows that the observed Vβ17$^+$CD8$^+$ T cells proliferation was CAR dependent and target-cell dependent. In addition, cytokine profile of anti CD123/PSMA CAR positive Vβ17$^+$CD8$^+$ T cells (effectors) showed signature of effector cytokines (IFNγ, TNFα) and effector molecules (Granzyme A and B) along with residual amounts of IL-6, IL-10, IL-22 and IL-4 cytokines (FIG. 5C).

From the foregoing, it will be appreciated that, although specific embodiments have been described herein for the purpose of illustration, various modifications may be made without deviating from the spirit and scope of what is provided herein. All of the references referred to above are incorporated herein by reference in their entireties.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present description.

Various publications, articles and patents are cited or described in the background and throughout the specification; each of these references is herein incorporated by reference in its entirety. Discussion of documents, acts, materials, devices, articles or the like which has been included in the present specification is for the purpose of providing context for the invention. Such discussion is not an admission that any or all of these matters form part of the prior art with respect to any inventions disclosed or claimed.

What is claimed:

1. A method for producing Vβ17⁺CD8⁺ T cells, comprising (1) contacting a liquid composition comprising a M1 peptide derived from human influenza A virus ($M_{158-66}$) with a population of peripheral blood mononuclear cells (PBMCs) to thereby enrich the Vβ17⁺CD8⁺ T cells in the population of PBMCs; and (2) isolating the Vβ17⁺CD8⁺ T cells from the population of PBMCs after the contacting step of (1), wherein the M1 peptide comprises an amino acid sequence of GILGFVFTL (SEQ ID NO: 1) and the M1 peptide to cell ratio is 2.5 μg of M1 peptide per 2.5×10⁶ cells; and wherein optionally the method further comprises contacting an IL-2 with the population of PBMCs prior to the isolating step of (2).

2. The method of claim 1, wherein the population of PBMCs is cultured ex vivo in a medium comprising the M1 peptide and the IL-2.

3. The method of claim 1, wherein the method comprises:
(i). culturing the population of PBMCs ex vivo in a medium comprising the M1 peptide and the IL-2;
(ii). culturing the population of PBMCs ex vivo in a medium comprising the M1 peptide, and then culturing the population of PBMCs ex vivo in a medium comprising the IL-2; or
(iii). culturing the population of PBMCs ex vivo in a medium comprising the M1 peptide, then culturing the population of PBMCs ex vivo in a medium comprising the M1 peptide and the IL-2; and then culturing the population of PBMCs ex vivo in a medium comprising the IL-2.

4. The method of claim 1, wherein the population of PBMCs is cultured ex vivo for at least 1, 2, 3, 4, 5, 6, 7, 8, 9, 10, 11, 12, 13, or 14 days.

5. The method of claim 1, wherein the method increases the percent of the Vβ17⁺CD8⁺ T cells in the CD8+ cells from the population of PBMCs by at least 10%, 20%, 30%, 40%, 50%, 60%, 70%, 90%, 2 fold, 3 fold, 4 fold, 5 fold, 6 fold, 7 fold, 8 fold, 9 fold, 10 fold, 11 fold, 12 fold, 13 fold, 14 fold, or 15 fold; or wherein the method increases the percent of Vβ17⁺CD8⁺ T cells in the CD8+ cells from the population of PBMCs to at least 6%, 10%, 15%, 20%, 25%, 30%, 35%, 40%, 45%, 50%, 55%, 60%, 65%, 70%, 75%, 80%, 85%, or 90%.

6. The method of claim 1, wherein the method further comprises isolating the Vβ17⁺CD8⁺ T cells from the population of PBMCs after contacting the population of PBMCs with the M1 peptide or and the IL-2.

7. A method for making a CAR-T cell, comprising: (i) obtaining an isolated population of the Vβ17⁺CD8⁺ T cells produced according to the method of claim 1; and (ii)

introducing a nucleic acid encoding a chimeric antigen receptor (CAR) into the Vβ17+CD8+ T cells.

8. The method of claim 7, wherein the CAR comprises an extracellular domain, a transmembrane domain, and an intracellular domain;
   wherein the extracellular domain binds to an antigen expressed on a cancer cell;
   wherein optionally the cancer cell is a blood cancer cell or a solid tumor cancer cell; and
   wherein optionally the antigen is CD123 or PSMA.

9. The method of claim 1, wherein the method further comprises contacting the IL-2 with the population of PBMCs.

10. The method of claim 1, wherein the population of the whole PBMCs is from a healthy donor.

11. The method of claim 7, wherein the CAR comprises from the N-terminus to the C-terminus: a signal peptide comprising the amino acid sequence of SEQ ID NO: 2, an extracellular antigen binding domain comprising a scFv that binds CD123 and comprises the amino acid sequence of SEQ ID NO:3, a CD8α hinge domain comprising the amino acid sequence of SEQ ID NO:5, a CD8α transmembrane domain comprising the amino acid sequence of SEQ ID NO:6, a co-stimulatory signaling domain derived from CD137 comprising the amino acid sequence of SEQ ID NO:7, and a primary intracellular signaling domain derived from CD3z comprising the amino acid sequence of SEQ ID NO:8.

12. The method of claim 7, wherein the CAR comprises from the N-terminus to the C-terminus: a signal peptide comprising the amino acid sequence of SEQ ID NO: 2, an extracellular antigen binding domain comprising a scFv that binds PSMA and comprises the amino acid sequence of SEQ ID NO:4, a CD8α hinge domain comprising the amino acid sequence of SEQ ID NO:5, a CD8α transmembrane domain comprising the amino acid sequence of SEQ ID NO:6, a co-stimulatory signaling domain derived from CD137 comprising the amino acid sequence of SEQ ID NO:7, and a primary intracellular signaling domain derived from CD3z comprising the amino acid sequence of SEQ ID NO:8.

13. The method of claim 8, wherein the cancer cell is a blood cancer cell or a solid tumor cancer cell.

14. The method of claim 8, wherein the antigen is CD123 or Prostate-specific membrane antigen (PSMA).

* * * * *

```
                        SEQUENCE LISTING

<160> NUMBER OF SEQ ID NOS: 13

<210> SEQ ID NO 1
<211> LENGTH: 9
<212> TYPE: PRT
<213> ORGANISM: Influenza A virus
<220> FEATURE:
<223> OTHER INFORMATION: M1 peptide derived from human influenza A virus

<400> SEQUENCE: 1

Gly Ile Leu Gly Phe Val Phe Thr Leu
1               5

<210> SEQ ID NO 2
<211> LENGTH: 19
<212> TYPE: PRT
<213> ORGANISM: Artificial Sequence
<220> FEATURE:
<223> OTHER INFORMATION: Signal sequence

<400> SEQUENCE: 2

Met Ala Trp Val Trp Thr Leu Leu Phe Leu Met Ala Ala Ala Gln Ser
1               5                   10                  15

Ile Gln Ala

<210> SEQ ID NO 3
<211> LENGTH: 242
<212> TYPE: PRT
<213> ORGANISM: Artificial Sequence
<220> FEATURE:
<223> OTHER INFORMATION: scFv for Anti-CD123 CAR

<400> SEQUENCE: 3

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Leu
                85                  90                  95

Thr Phe Gly Gln Gly Thr Lys Val Glu Ile Lys Gly Thr Glu Gly Lys
            100                 105                 110

Ser Ser Gly Ser Gly Ser Glu Ser Lys Ser Thr Glu Val Gln Leu Leu
        115                 120                 125

Glu Ser Gly Gly Gly Leu Val Gln Pro Gly Gly Ser Leu Arg Leu Ser
    130                 135                 140

Cys Ala Ala Ser Gly Phe Thr Phe Ser Gly Tyr Trp Met His Trp Val
145                 150                 155                 160

Arg Gln Ala Pro Gly Lys Gly Leu Glu Trp Val Ser Ala Ile Arg Ser
```

```
                        165                 170                 175
Asp Gly Ser Ser Lys Tyr Tyr Ala Asp Ser Val Lys Gly Arg Phe Thr
            180                 185                 190

Ile Ser Arg Asp Asn Ser Lys Asn Thr Leu Tyr Leu Gln Met Asn Ser
                195                 200                 205

Leu Arg Ala Glu Asp Thr Ala Val Tyr Tyr Cys Ala Lys Asp Gly Val
        210                 215                 220

Ile Glu Asp Thr Phe Asp Tyr Trp Gly Gln Gly Thr Leu Val Thr Val
225                 230                 235                 240

Ser Ser

<210> SEQ ID NO 4
<211> LENGTH: 120
<212> TYPE: PRT
<213> ORGANISM: Artificial Sequence
<220> FEATURE:
<223> OTHER INFORMATION: scFv for Anti-PSMA CAR
<220> FEATURE:
<221> NAME/KEY: misc_feature
<222> LOCATION: (78)..(78)
<223> OTHER INFORMATION: Xaa can be any naturally occurring amino acid

<400> SEQUENCE: 4

Gln Val Gln Leu Val Glu Ser Gly Gly Gly Leu Val Gln Ala Gly Gly
1               5                   10                  15

Ser Leu Arg Leu Ser Cys Val Ala Ser Gly Ile Ile Leu Asn Ile His
            20                  25                  30

Ala Val Asn Trp Asn Trp Tyr Arg Gln Ala Pro Gly Lys Gln Arg Glu
        35                  40                  45

Trp Val Ala Gln Ile Ser Ser Gly Gly Ile Thr Thr Tyr Ala Asp Ser
    50                  55                  60

Val Lys Gly Arg Phe Ser Ile Ser Arg Asp Asn Ala Lys Xaa Thr Ala
65                  70                  75                  80

Tyr Leu Gln Met Asn Ser Leu Lys Pro Glu Asp Thr Ala Leu Tyr Tyr
                85                  90                  95

Cys Tyr Gln Asn Arg Ser Gly Trp Gly Thr Gly Asn Tyr Trp Gly Gln
            100                 105                 110

Gly Thr Gln Val Thr Val Ser Ser
        115                 120

<210> SEQ ID NO 5
<211> LENGTH: 45
<212> TYPE: PRT
<213> ORGANISM: Artificial Sequence
<220> FEATURE:
<223> OTHER INFORMATION: CD8a hinge domain

<400> SEQUENCE: 5

Thr Ser Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 6
<211> LENGTH: 24
<212> TYPE: PRT
<213> ORGANISM: Artificial Sequence
<220> FEATURE:
```

<223> OTHER INFORMATION: CD8a transmembrane domain

<400> SEQUENCE: 6

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 7
<211> LENGTH: 42
<212> TYPE: PRT
<213> ORGANISM: Artificial Sequence
<220> FEATURE:
<223> OTHER INFORMATION: co-stimulatory signaling domain of CD137

<400> SEQUENCE: 7

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 8
<211> LENGTH: 112
<212> TYPE: PRT
<213> ORGANISM: Artificial Sequence
<220> FEATURE:
<223> OTHER INFORMATION: intracellular signaling domain of CD3z

<400> SEQUENCE: 8

Arg Val Lys Phe Ser Arg Ser Ala Asp Ala Pro Ala Tyr Lys Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
            35                  40                  45

Pro Arg Arg Lys Asn Pro Gln Glu Gly Leu Tyr Asn Glu Leu Gln Lys
        50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 9
<211> LENGTH: 12
<212> TYPE: PRT
<213> ORGANISM: Influenza A virus
<220> FEATURE:
<223> OTHER INFORMATION: peptide derived from human influenza A virus

<400> SEQUENCE: 9

Lys Gly Ile Leu Gly Phe Val Phe Thr Leu Thr Val
1               5                   10

<210> SEQ ID NO 10
<211> LENGTH: 11
<212> TYPE: PRT
<213> ORGANISM: Influenza A virus
<220> FEATURE:

```
<223> OTHER INFORMATION: peptide derived from human influenza A virus

<400> SEQUENCE: 10

Lys Gly Ile Leu Gly Phe Val Phe Thr Leu Thr
1               5                   10

<210> SEQ ID NO 11
<211> LENGTH: 10
<212> TYPE: PRT
<213> ORGANISM: Influenza A virus
<220> FEATURE:
<223> OTHER INFORMATION: peptide derived from human influenza A virus

<400> SEQUENCE: 11

Lys Gly Ile Leu Gly Phe Val Phe Thr Leu
1               5                   10

<210> SEQ ID NO 12
<211> LENGTH: 11
<212> TYPE: PRT
<213> ORGANISM: Influenza A virus
<220> FEATURE:
<223> OTHER INFORMATION: peptide derived from human influenza A virus

<400> SEQUENCE: 12

Gly Ile Leu Gly Phe Val Phe Thr Leu Thr Val
1               5                   10

<210> SEQ ID NO 13
<211> LENGTH: 10
<212> TYPE: PRT
<213> ORGANISM: Influenza A virus
<220> FEATURE:
<223> OTHER INFORMATION: peptide derived from human influenza A virus

<400> SEQUENCE: 13

Gly Ile Leu Gly Phe Val Phe Thr Leu Thr
1               5                   10
```